United States Patent [19]
Yamada et al.

[11] Patent Number: 5,986,377
[45] Date of Patent: Nov. 16, 1999

[54] STATOR FOR DYNAMOELECTRIC MACHINE

[75] Inventors: Toyonobu Yamada; Tsutomu Kawamura; Naoki Mizutani, all of Mie; Toshikazu Sato, Mie-gun; Kingo Miyaoka, Wie; Motoyasu Mochizuki, Ama-gun, all of Japan

[73] Assignee: Kabushiki Kaisha Toshiba, Kanagawa, Japan

[21] Appl. No.: 09/057,794

[22] Filed: Apr. 9, 1998

[30] Foreign Application Priority Data

Apr. 11, 1997 [JP] Japan ................................. 9-093761
Nov. 27, 1997 [JP] Japan ................................. 9-326478

[51] Int. Cl.⁶ ..................................................... H02K 1/00
[52] U.S. Cl. ........................................... 310/216; 310/259
[58] Field of Search ........................... 310/216, 164, 310/195, 254, 259, 264

[56] References Cited

U.S. PATENT DOCUMENTS

| | | | |
|---|---|---|---|
| 4,365,180 | 12/1982 | Licata et al. | 310/216 |
| 4,481,435 | 11/1984 | Loforese | 310/71 |
| 4,788,465 | 11/1988 | Hertrich | 310/269 |
| 4,864,267 | 9/1989 | Banjoya | 336/210 |
| 5,382,859 | 1/1995 | Huang et al. | 310/216 |
| 5,592,731 | 1/1997 | Huang et al. | 29/596 |

FOREIGN PATENT DOCUMENTS

| | | |
|---|---|---|
| 0 652 622 A2 | 10/1995 | European Pat. Off. . |
| 09191588 | 7/1997 | European Pat. Off. . |
| 0833 427 A1 | 1/1998 | European Pat. Off. . |

OTHER PUBLICATIONS

European Search Report (Application No. EP. 98 10 6585).

*Primary Examiner*—Nestor Ramirez
*Assistant Examiner*—Joseph Waks
*Attorney, Agent, or Firm*—Limbach & Limbach, LLP

[57] ABSTRACT

A stator for a dynamoelectric machine includes an annular stator core composed of a developed core formed by stacking a number of steel sheets, each steel sheet including a plurality of unit cores each of which includes a unit yoke and a magnetic pole tooth and which are sequentially connected together by connecting portions integral with the respective unit yokes, and a stator coil wound on the magnetic pole teeth. Each unit yoke has a circumferential end overlapping, in a direction of stacking of the steel sheets, a circumferential end of the unit yoke adjacent to said each unit yoke.

5 Claims, 49 Drawing Sheets

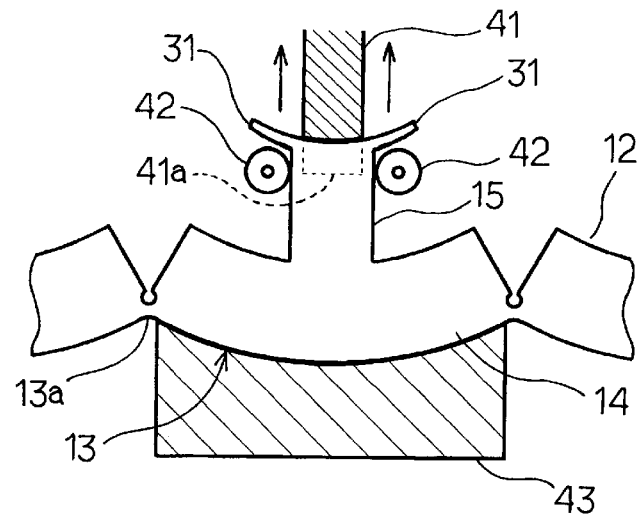
F I G. 4 1
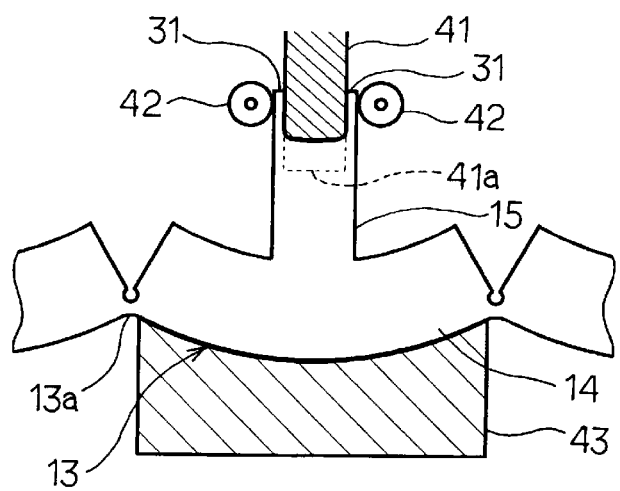
F I G. 4 2
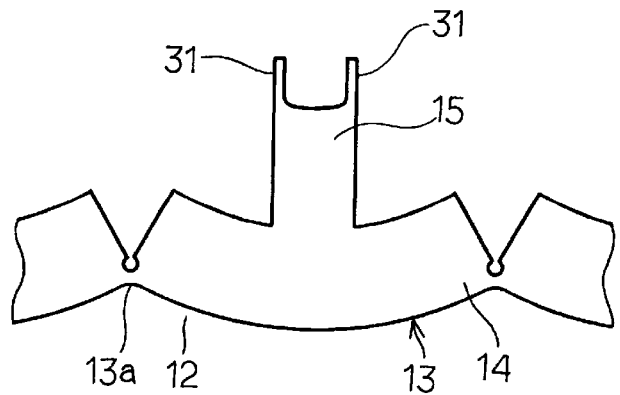
F I G. 4 3

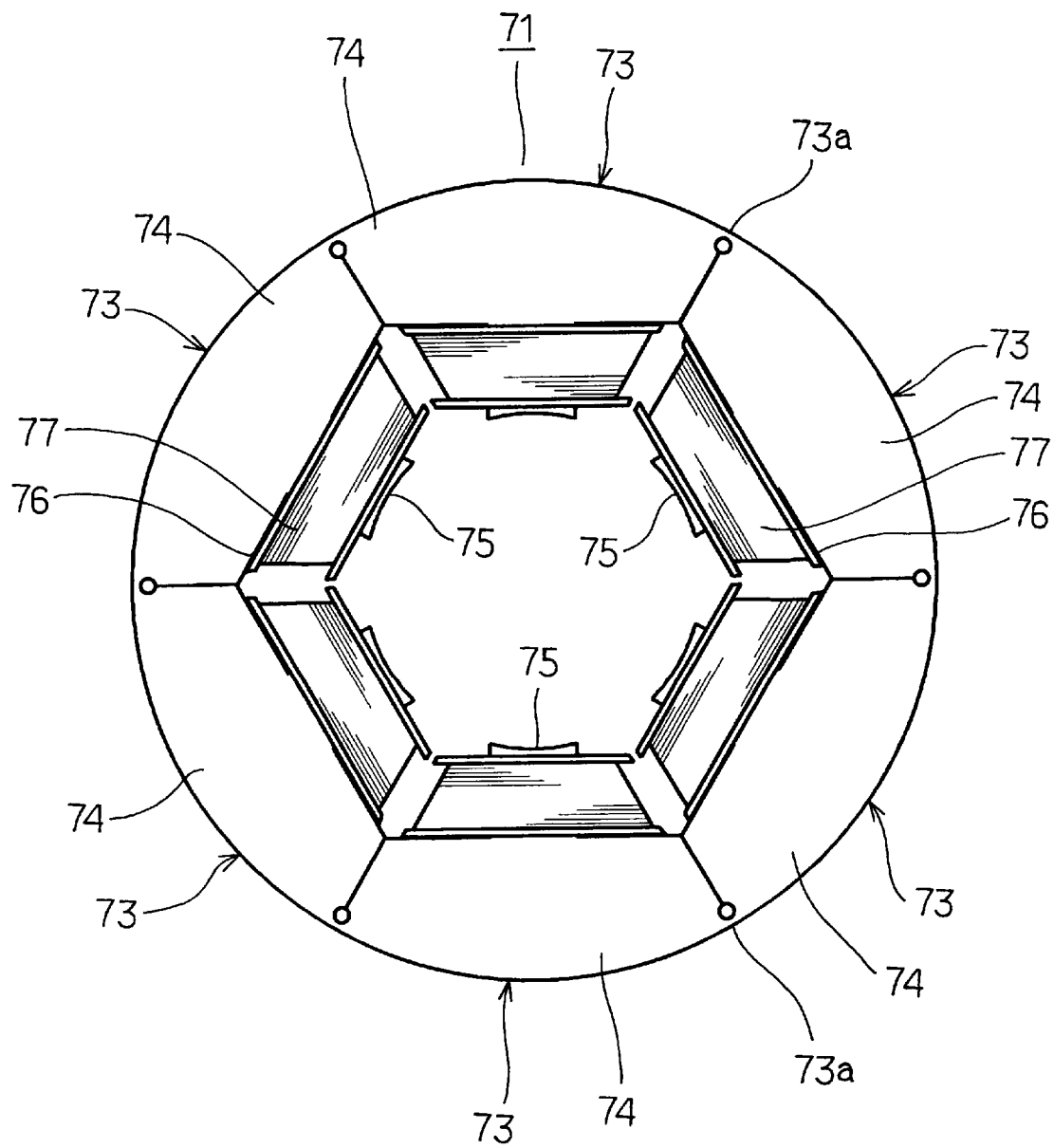
F I G. 5 7

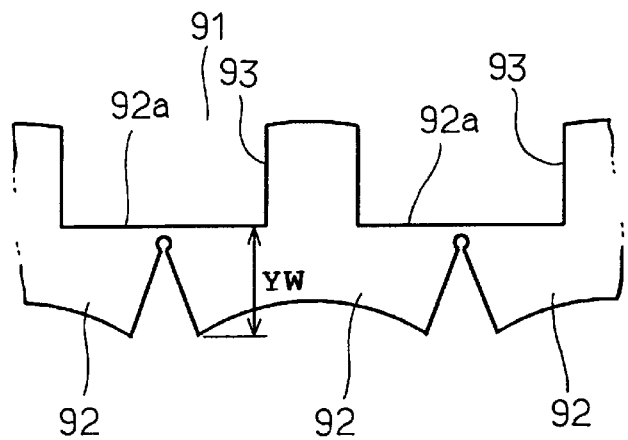
F I G. 8 0
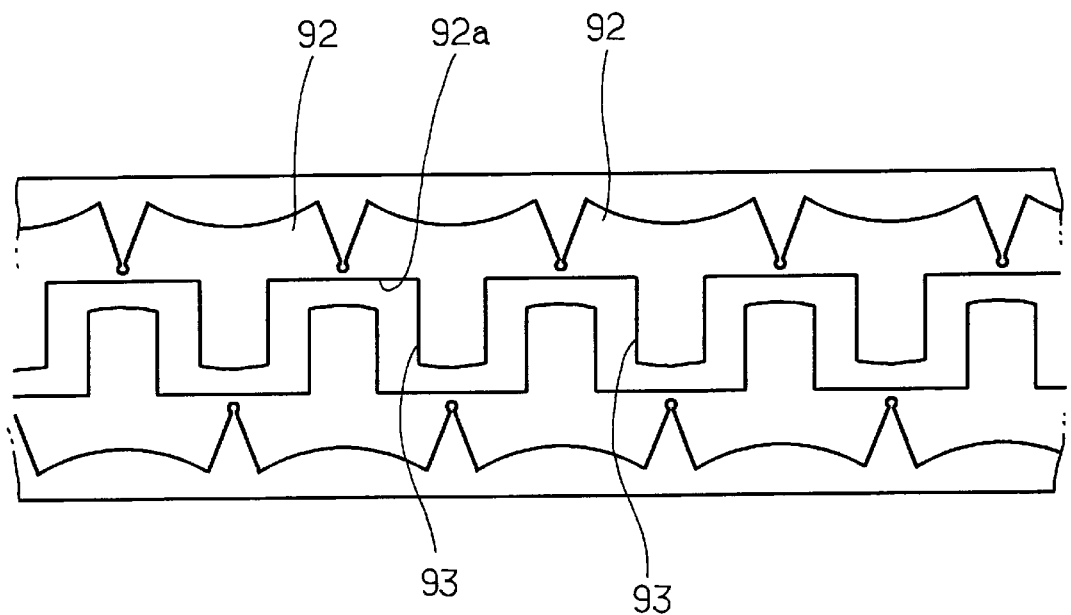
F I G. 8 1

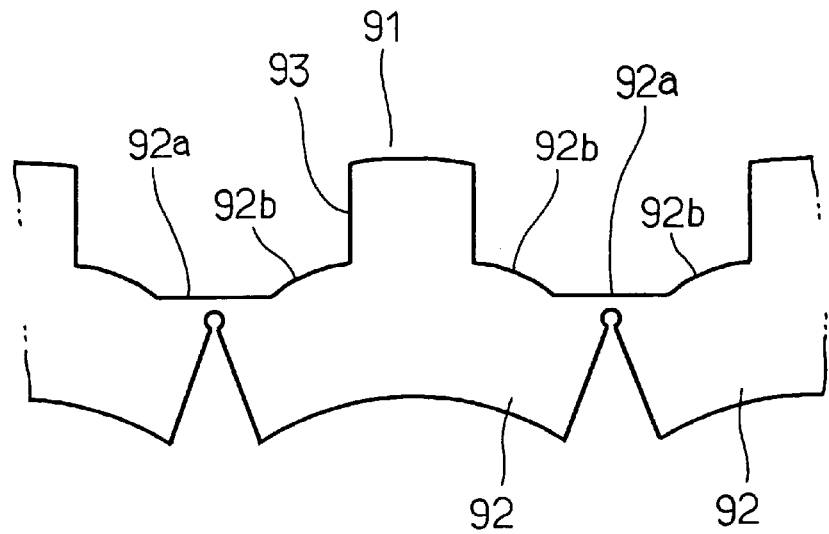
F I G. 8 2
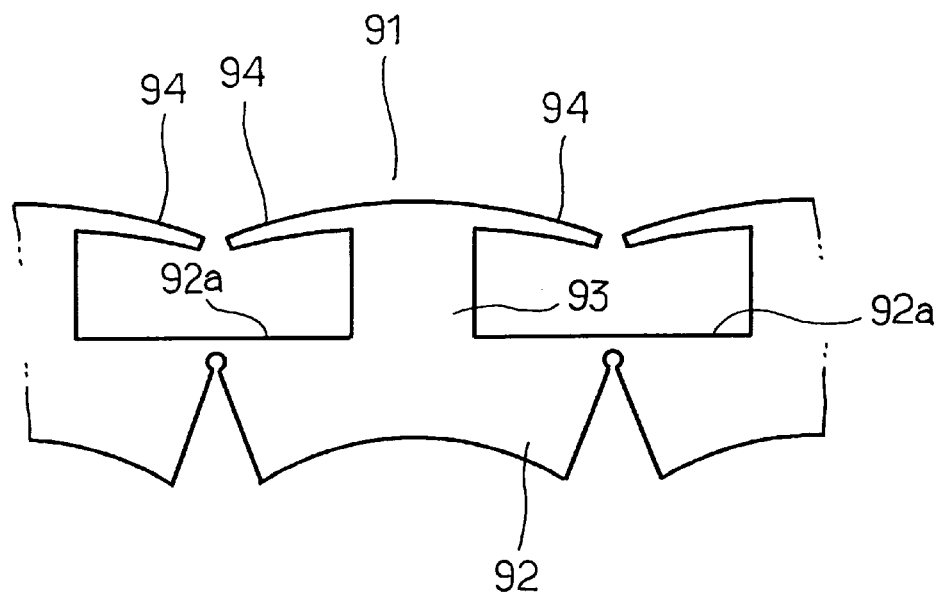
F I G. 8 3

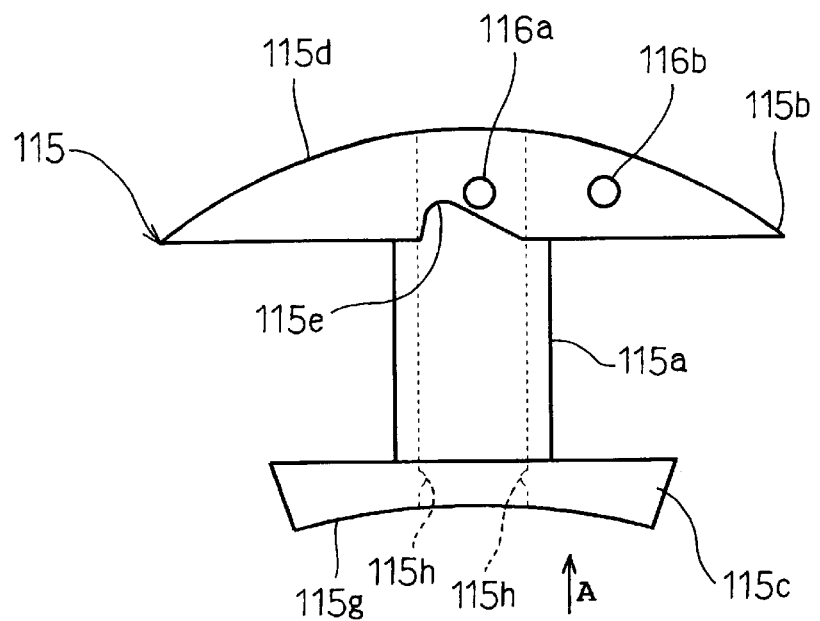
F I G. 9 5
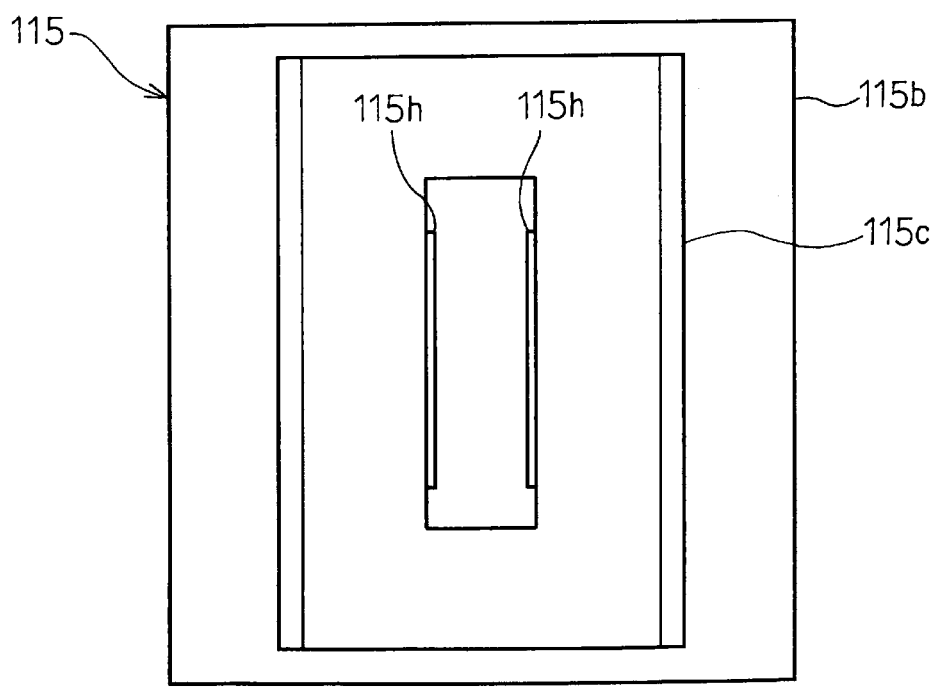
F I G. 9 6

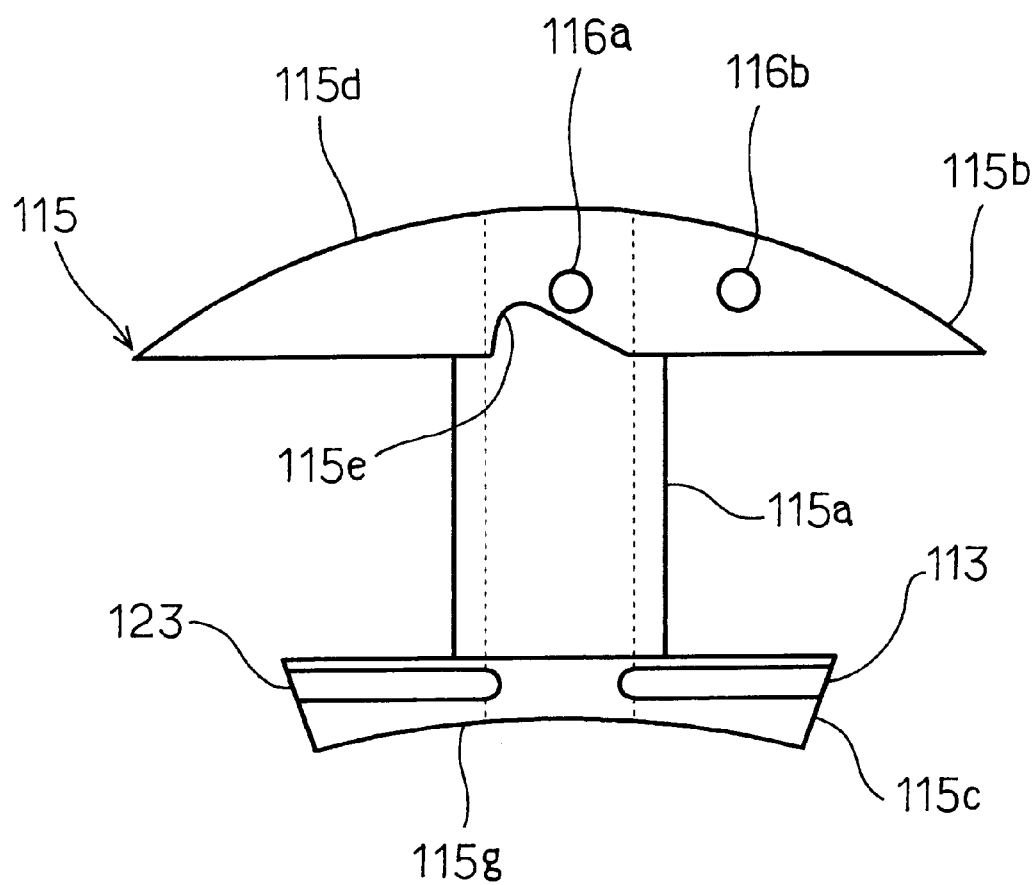
F I G. 97

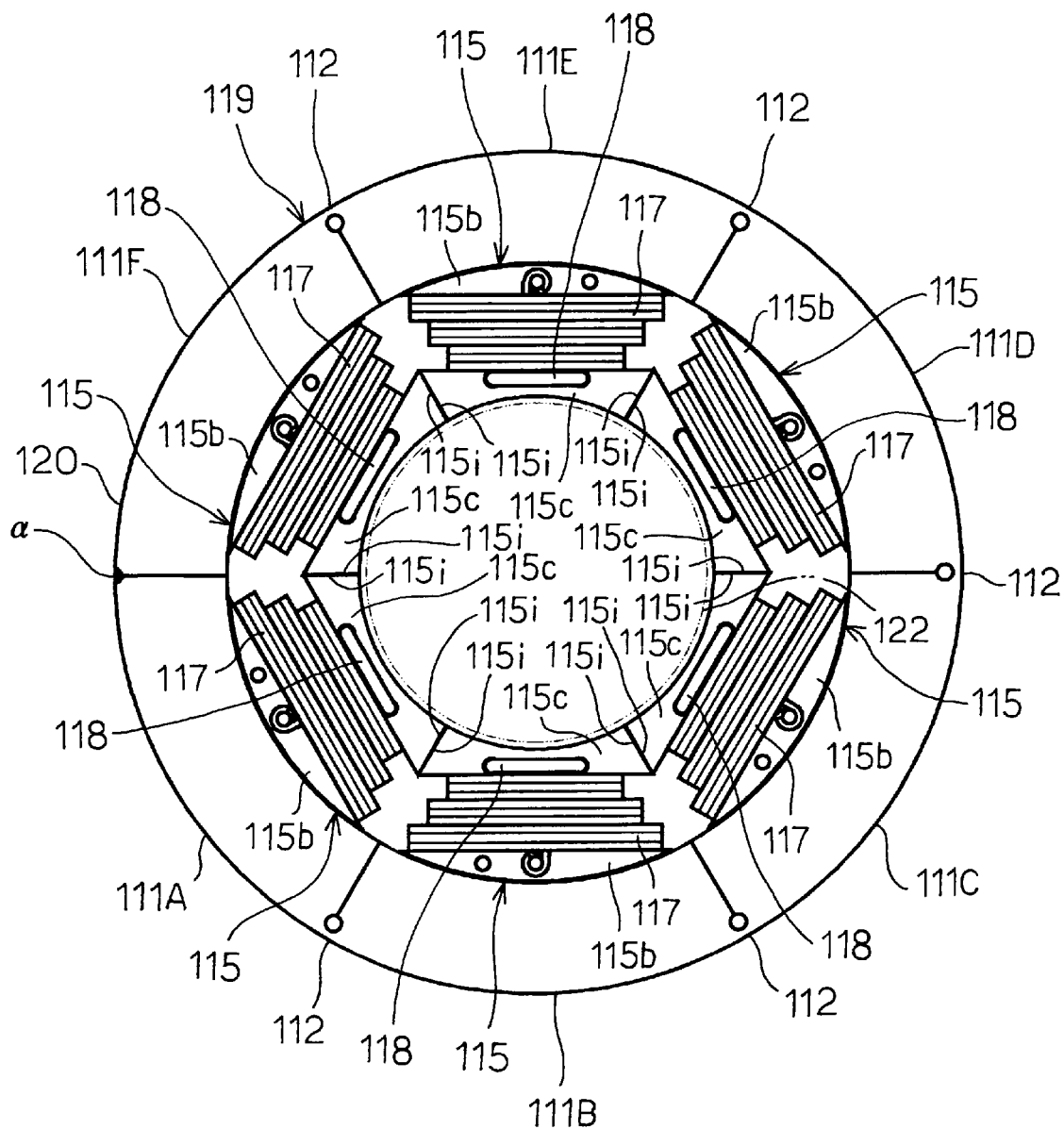
F I G. 98

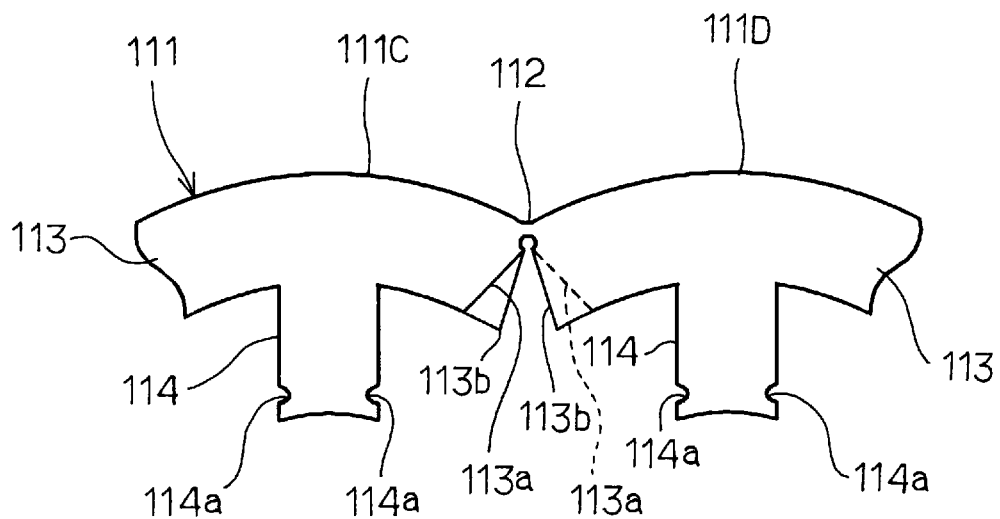
F I G. 9 9
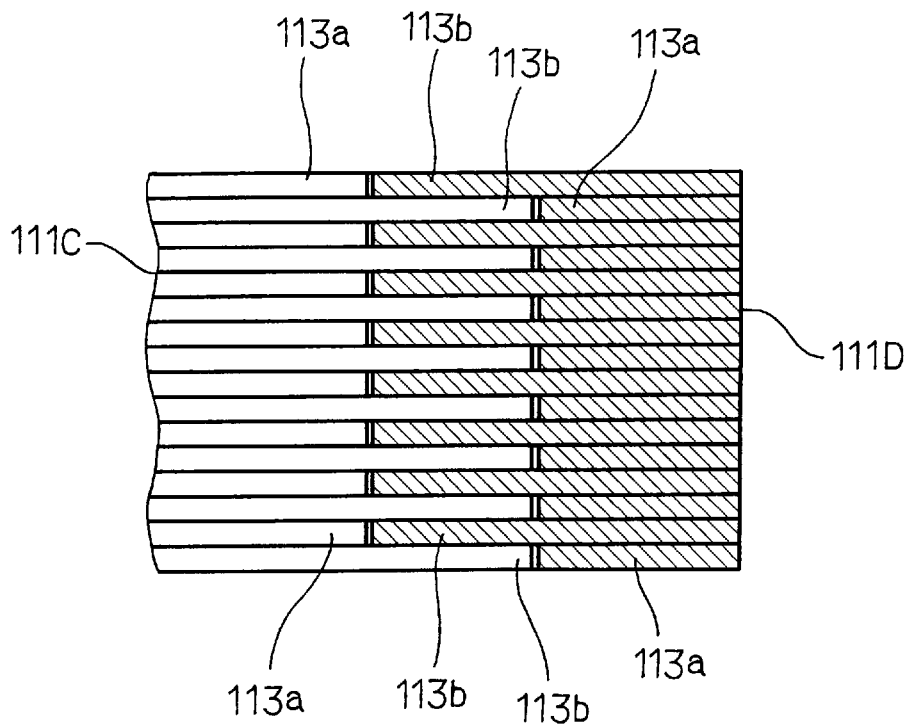
F I G. 1 0 0

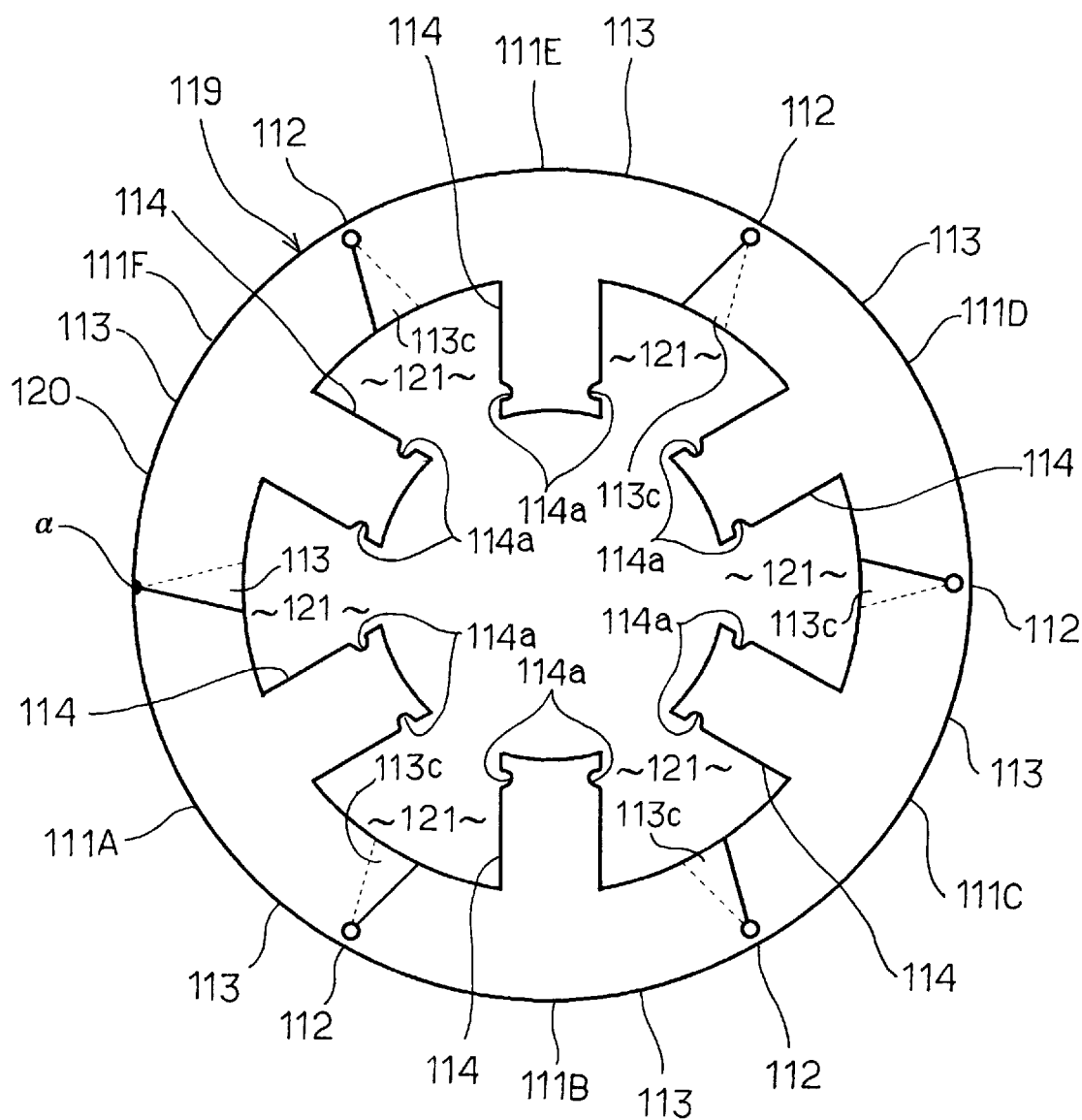
F I G. 101

STATOR FOR DYNAMOELECTRIC MACHINE

BACKGROUND OF THE INVENTION

1. Field of the Invention

This invention relates to a stator for a dynamoelectric machine in which a plurality of continuous strip-like yoke portions each having an integrally formed magnetic pole tooth are punched out of steel sheets, and a method of making such a stator.

2. Description of the Prior Art

One of conventional ring-shaped stator cores for dynamoelectric machines comprises a plurality of divided unit cores combined together into a single ring-shaped core. Each unit core comprises a number of unit steel sheets stacked on one another. Each unit steel sheet includes a plurality of core regions continuous via flexible portions with one another. A predetermined number of unit cores and unit magnetic pole teeth are integrally formed in each of the core regions. The unit steel sheets are stacked into each unit core and bent at the flexible portions into an arcuate shape. Each unit core thus formed has a developed configuration in which the core regions are linearly continuous via the flexible portions, and accordingly, each unit core is substantially linear rather than arcuate. Consequently, yield of the steel sheets is higher in the above-described unit steel sheet as compared with the case where each steel sheet is punched out into a ring-shaped, semicircular, quarter-circular or arcuate shape.

In the above-described construction, however, the unit steel sheets have a number of portions connected to one another in order that the plurality of divided unit cores may be connected to one another into a single ring-shaped core. Furthermore, each unit steel sheet has a number of portions at which the unit yokes are abutted against each other. These connected portions and abutted portions each inevitably have a higher magnetic resistance than portions at which the steel sheets are continuous to one another. Accordingly, the connected portions and abutted portions adversely affect magnetic properties of the stator yoke. Furthermore, it is not easy to connect the unit cores to one another so that each of the connected and abutted portions has a magnetic resistance as low as the other portions. Additionally, one of conventional stator making methods requires a step of inserting into each of the magnetic pole teeth a mechanically wound stator core. In this method, the stator core has a large opening slot structure for provision of spaces into which the coils are inserted. Large openings of the slots result in non-uniformity of the torque developed by the dynamoelectric machine.

Furthermore in the above-described method, the stator coil needs to be prevented from falling off or moving in the slots after the insertion. The structure for preventing falling-off or movement of the stator coil has been desired to be achieved in an easy manner.

SUMMARY OF THE INVENTION

Therefore, a primary object of the present invention is to provide a stator for the dynamoelectric machine in which the connected portions and abutted portions between the unit cores have a magnetic resistance as low as possible, whereas a high level of steel sheet punching yield is maintained, and, a method of making such a stator.

Another object of the invention is to provide a stator for the dynamoelectric machine in which the non-uniformity of the torque developed by the dynamoelectric machine can be reduced, and a method of making such a stator.

Further another object of the invention is to provide a stator for the dynamoelectric machine in which the stator coil can readily be prevented from falling off or moving after insertion into the magnetic pole teeth, and a method of making such a stator.

The present invention provides a stator for a dynamoelectric machine comprising an annular stator core composed of a developed core formed by stacking a number of steel sheets, each of said steel sheets including a plurality of unit cores each of which includes a unit yoke and a magnetic pole tooth and which are sequentially connected together by connecting portions integral with the respective unit yoke, and a stator coil wound on the magnetic pole tooth. In this construction, each said unit yoke has a circumferential end and is bent at the connecting portion thereof so that the circumferential end thereof overlaps, in a direction of stacking of the steel sheets, said circumferential end of the unit yoke adjacent to said each unit yoke.

According to the above-described stator, the developed core has a reduced number of connecting portions, and the ends of the unit yokes abutting against each other are overlapped in the direction of stacking of the steel sheets. Consequently, an increase in the magnetic resistance can be prevented.

The invention also provides a method of making a stator for a dynamoelectric machine comprising the steps of forming a developed core by stacking a number of steel sheets, each steel sheet including a plurality of unit cores each of which includes a unit yoke and a magnetic pole tooth and which are sequentially connected together by connecting portions integral with the respective unit yokes, forming an annular stator core by rounding the developed core, each unit yoke having a circumferential end overlapping, in a direction of stacking of the steel sheets, a circumferential end of the unit yoke adjacent to said each unit yoke, and winding stator coils on the respective magnetic pole teeth before or after the rounding step.

In a preferred form of the above-described method, each magnetic pole tooth has a pair of protrusions formed on both circumferential ends of a distal end thereof to further protrude in a direction of protrusion of each magnetic pole tooth in the state of the developed core, and the coil is fitted with each magnetic pole tooth so as to pass the protrusions and subsequently, the protrusions are bent sidewise.

According to the above-described method, the protrusions are bent sidewise after the coil has been inserted into each magnetic pole tooth. Consequently, since the width of slot opening between the magnetic pole teeth is reduced, non-uniformity in the torque can be improved. Furthermore, since the protrusions are bent sidewise after the coil has been inserted into each magnetic pole tooth, the coil can be prevented from falling off the magnetic pole tooth and freely moving along the tooth by the protrusions.

In a further preferred form, the developed core is formed by overlapping at least first and second unit developed cores each formed by stacking the steel sheets to a predetermined thickness. Each magnetic pole tooth has a pair of protrusions formed on both circumferential ends of a distal end thereof to further protrude in a direction of protrusion of each magnetic pole tooth in the state of the developed core. The paired protrusions of each magnetic pole tooth have lengths differing from each other and further differing from each other between the first and second unit developed cores. Consequently, the slots of the stator core are skewed so that the non-uniformity in the torque can be reduced.

In further another preferred form, the paired protrusions are bent by applying a guide jig to a central distal and of each magnetic pole tooth, applying a pair of forming jigs to both circumferential side end faces of each magnetic pole tooth, and moving the forming jigs in the direction of protruding of each protrusion so that the paired protrusions are brought down against both side faces of the guide jigs respectively, whereby the protrusions are bent in the direction of projection of each magnetic pole tooth. According to the method, a predetermined space between the paired protrusions can be ensured when the protrusions have been bent.

In further another preferred form, each unit yoke includes both edges having inclinations differing from each other and the steel sheets are stacked with sides thereof being reversed alternately so that overlapped portions are formed in the direction of stacking. According to the method, the overlapped portions can be formed even when the same shape of developed cores are stamped out of the steel sheets.

In further another preferred form, the coil is formed by rotating a coil winding shaft so that a magnet wire is fed to be wound, a manner of feeding the magnet wire includes a pitch feed pattern wherein the magnet wire is moved at a pitch approximately same as the diameter of every one turn with the coil winding shaft being stopped or reduced, and a lead feed pattern wherein the magnet wire is moved at a pitch approximately same as the outer diameter of the magnet wire for every one turn while the shaft is in rotation, and the magnet wire is wound in the pitch feed pattern in an initial winding stage. According to the method, the magnet wire can be wound without gap and in a row. This improves a space factor of the coil.

BRIEF DESCRIPTION OF THE DRAWINGS

Other objects, features and advantages of the present invention will become clear upon reviewing the following description of preferred embodiments thereof, made with reference to the accompanying drawings, in which:

FIGS. 41 to 43 are plan views explaining steps of bending the protrusion in the twelfth embodiment;

FIG. 57 is a plan view of the completed stator of a seventeenth embodiment;

FIG. 80 is a partial plan view of the developed core of a twenty-fourth embodiment;

FIG. 81 is a plan view of the steel sheet, showing stamping of the developed core;

FIG. 82 is a partial plan view of the developed core of a twenty-fifth embodiment;

FIG. 83 is a partial plan view of the developed core of a twenty-sixth embodiment;

FIG. 95 is a plan view of the bobbin used in a twenty-ninth embodiment;

FIG. 96 is a view taken as viewed in the direction of arrow A in FIG. 95;

FIG. 97 is view similar to FIG. 95, showing a thirtieth embodiment;

FIG. 98 is a view similar to FIG. 94, showing a thirty-first embodiment;

FIG. 99 is a partial plan view of the developed core in the thirty-first embodiment;

FIG. 100 is a side view of stacked core lap portion;

FIG. 101 is a view similar to FIG. 93, showing the theory-first embodiment;

DETAILED DESCRIPTION OF THE PREFERRED EMBODIMENTS

Figure 1:
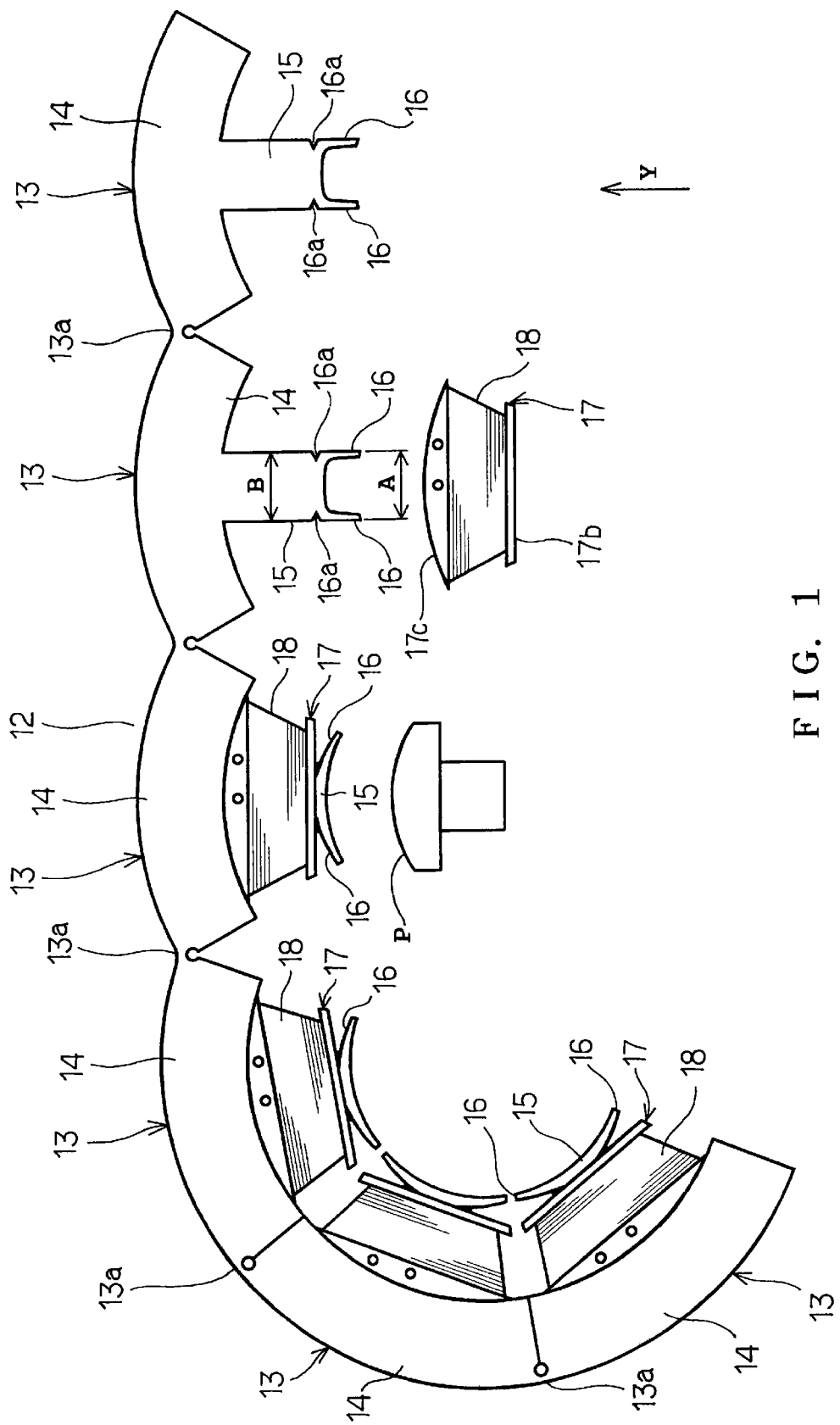
FIG. 1 is a diagrammatic view of the stator in different continuous making steps for explaining the method of a first embodiment in accordance with the present invention.
Figure 2:
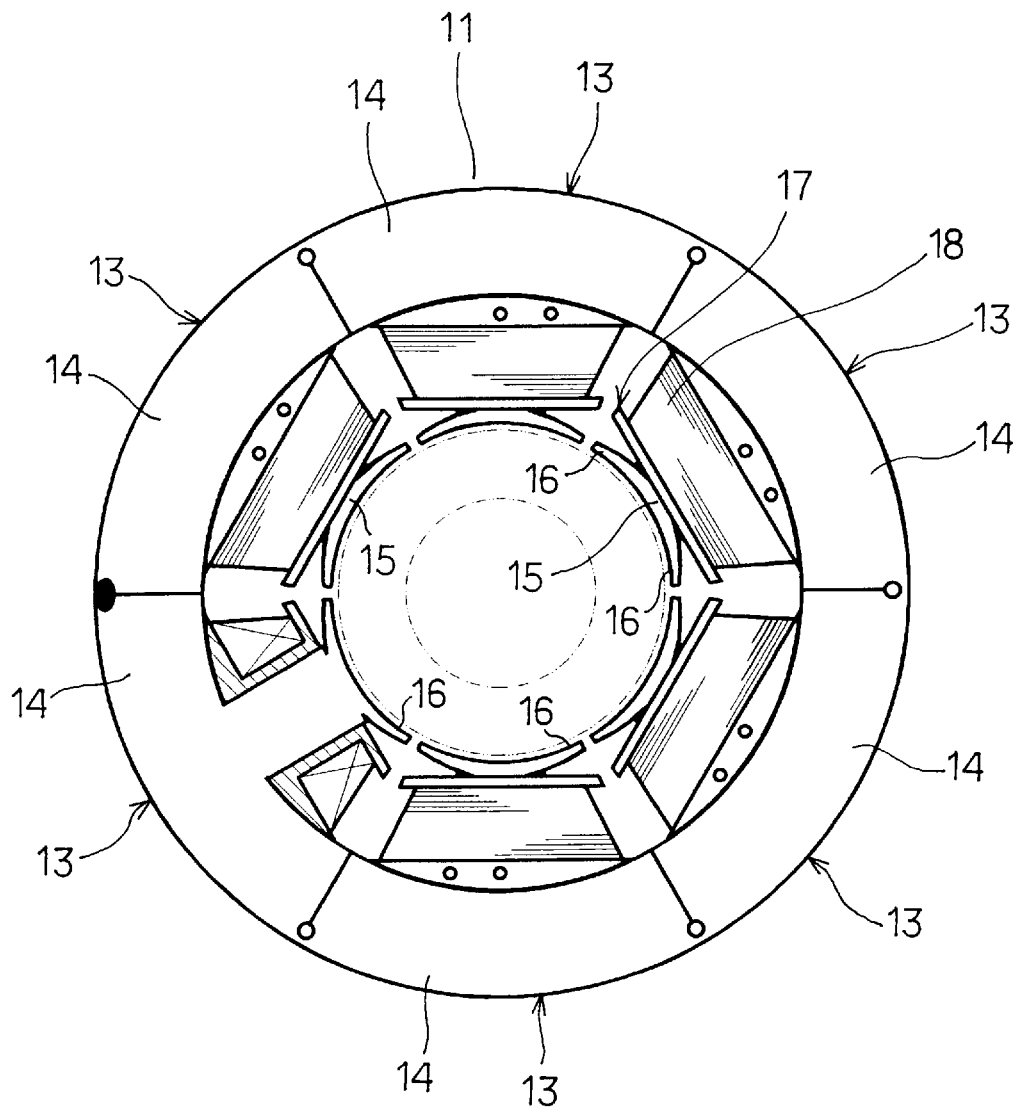
FIG. 2 is a plan view of the completed stator.
Figure 3:
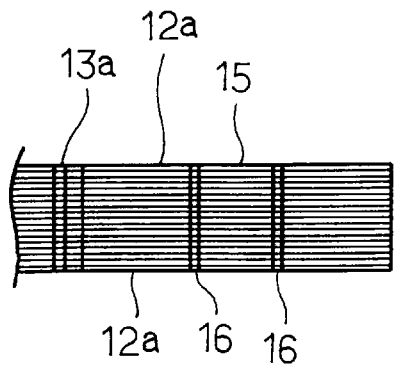
FIG. 3 is a view of the unit core taken as viewed in the direction of arrow Y in FIG. 1.

A first embodiment of the present invention will be described with reference to FIGS. 1 to 10. Referring first to FIG. 2, a stator 1 for a dynamoelectric machine of the inner rotor type is shown. Procedures for manufacturing the stator 1 will be described. A developed core 12 as shown in FIG. 1 is formed by stacking a number of steel sheets 12a (see FIG. 3 which is a view taken in the direction of arrow Y in FIG. 1). The developed core 12 comprises six unit cores 13 connected together by plastically deformable connecting portions 13a. Each unit core 13 comprises an arcuate unit yoke 14 and a magnetic pole tooth 15 formed integrally with the unit yoke 14 and projecting from an inner circumferential face toward the center of rotation.

Each tooth 15 has a pair of protrusions 16 protruding from circumferential ends of a distal end thereof in the direction of projection of the tooth. Each protrusion 16 has a generally V-shaped recess 16a formed in a joint portion thereof. An outer width A between the protrusions 16 is set to be approximately equal to or smaller than the width of the tooth 15.

Figure 5:
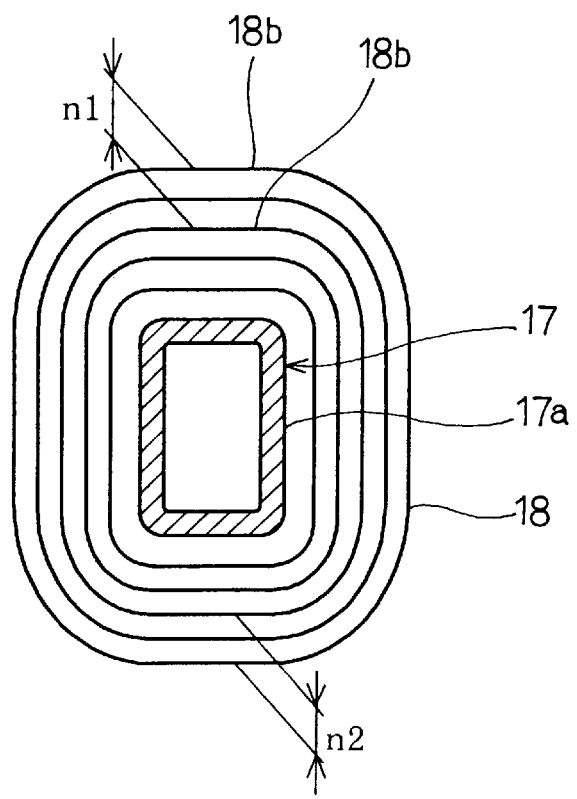
FIG. 5 is a longitudinally sectional side view of the bobbin and coil, showing a step in winding the coil.

A bobbin 17 has a stator coil 18 wound thereon as will be described later. The bobbin 17 includes a square cylindrical winding drum 17a having a rectangular section elongated in a direction of stacking of the steel sheets, as shown in FIG. 5. The drum 17 has two flanges 17b and 17c formed on both axial ends thereof. The rotor side flange 17b has a flat face opposed to a rotor. The yoke side flange 17c has an outer face with an arcuate transverse section corresponding to the inner circumferential face of each unit yoke 14.

Each bobbin 17 is fitted with the corresponding tooth 15 so as to pass the protrusions 16. The protrusions 16 are pressed by an arcuate pressing face of a punch P so as to be bent sidewise. Consequently, the distal end of each tooth 15 and protrusions 16 form a continuous arcuate face. Thereafter, the developed core 12 is bent at the connecting portions 13a between the unit cores 13 with the bobbins 17 being fitted with the respective magnetic pole teeth 15, so that the core 12 is rounded. Both ends of the developed core 12 are then welded together, for example. As a result, an annular stator core 11 as shown in FIG. 2 is manufactured. In a completed state of the stator core 11, long sides of the winding drums 17a are adjacent to one another.

Figure 4:
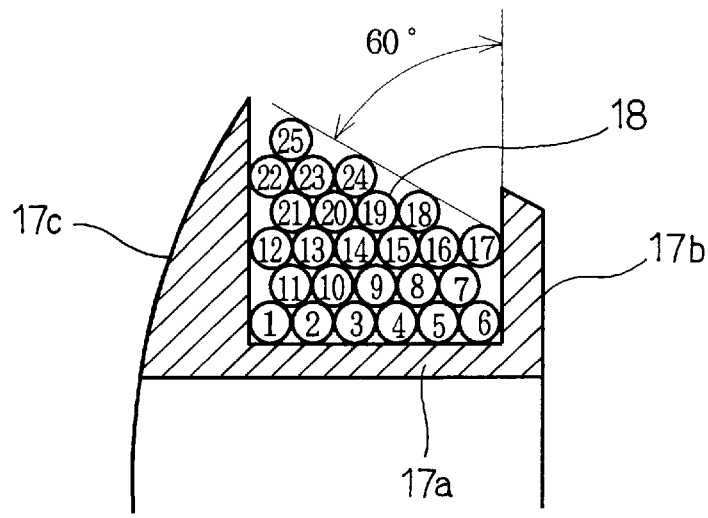
FIG. 4 is a partial sectional view of a bobbin and coil wound thereon.
Figure 6:
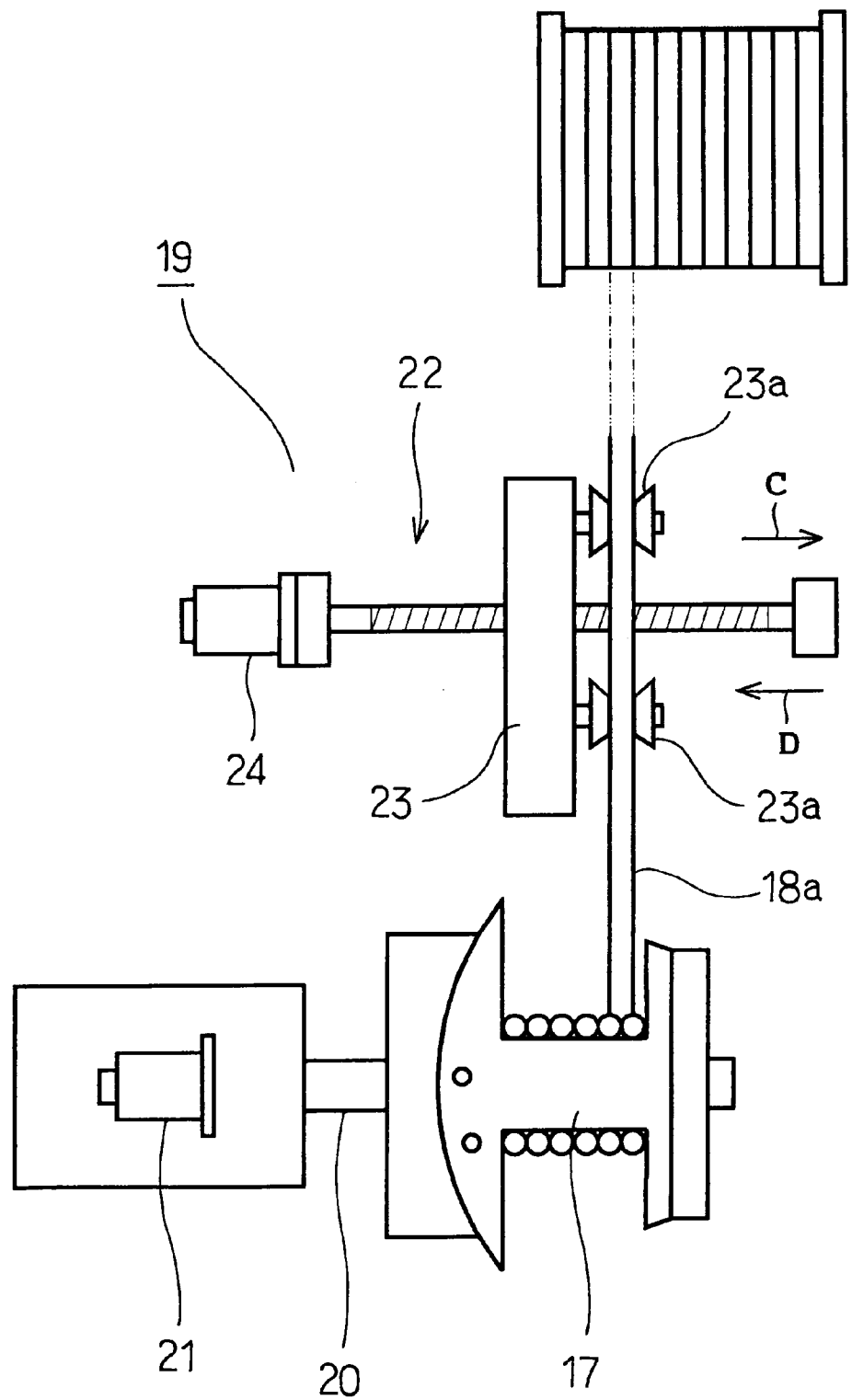
FIG. 6 is a schematic plan view of a coil winder.

The stator coil 18 is wound in the following manner. Referring to FIG. 4, a section of the wound coil 18 is shown. The coil 18 is wound so that an outermost face of the wound coil layer is inclined at an angle of 60 degrees to the bottom of the winding drum 17a. FIG. 6 illustrates a coil winding machine 19 for winding the coil 18. The coil winding machine 19 comprises a coil winding shaft 20 and a drive motor 21 for driving the coil winding shaft 20. The bobbin 17 is attached to the coil winding shaft 20. The coil winding machine 19 further comprises a feed mechanism 22 including a feed guide 23 provided with guide rollers 23a and a feed motor 24 reversibly rotated so that the feed guide 23 is moved in the direction of arrow C or in the opposite direction of arrow D in parallel with the coil winding shaft 20 as shown in FIG. 6.

Figure 7:
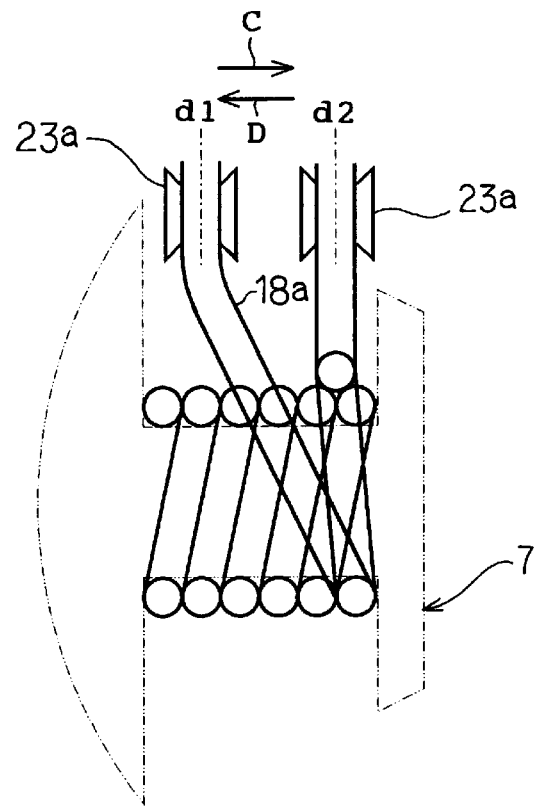
FIG. 7 is a schematic longitudinally sectional front view showing the winding of a magnet wire.
Figure 8:
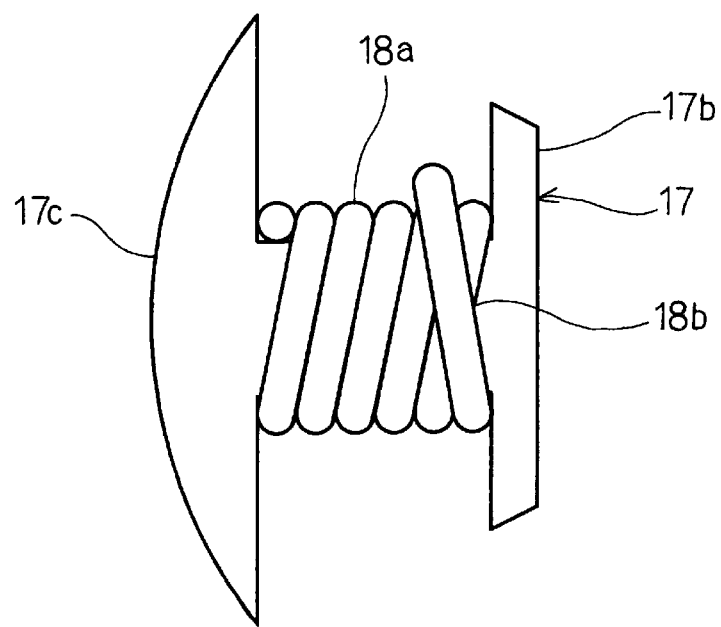
FIG. 8 is a schematic front view showing the winding of the magnet wire.

In the machine 19, the feed guide 23 is moved so that the magnet wire 18a is fed in the direction of arrow C or D, whereas the coil winding shaft 20 is rotated. A feed pattern of the magnet wire 18a includes a pitch feed pattern wherein the magnet wire 18a is moved at a pitch approximately same as the diameter of every one turn with the shaft 20 being stopped or reduced, and a lead feed pattern wherein the magnet wire 18a is moved at a pitch approximately same as the outer diameter of the magnet wire 18a for every one turn while the shaft 20 is in rotation. In the embodiment, the magnet wire 18a is wound in the pitch feed pattern for initial first and second turns and final first and second turns of the overall wound coil layer, and otherwise, the magnet wire 18a is wound in the lead feed pattern. The magnet wire 18a is wound in the following manner particularly when the wire is wound on the previously wound first layer (step-up), namely, when the magnet wire 18a is transferred from a winding location as shown by numeral 6 in FIG. 4 to a winding location 7, which is a first winding location of a second layer. That is, after the magnet wire 18a is wound to the winding location 6, the winding shaft 20 is stopped and the feed guide 23 is fed by three pitches in the direction of arrow D as shown in FIG. 7. The location of the feed guide 23 thus fed is shown by reference symbol d1 in FIG. 7. Subsequently, the shaft 20 is rotated within 90 degrees and then returned by 2 or 2.5 pitches in the direction of arrow C such that the feed guide 23 assumes a location d2 away from the winding location 6 by one or one half pitch in the direction of arrow D. Consequently, the portion of the magnet wire 18a corresponding to the winding location 7 is reliably positioned between the winding locations 5 and 6 of the first layer.

Furthermore, when the magnet wire 18a is transferred from the winding location 17 to the winding location 18 of the subsequent layer in FIG. 4, the wire is fed by two pitches in the direction of arrow D in the pitch feed pattern so that the magnet wire 18a is stepped up to a second turn. Thus, the coil 18 is wound so that the outermost face of the wound coil layer is inclined at an angle of 60 degrees to the bottom of the winding drum 17a. The outermost face is inclined in order that the number of turns of the coil may be increased without circumferential interference between the coils 18 in the completed state of the stator 11.

The coil 18 is stepped up to its short side at the flange 17b side and the flange 17c side (a short side of the drum 17a of the bobbin 17). The stepped up portions are shown by reference symbol 18b in FIGS. 5 and 8.

According to the above-described embodiment, each magnetic pole tooth 15 has the sidewise or circumferential protruding protrusions 16 at the distal end thereof. Consequently, since the magnetic flux is circumferentially uniformly distributed in the gap between the stator 11 and a rotor (shown by two dot chain line in FIG. 2), the motor characteristics can be improved, for example, the non-uniformity of the motor torque can be reduced.

The protrusions 16 prevent the insertion of each bobbin 17 into the corresponding magnetic pole tooth 15. This problem, however, can be solved in the following manner. The protrusions 16 are previously formed at the distal end of each magnetic pole tooth of the developed core so as to protrude in the direction of projection of each tooth during the manufacturing step of the developed core. In this state, each bobbin 17 can be fitted with the corresponding tooth 15. Since each bobbin 17 is fitted with the corresponding tooth 15 so as to pass the protrusions 16 and thereafter, the protrusions 16 are bent to project sidewise, each bobbin 17 can readily be fitted with the corresponding tooth 15 to thereby be prevented from falling off the tooth 15 at the same time. Consequently, the stator 11 can be manufactured without any problem.

Figure 9:
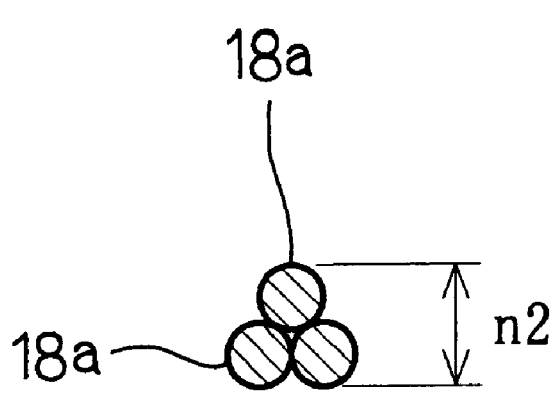
FIGS. 9 and 10 are partial sectional views of the magnet wire, showing the steps of different portions of the magnet wire respectively.

Furthermore, the magnet wire 18a is wound in the pitch feed pattern for the initial first and second turns and final first and second turns of each wound coil layer, and otherwise, the magnet wire 18a is wound in the lead feed pattern. Accordingly, the magnet wire 18a is wound without gap and in a row in all the wound coil layers. This improves a space factor and accordingly, the motor efficiency. Since the magnet wire 18a is wound in a row without gap particularly in the first wound coil layer, the magnet wire enters the concave portions between the turns of the wound magnet wire in the winding of the subsequent wound coil layer as shown in FIG. 9. Consequently, the magnet wire 18a can be wound in a row without gap in all the layers. The winding drum of each bobbin is conventionally formed with semi-circular grooves so that the turns of the magnet wire is in a row. However, this complicates the manufacture of the bobbins and cannot cope with the case where the outer diameter of the magnet wire has been changed. In the foregoing embodiment, the first wound coil layer can be wound in a row without gap by the above-described step-up method. Thus, the foregoing embodiment requires no grooves in each bobbin and can cope with the a case where the outer diameter of the magnet wire has been changed.

Figure 10:
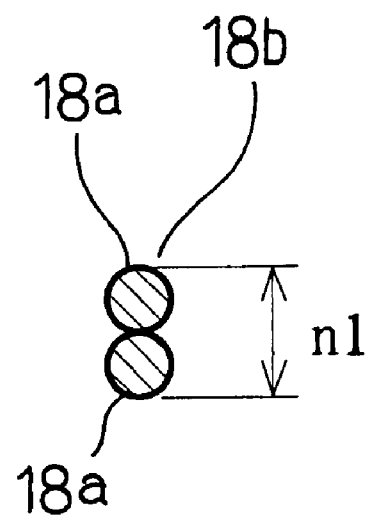

Furthermore, the coil 18 is stepped up or transferred to the subsequent layer at the short side thereof where the wound coils are not adjacent to each other. This can prevent interference of the wound coils resulting from expansion due to the step-up. That is, the overlapped portions are as shown in FIG. 10 when the magnet wire 18a is stepped up to the subsequent layer. The other portions are overlapped as shown in FIG. 9. The relation between the thickness n2 of the overlapped portions in FIG. 9 and the thickness n1 of the overlapped portions in FIG. 10 is shown by n2<n1. Although the coil interference would take place when the step-up of the coil resulting in the portion shown in FIG. 10 is carried out at the long side of the wound coil, this inconvenience can be prevented in the foregoing embodiment.

In the embodiment, as described above, the magnet wire 18a is wound in the pitch feed pattern for the initial first and second turns and final first and second turns of each wound coil layer, and otherwise, the magnet wire 18a is wound in the lead feed pattern. However, the magnet wire may be wound in the pitch feed pattern at the beginning of the winding of the magnet wire 18a and otherwise, the magnet wire may be wound in the lead feed pattern. In this case, too, the turns of the magnet wire 18a can be wound in a row.

Furthermore, the entire first wound coil layer may be wound in the pitch feed pattern. Consequently, since the magnet wire 18a is further wound in a row without gap, the space factor can be improved and accordingly, the motor efficiency can be improved. Additionally, the first wound coil layer of the magnet wire 18 can reliably be wound in a row.

Figure 11:
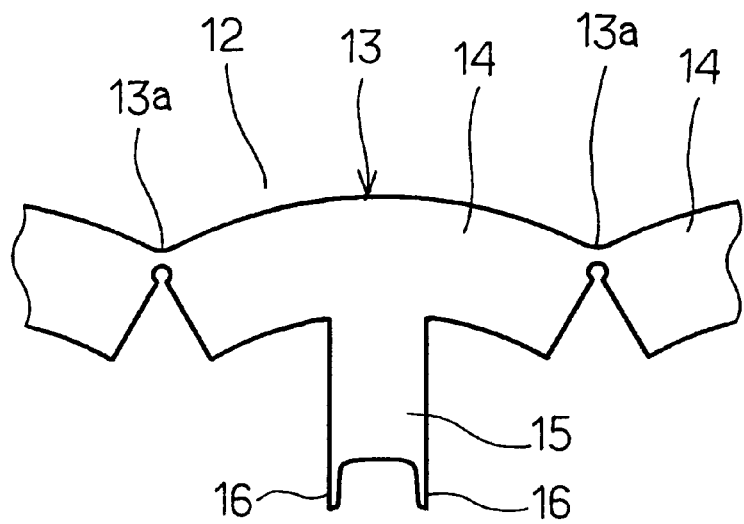
FIGS. 11 and 12 are partial plan views of the stator of a second embodiment in different manufacturing steps.
Figure 12:
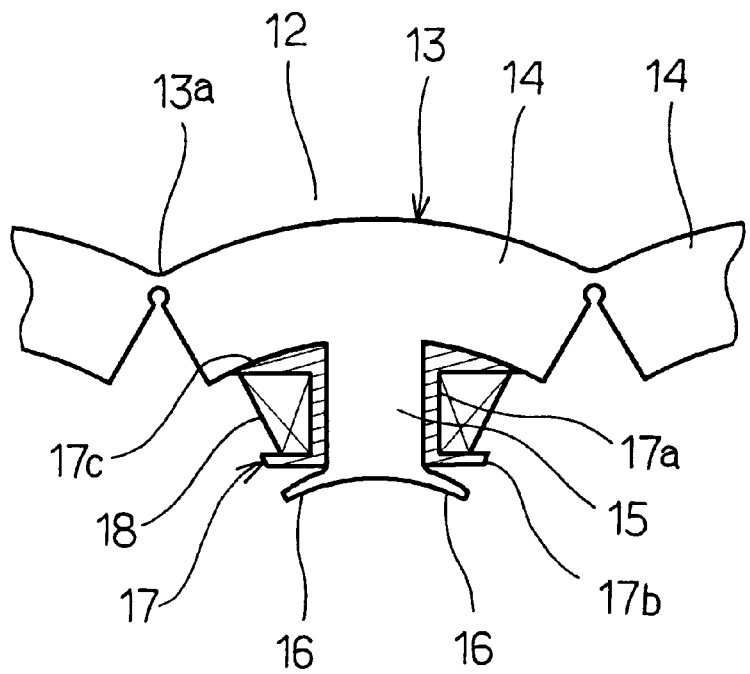

FIGS. 11 and 12 illustrate a second embodiment of the present invention. The V-shaped recesses 16a formed in the respective protrusions 16 in the first embodiment are eliminated in the second embodiment. The other construction of the stator in the second embodiment is the same as that in the first embodiment. Consequently, substantially the same effect can be achieved in the second embodiment as in the first embodiment.

Figure 13:
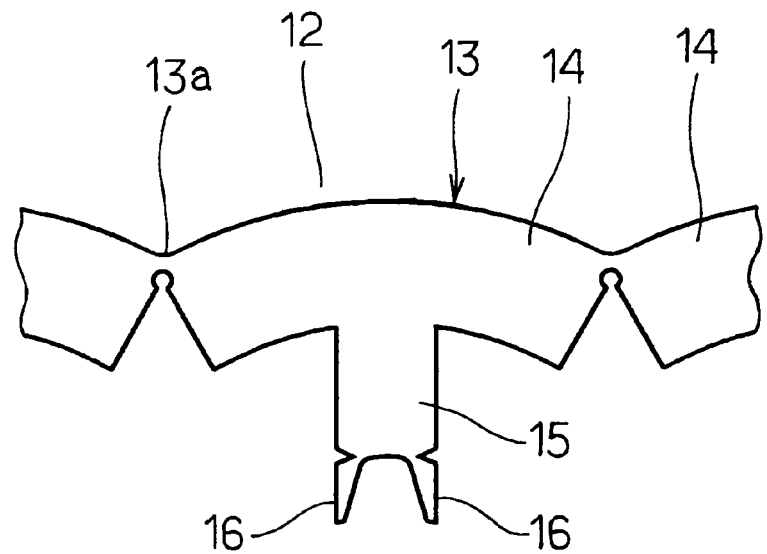
FIGS. 13 and 14 are partial plan views of the stator of a third embodiment in different manufacturing steps.
Figure 14:
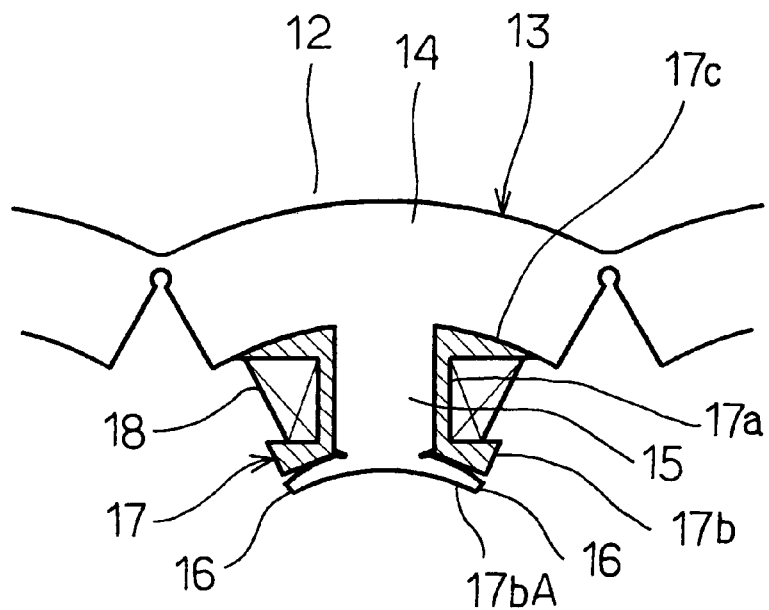

FIGS. 13 and 14 illustrate a third embodiment of the invention. In the third embodiment, each protrusion 16 is tapered when viewed axially with respect to the rotor. The flange 17b of each bobbin 17 has a rotor side face 17bA which is inclined to be curved over the entirety thereof. The protrusions 16 of each unit yoke 14 are expanded to be bent sidewise after each bobbin 17 has been fitted with the corresponding magnetic pole tooth 15. The protrusions 16 are rendered approximately arcuate by the inclined face 17bA of the flange 17b of each bobbin 17.

Figure 15:
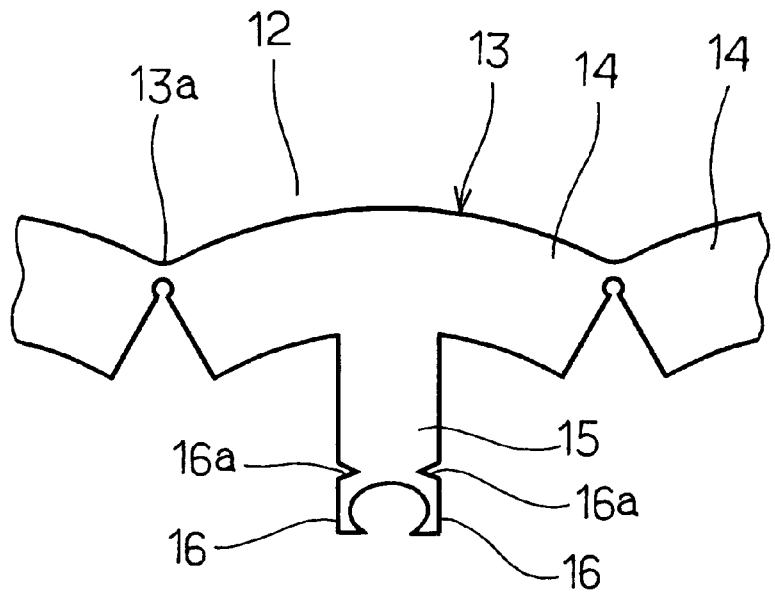
FIGS. 15 and 16 are partial plan views of the stator of a fourth embodiment in different manufacturing steps.
Figure 16:
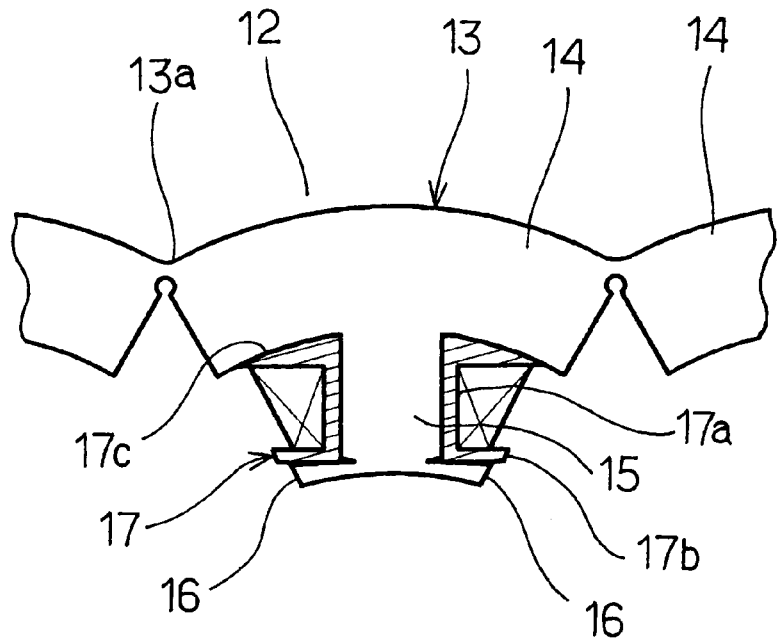

FIGS. 15 and 16 illustrate a fourth embodiment of the invention. The fourth embodiment differs from the first embodiment in that each of the protrusions 16 has an inner face previously formed into an arcuate shape such that a generally elliptic shape with a small curvature is formed in combination of the two protrusions. After each bobbin 17 has been fitted with the corresponding tooth 15, the protrusions 16 are expanded and then pressed against the flat flange 17b of the bobbin 17 such that the rotor side faces of the protrusions 16 are bent into an arcuate shape by themselves.

Figure 17:
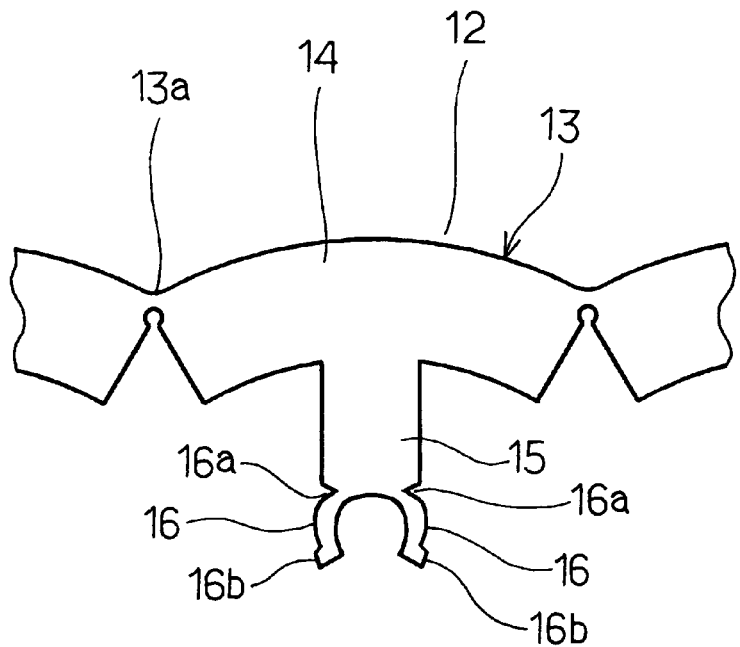
FIGS. 17 and 18 are partial plan views of the stator of a fifth embodiment in different manufacturing steps.
Figure 18:
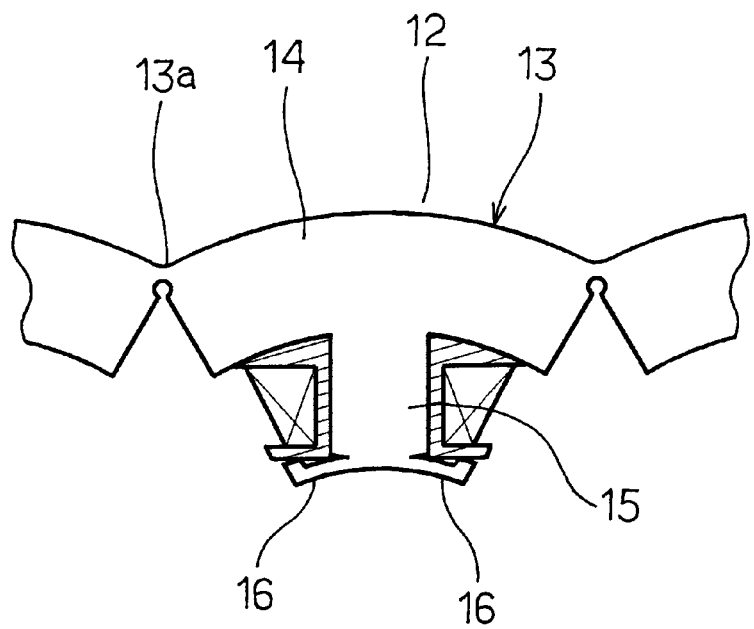

FIGS. 17 and 18 illustrate a fifth embodiment of the invention. The protrusions 16 form a generally elliptic shape in their opposite state and have abutting projections 16b previously formed on the distal ends thereof respectively. In the fifth embodiment, too, the protrusions 16 are bent into the arcuate shape by themselves when bent sidewise.

Figure 21:
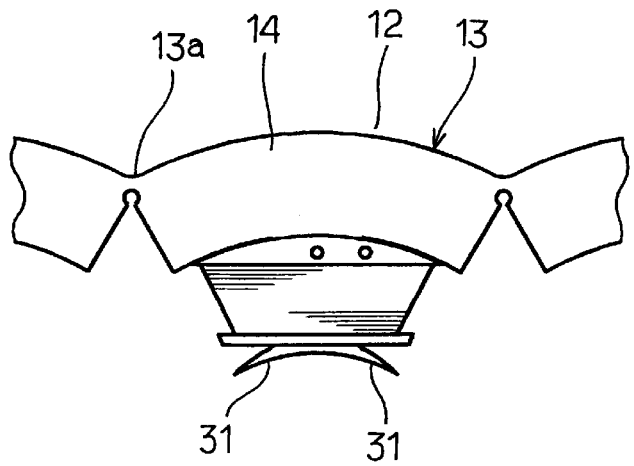
Figure 22:
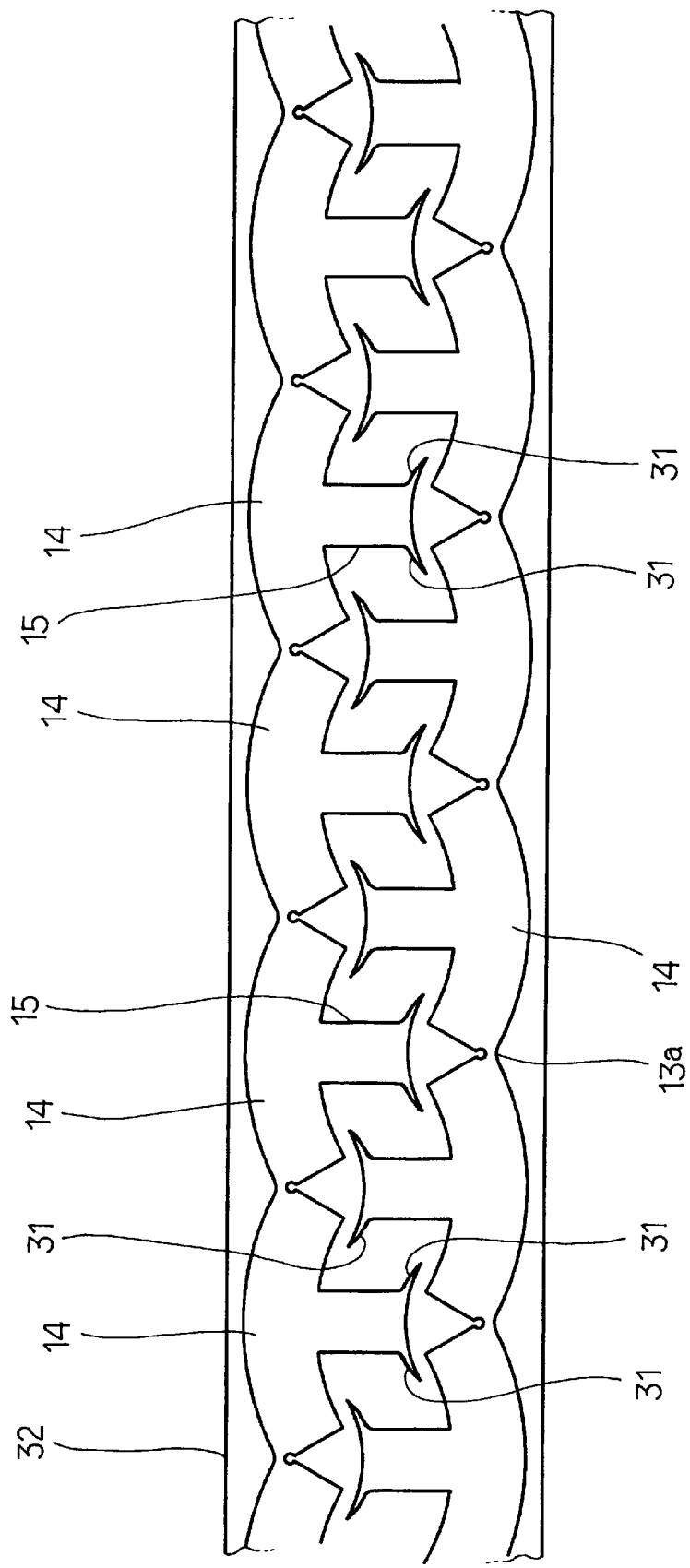
FIG. 22 is a plan view of the steel sheet, showing stamping of the developed core.

FIGS. 19 to 22 illustrate a sixth embodiment of the invention. Each magnetic pole tooth 15 of the developed core 12 has the protrusions 31 each of which is formed on the opposite sides of the distal end thereof at an initial stage of the manufacture so as to protrude circumferentially sidewise from the tooth 15. Thereafter, the protrusions 31 are bent in the direction of projection of the tooth 15 by a suitable former (not shown). Subsequently, each bobbin 17 is fitted with the corresponding tooth 15 so as to pass the protrusions 31 formed as described above. The protrusions 31 are bent sidewise. FIG. 21 shows the bobbin completely fitted with the tooth 15. The developed core 12 is then rounded and both ends thereof are connected together.

According to the sixth embodiment, the protrusions 31 are formed on the opposite sides of the distal end thereof at the initial stage of the manufacture so as to protrude circumferentially sidewise from the tooth 15. As understood from FIG. 22, accordingly, the protrusions 31 are prevented from being elongated in the direction of projection of the tooth 15 when the unit yokes are formed on the steel sheet 32. Consequently, the yield of the steel sheet 32 can be improved in the punching.

Figure 19:
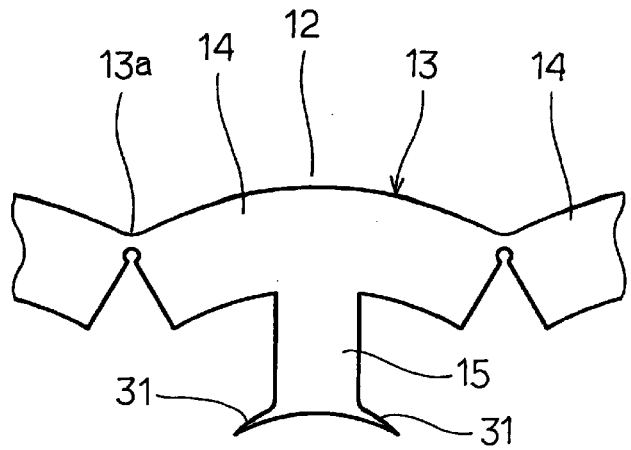
FIGS. 19 to 21 are partial plan views of the stator of a sixth embodiment in different manufacturing steps.
Figure 20:
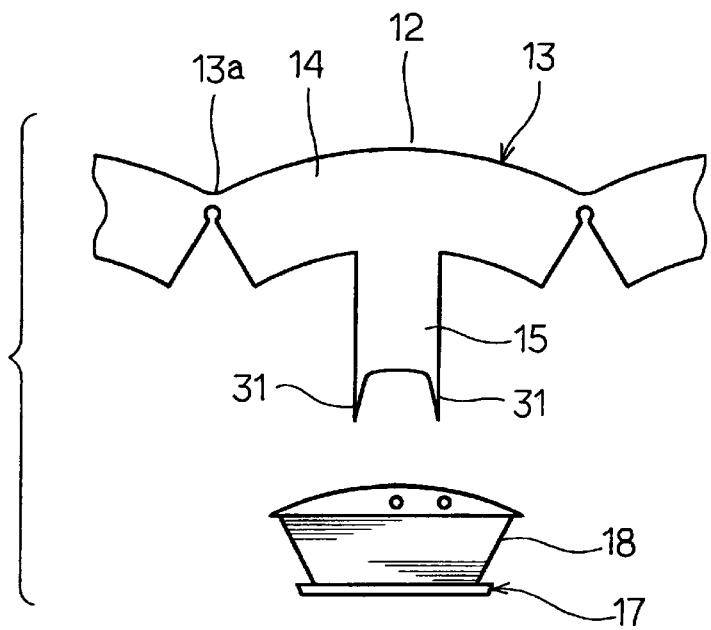

The protrusions 31 prevent the fitting of each bobbin 17 with the corresponding tooth 15 at a stage shown in FIG. 19. This poses a problem. In the sixth embodiment, however, the unit yokes 14 are stacked and the protrusions 31 are bent in the direction of projection of the tooth 15. Thereafter, each bobbin 17 is fitted with the corresponding tooth 15 so as to pass the protrusions 31. Consequently, the above-described problem can be overcome. Furthermore, each magnetic pole tooth 15 has the sidewise or circumferentially protruding protrusions 31 at the distal end thereof. Consequently, since the magnetic flux is circumferentially uniformly distributed in the gap between the stator and the rotor, the motor characteristics can be improved, for example, the non-uniformity of the motor torque can be reduced.

Figure 23:
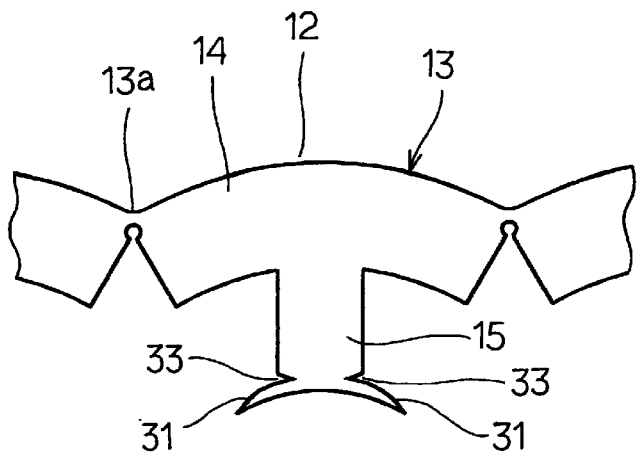
FIGS. 23 to 25 are partial plan views of the stator of a seventh embodiment in different manufacturing steps.
Figure 24:
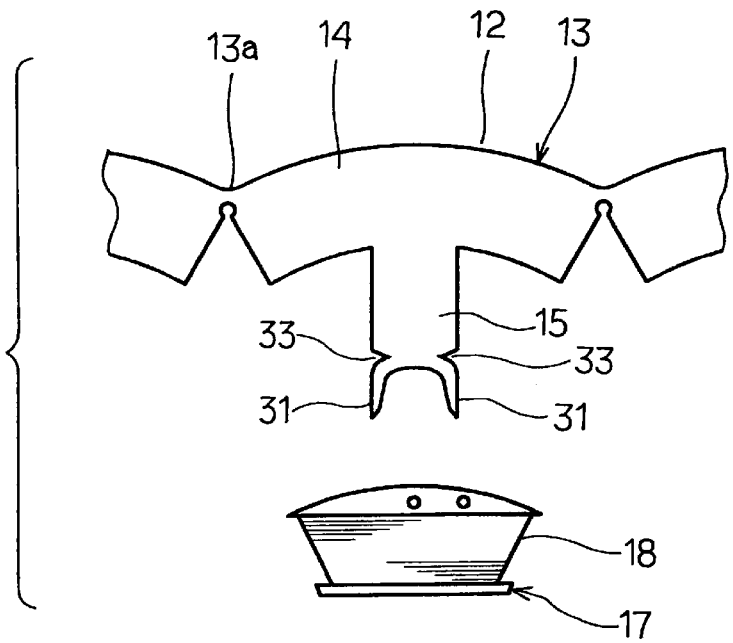
Figure 25:
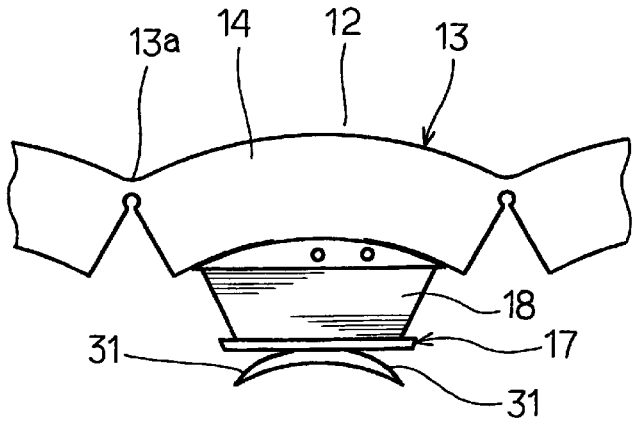

FIGS. 23 to 25 illustrate a seventh embodiment. The seventh embodiment differs from the sixth embodiment in that two notches 33 are formed in the boundary between the protrusions 31 and each magnetic pole tooth 15 so as to correspond to the protrusions respectively at the initial stage of manufacture and subsequently, the protrusions 31 are formed to protrude circumferentially.

The following effect can be achieved from the seventh embodiment. Without the notches 33, when the protrusions 31 protruding circumferentially are bent in the direction of projection of the tooth 15, the protrusions would be difficult to bend such that the outer width between the protrusions 31 would be rendered larger than the width of the tooth 15, whereupon each bobbin 17 would be difficult to fit with the corresponding tooth 15. In the seventh embodiment, however, the notches 33 are formed in the boundary between the protrusions 31 and each magnetic pole tooth 15. Accordingly, since the protrusions 31 are desirably bent at the joint portions thereof, the outer width between the protrusions 31 can be prevented from being rendered larger than the width of the tooth 15, and each bobbin 17 can reliably be fitted with the corresponding tooth 15.

Figure 26:
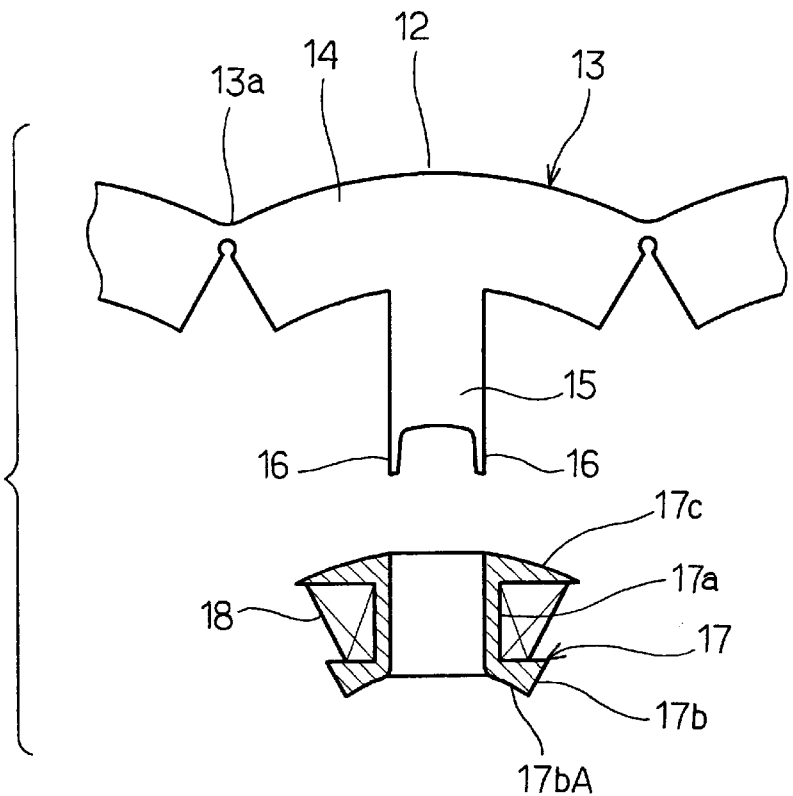
FIGS. 26 and 27 are partial plan views of the stator of an eighth embodiment in different manufacturing steps.
Figure 27:
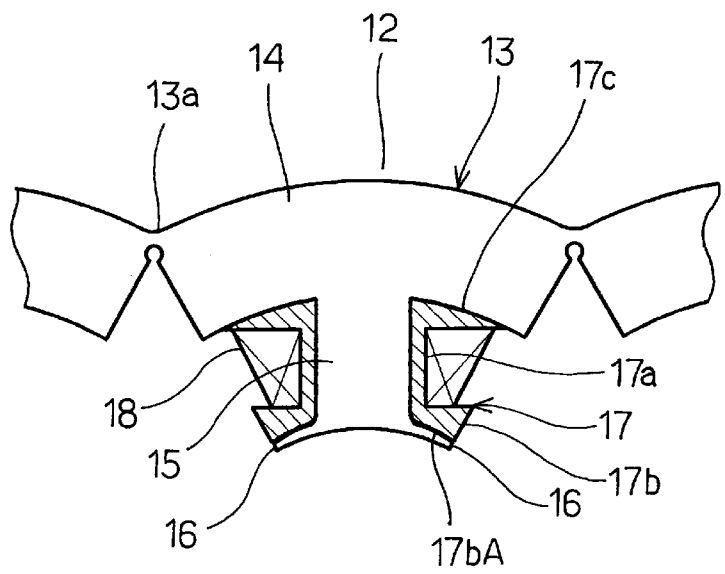
Figure 28:
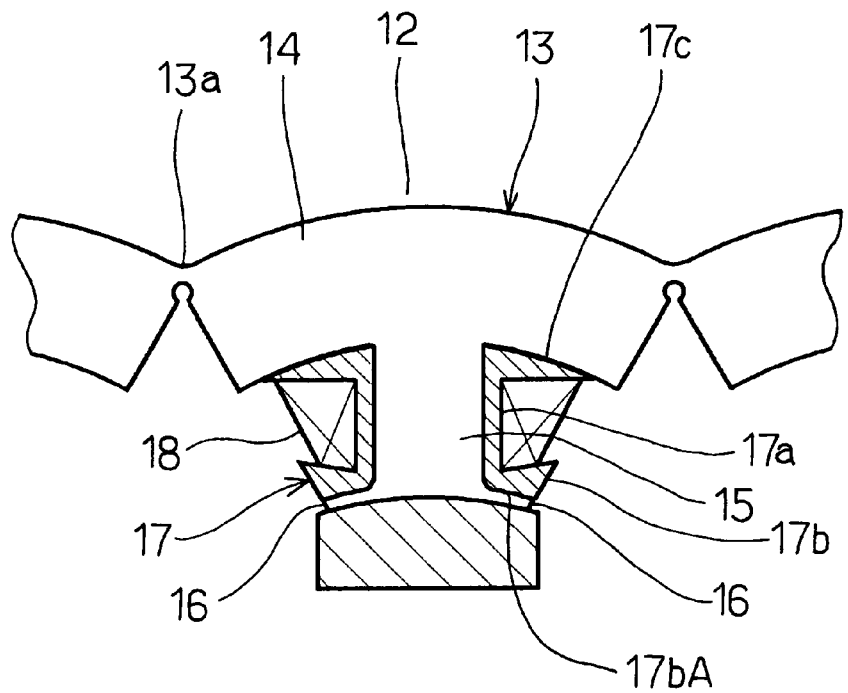
FIGS. 28 and 29 are partial plan views of the stator of a ninth embodiment in different manufacturing steps.
Figure 29:
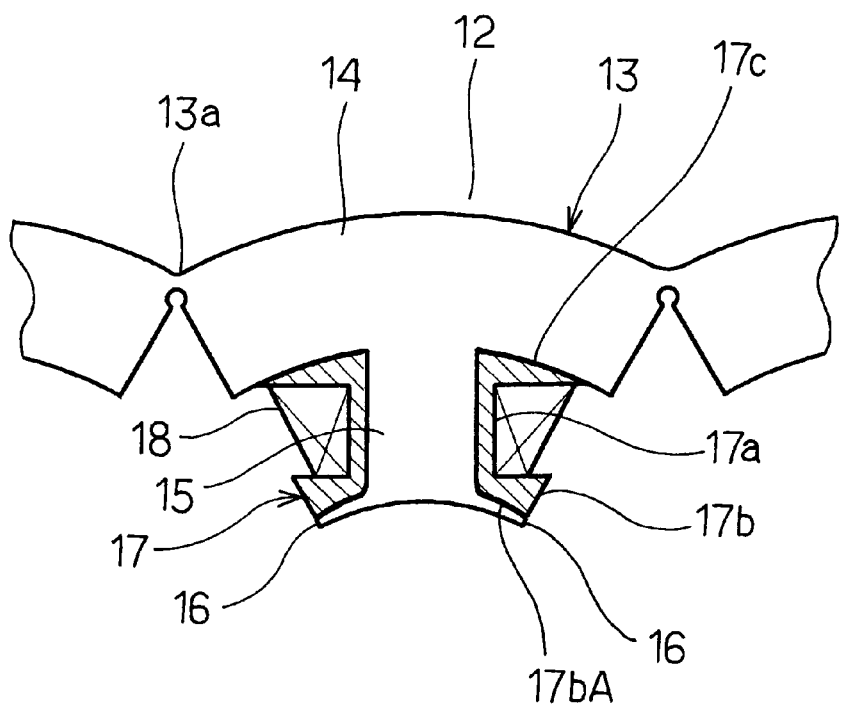
Figure 30:
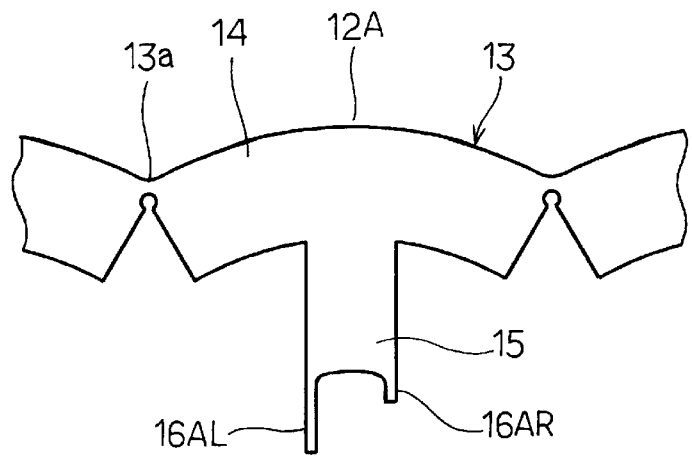
FIGS. 30 to 32 are partial plan views of the stator of a tenth embodiment in different manufacturing steps.
Figure 31:
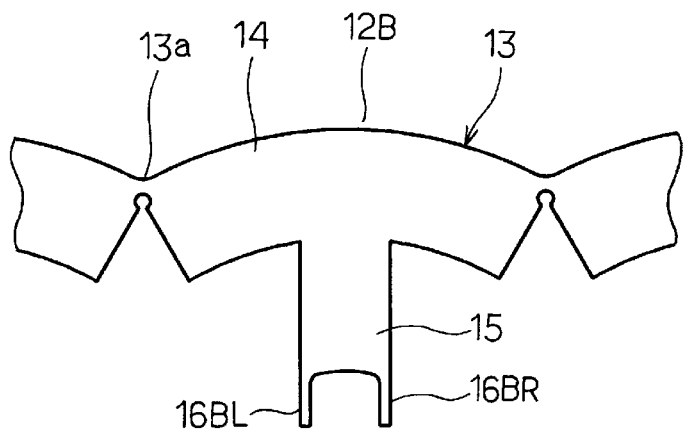
Figure 32:
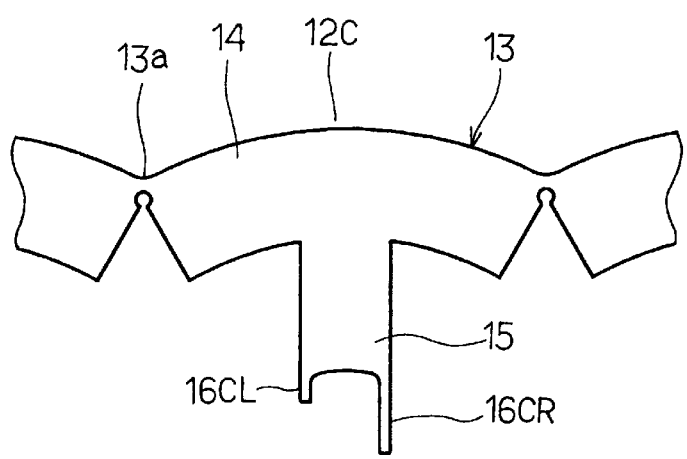

FIGS. 26 and 27 illustrate an eighth embodiment. The rotor side face 17bA of the flange 17b of each bobbin 17 is formed into an arcuate shape. After each bobbin 17 has been fitted with the corresponding magnetic pole tooth 15, the protrusions 16 are expanded and pressed against the arcuate face 17bA so as to be bent sidewise. Although substantially flat in its shape, each protrusion 31 is bent by the arcuate face 17bA into an accurate arcuate shape. In this case, the arcuate face 17bA of the flange 17b and each protrusion 31 may be bonded together. Furthermore, when the protrusions 16 are expanded and pressed against the arcuate face 17bA, the protrusions may excessively be thrust in so that a resultant springback renders the protrusions 16 arcuate, as shown in FIG. 28 as a ninth embodiment. FIG. 29 shows the completed form of the protrusions 16.

FIGS. 30 to 36 illustrate a tenth embodiment. First, second and third developed cores 12A, 12B and 12C are provided as the developed core 12 as shown in FIGS. 30 to 33. The first developed core 12A has a pair of protrusions 16AL and 16AR. The protrusion 16AL is longer than the protrusion 16AR. The second developed core 12B has a pair of protrusions 16BL and 16BR. The protrusion 16BL is approximately as long as the protrusion 16BR and is set to have a length intermediate between the protrusions 16AL and 16AR. The third developed core 12C has a pair of protrusions 16CL and 16CR. The protrusion 16CL is shorter than the protrusion 16CR. The protrusion 16CL is as long as the protrusion 16AR, and the protrusion 16CR is as long as the protrusion 16AL.

Figure 33:
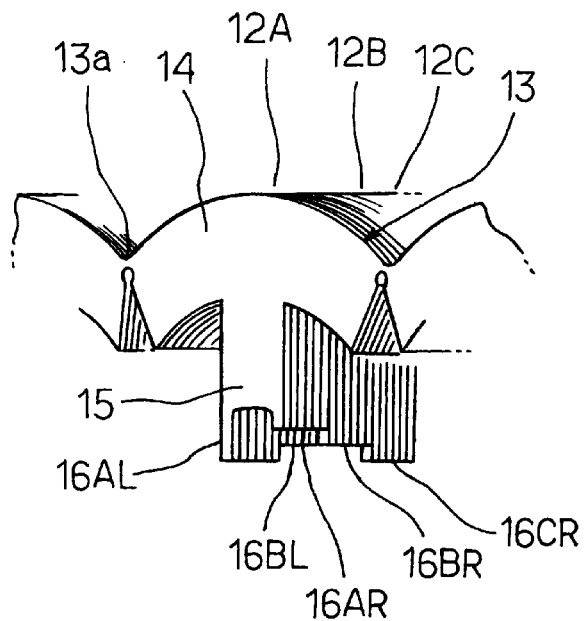
FIG. 33 is a partial perspective view of the developed core.
Figure 34:
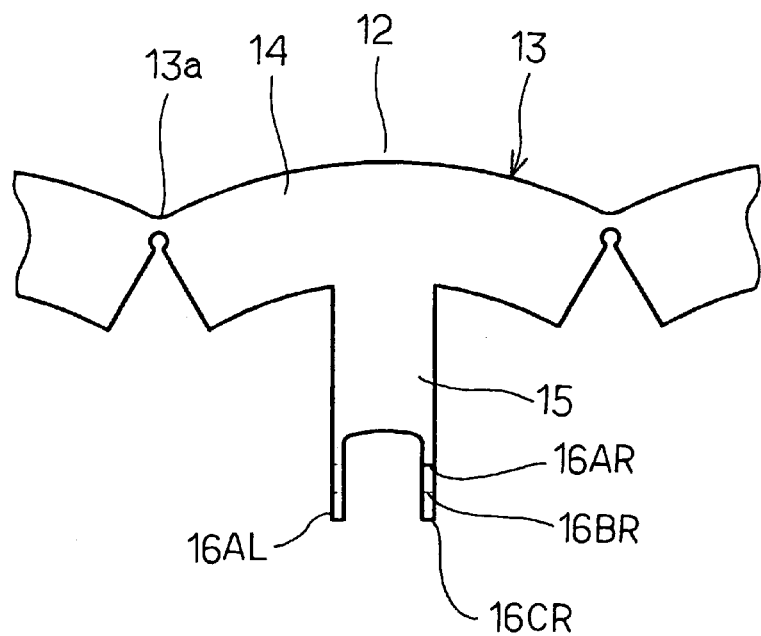
FIG. 34 is a plan view of the core shown in FIG. 33.
Figure 35:
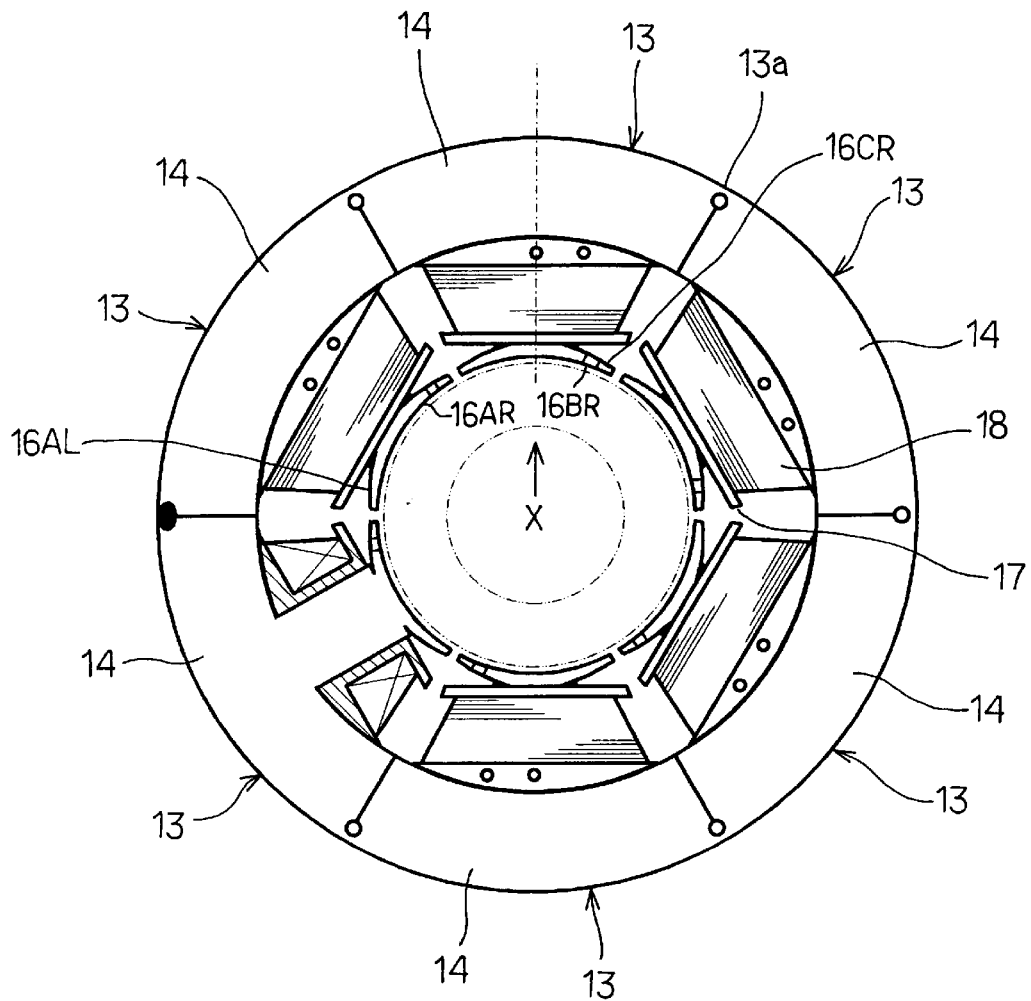
FIG. 35 is a plan view of the completed stator of the tenth embodiment.
Figure 36:
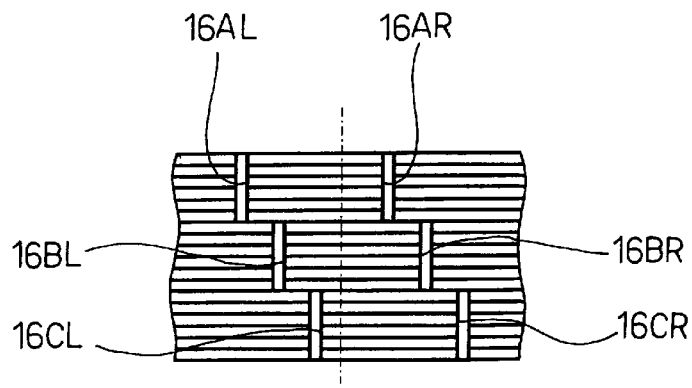
FIG. 36 is a view of the unit core taken as viewed in the direction of arrow X in FIG. 35.

The first, second and third developed cores 12A, 12B and 12C are axially stacked in this order as shown in FIGS. 33 and 34. Subsequently, after each bobbin 17 has been fitted with the corresponding magnetic pole tooth 15, the protrusions 16AL, 16AR, 16BL, 16BR, 16CL and 16CR are bent sidewise (circumferentially) by a suitable former (not shown) in the state shown in FIG. 34. The developed cores 12A, 12B and 12C are then rounded together and both ends of the cores are connected together as shown in FIG. 35. Consequently, the protrusions 16AL, 16AR, 16BL, 16BR, 16CL and 16CR are axially skewed stepwise as shown in FIG. 36 such that slots of the stator core are skewed.

Figure 37:
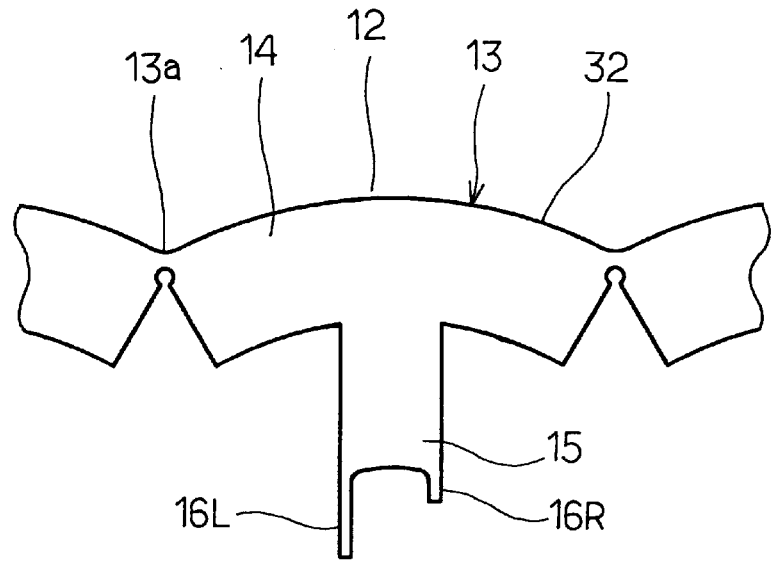
FIG. 37 is a partial plan view of the developed core of an eleventh embodiment.
Figure 38:
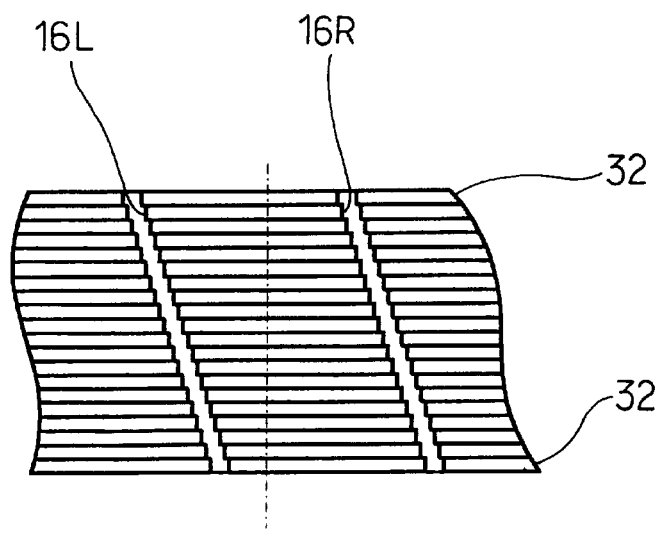
FIG. 38 is a view similar to FIG. 23, showing the stator of the eleventh embodiment.
Figure 39:
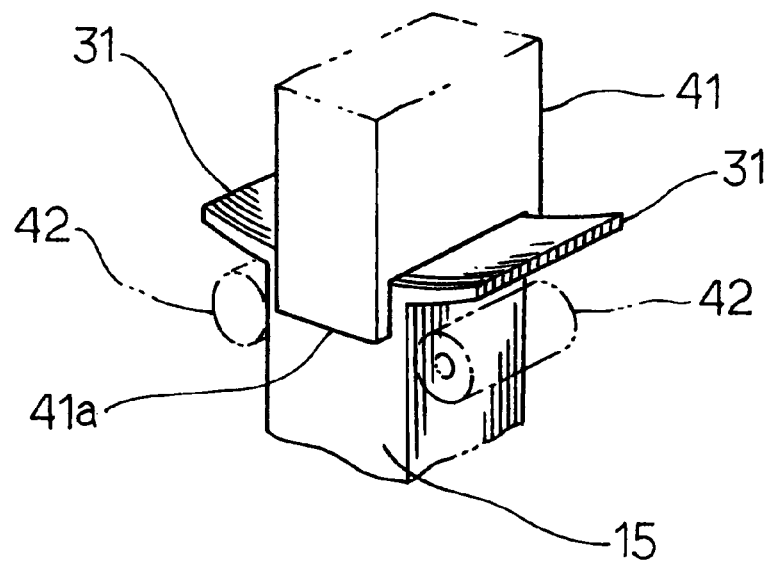
FIG. 39 is a perspective view of the magnetic pole tooth of the stator of a twelfth embodiment with a guide jig and forming jigs arranged therearound.
Figure 40:
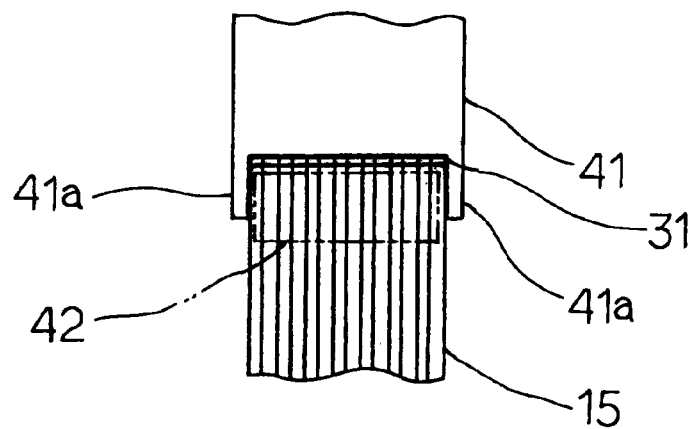
FIG. 40 is a side view of the magnetic pole tooth shown in FIG. 39.

FIGS. 37 and 38 illustrate an eleventh embodiment. The developed core 12 comprises a number of steel sheets 32 stacked one upon another. The steel sheets 32 have respective lengths different in the direction of stacking. Furthermore, the lengths of the protrusions 16L are set to sequentially become smaller in the direction of stacking, whereas the lengths of the protrusions 16R are set to sequentially become larger. Consequently, the slots of the stator core are continuously skewed.

FIGS. 39 to 43 illustrate a twelfth embodiment. The twelfth embodiment provides a manner of bending the protrusions 31 from the circumferentially protruding state to the bent state in the direction of projection of the magnetic pole tooth 15. A guide jig 41 is applied to the central distal end of the tooth 15. The guide jig 41 has two push portions 41a holding therebetween both side ends of the tooth 15 in the direction of stacking. Furthermore, a pair of forming jigs 42 each comprising a roller are applied to the both side ends of the tooth 15. A receiving jig 43 receives the outer diameter side face of the developed core 12.

The guide jig 41 is applied to the central distal end of the tooth 15, and both side ends of the tooth 15 are held between the push portions 41a. In this state, the forming jigs 42 are moved in the direction of arrows in FIG. 41 or in the direction of projection of the tooth 15 so that the paired protrusions 31 are brought down against both side faces of the guide jigs 41 respectively so that the protrusions 31 are bent in the direction of projection of the tooth 15.

The following effect can be achieved from the above-described construction. The forming jigs 42 are moved with the forming jigs 41 being applied to the central distal end of the tooth 15 so that the pair of protrusions 16 are brought down against both side faces of the guide jigs 41 respectively. Consequently, the protrusions 16 are desirably formed. Furthermore, since the outer width between the protrusions 16 is prevented from being larger than the width of the tooth 15, each bobbin 17 can be fitted with the corresponding tooth 15 without any problem. Additionally, since both ends of the tooth 15 are held between the push portions 41a of the tooth 15, the tooth can be prevented from being spread in the direction of stacking.

Figure 44:
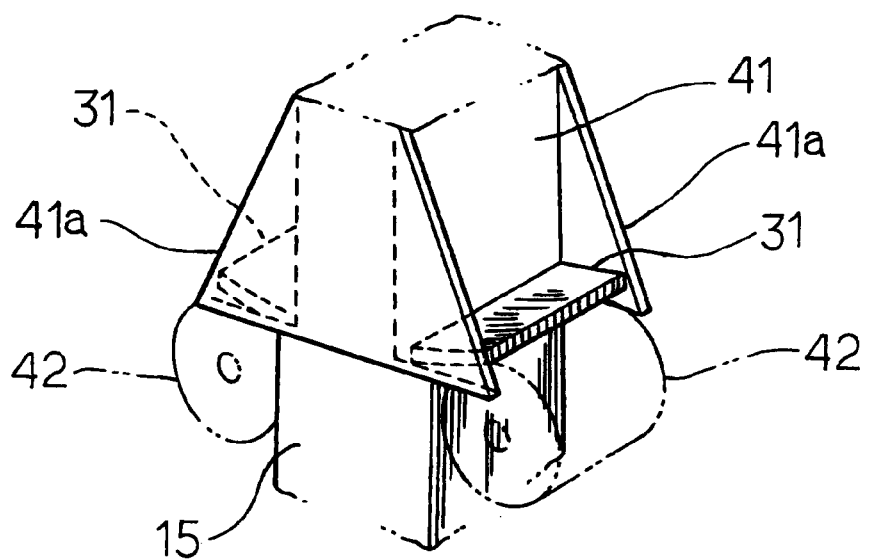
FIGS. 44 and 45 are perspective views of the magnetic pole tooth of the stator of a thirteenth embodiment, showing the forming steps by means of a guide jig and forming jigs.
Figure 45:
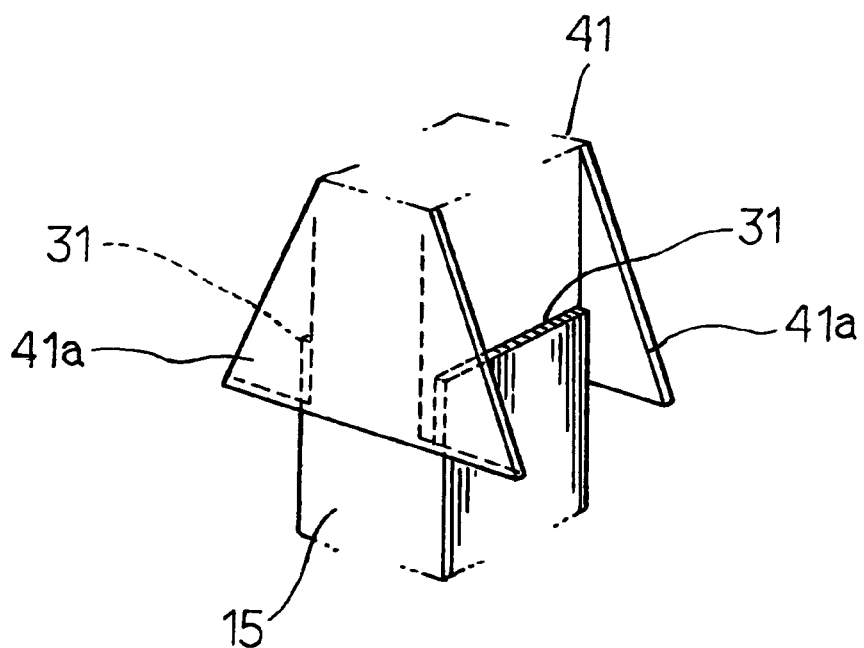

FIGS. 44 and 45 illustrate a thirteenth embodiment. In the thirteenth embodiment, the push portions 41a hold both side ends of the protrusions 31 in the direction of stacking as well as both ends of the tooth 15. Consequently, each tooth 15 and the protrusions 31 can be prevented from being spread in the direction of stacking.

Figure 46:
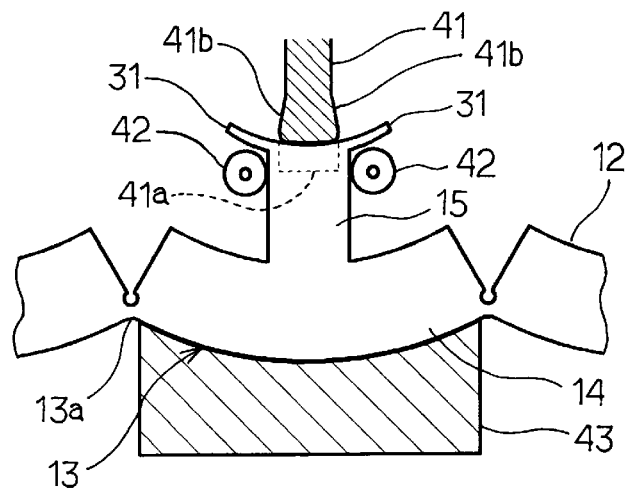
FIGS. 46 to 48 are views similar to FIGS. 44 and 45, showing a fourteenth embodiment.
Figure 47:
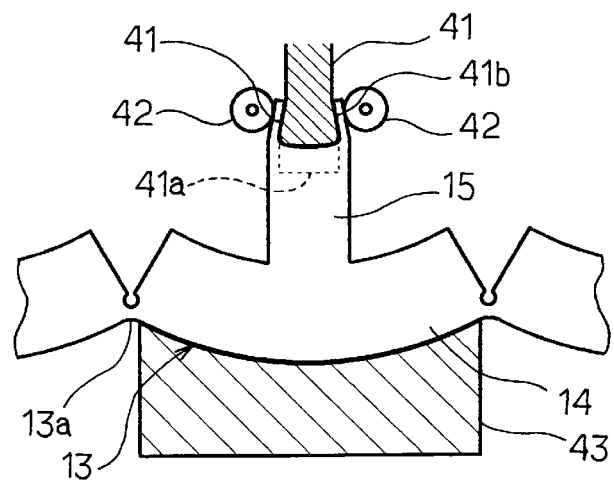
Figure 48:
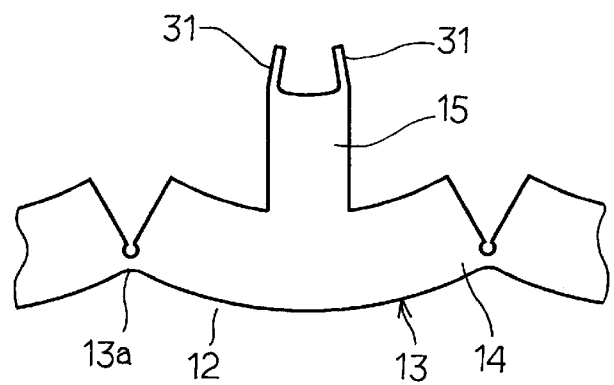
Figure 49:
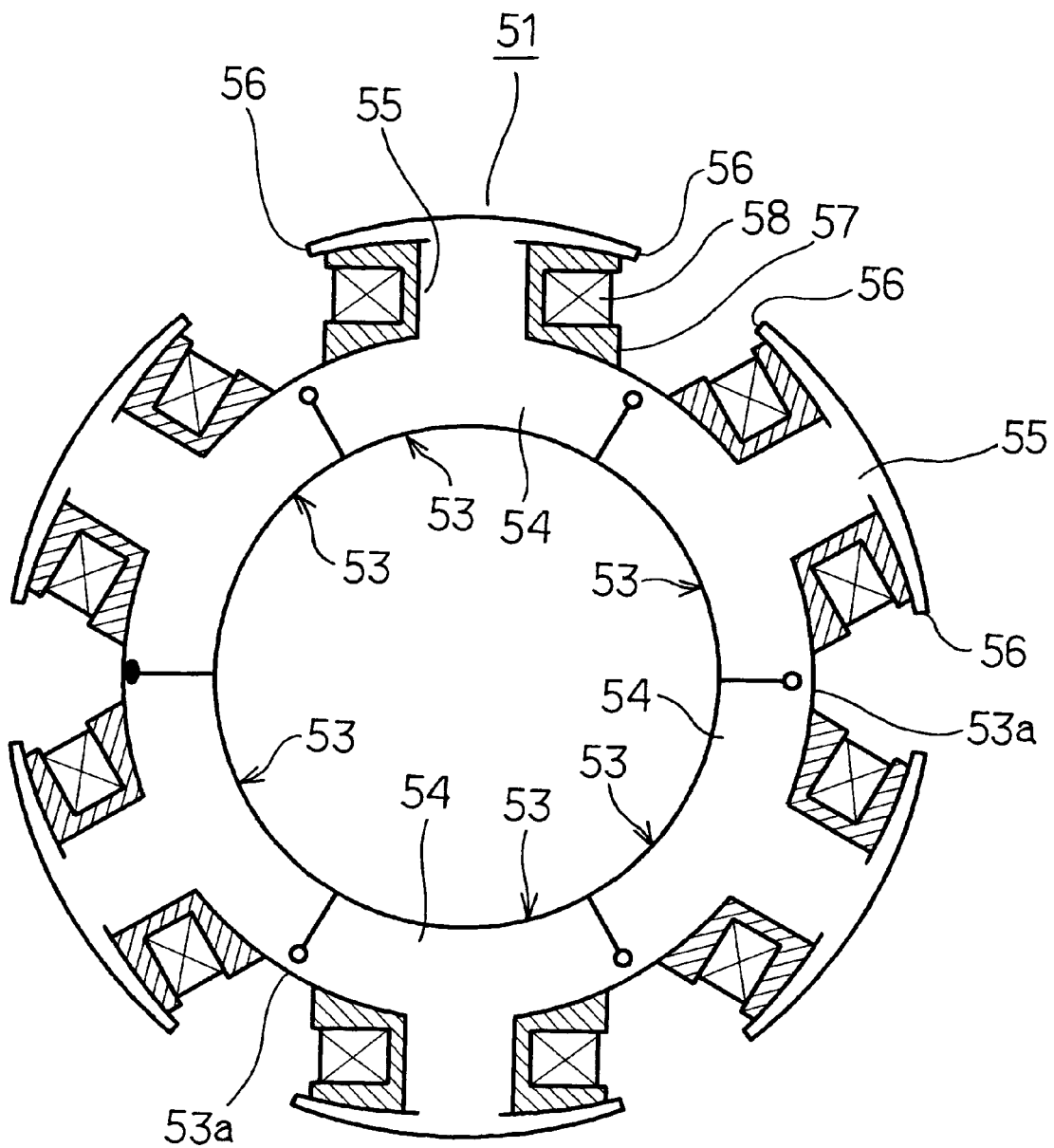
FIG. 49 is a plan view of the completed stator of a fifteenth embodiment.
Figure 50:
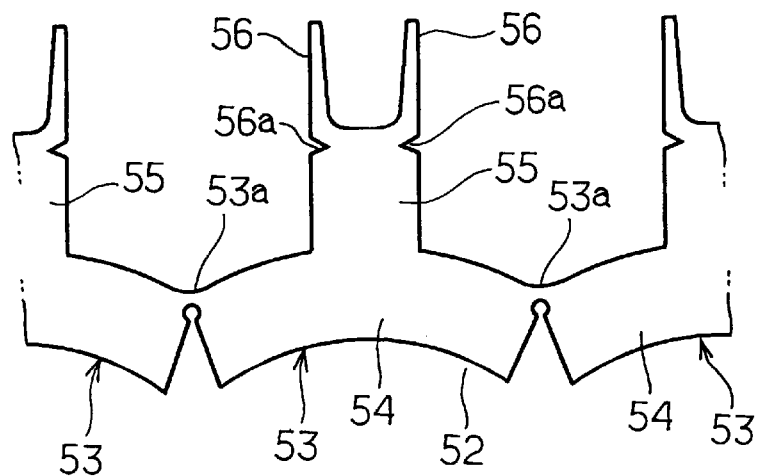
FIGS. 50 to 52 are partial plan views of the stator shown in FIG. 49, showing the different manufacturing steps.
Figure 51:
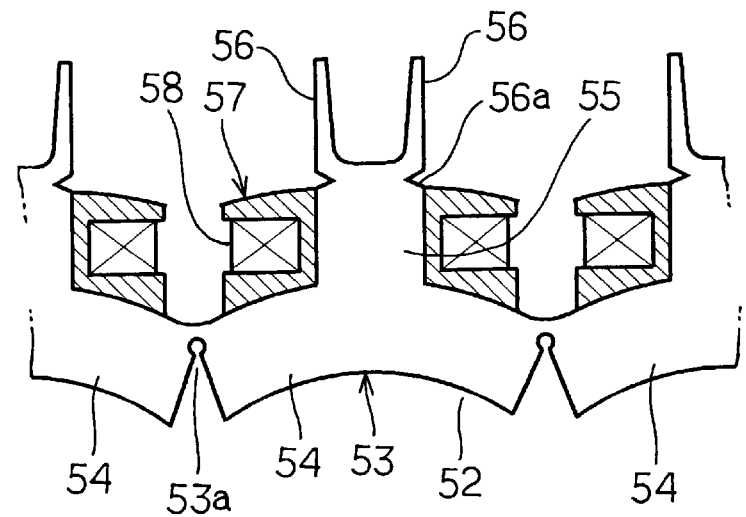
Figure 52:
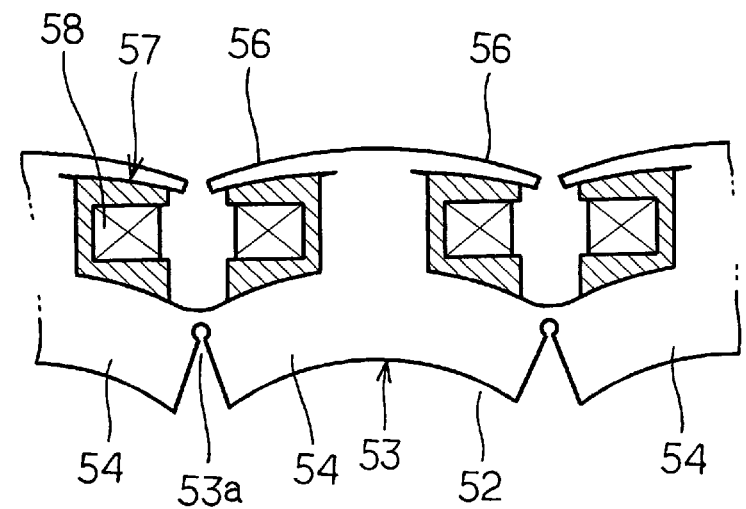
Figure 53:
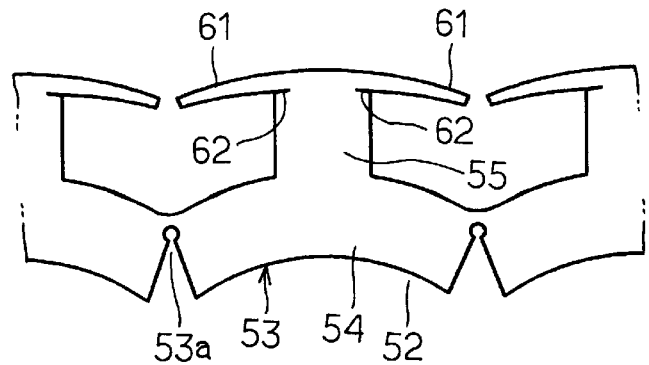
FIGS. 53 to 56 are views similar to FIGS. 50 to 52, showing a sixteenth embodiment.
Figure 54:
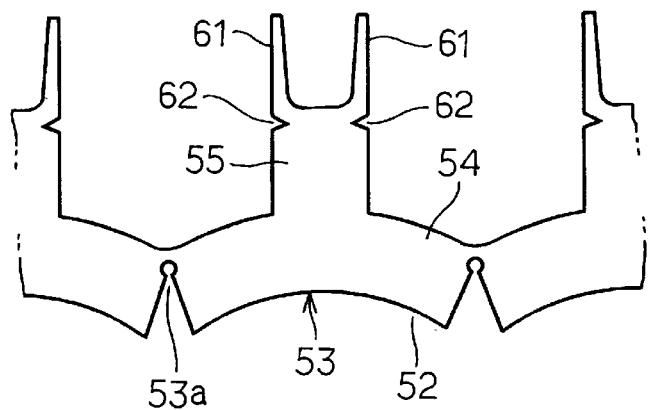
Figure 55:
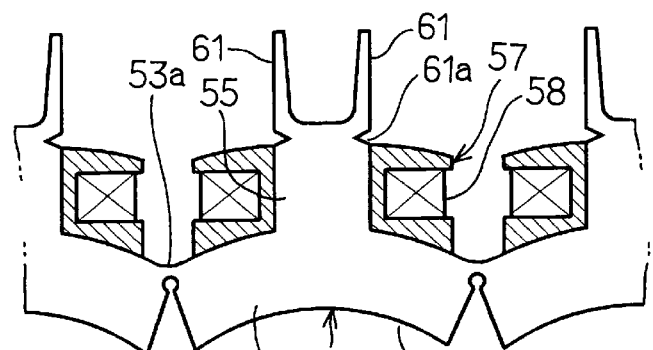
Figure 56:
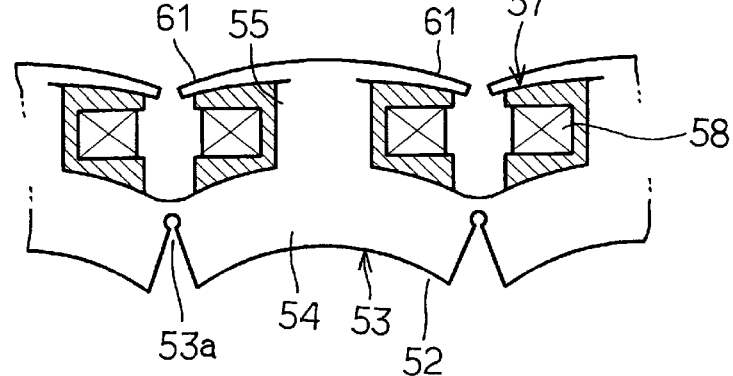
Figure 58:
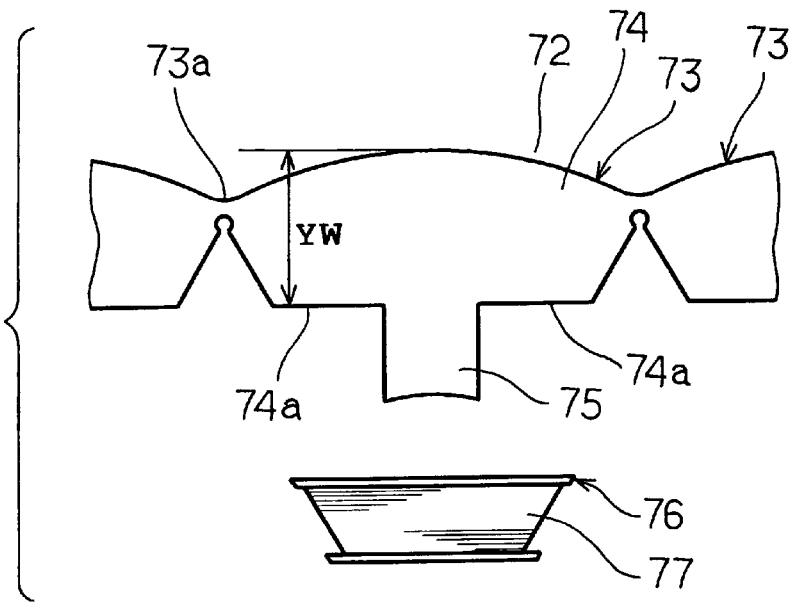
FIGS. 58 and 59 are partial plan views of the stator of the seventeenth embodiment, showing the different manufacturing steps.
Figure 59:
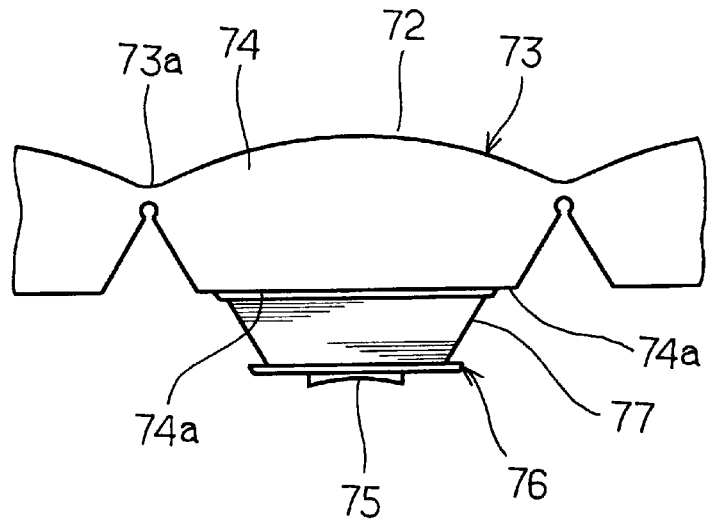

FIGS. 46 to 48 illustrate a fourteenth embodiment. The fourteenth embodiment differs from the twelfth embodiment in that the guide jig 41 is tapered so as to be gradually narrower in the direction of projection of the tooth 15. The tapered portions are represented by the reference symbol 41b. Consequently, the pair of protrusions 16 are bent so as to become narrower and accordingly, each bobbin 17 can readily be fitted with the corresponding tooth 15.

FIGS. 49 to 52 illustrate a fifteenth embodiment. The invention is applied to the stator 51 of a dynamoelectric machine of the outer rotor type. The developed core 52 includes six unit cores 53 connected to one another by the connecting portions 53a. Each unit core 53 comprises an arcuate unit yoke 54 and a magnetic pole tooth 55 formed integrally with the unit yoke 54 projecting from an inner circumferential face toward the center of rotation.

Each tooth 55 has a pair of protrusions 56 protruding from circumferential ends of a distal end thereof in the direction of projection of the tooth. Each protrusion 56 has a generally V-shaped recess 56a formed in a joint portion thereof. A bobbin 57 has a stator coil 58 wound thereon.

Each bobbin 57 is fitted with the corresponding tooth 55 so as to pass the protrusions 56. The protrusions 56 are pressed by an arcuate pressing face of a punch (not shown) so as to be bent sidewise. Consequently, the distal end of each tooth 55 and protrusions 56 form a continuous arcuate face. Thereafter, the developed core 52 is rounded and both ends of the developed core 52 are then connected together. As a result, a stator 51 is manufactured. The same effect can be achieved in the fifteenth embodiment as in the first embodiment though the invention is applied to the stator 51 for the dynamoelectric machine of the outer rotor type.

FIGS. 53 to 56 illustrate a sixteenth embodiment. Each magnetic pole tooth 55 of the developed core 52 has the protrusions 61 each of which is formed on the opposite sides of the distal end thereof at an initial stage of the manufacture so as to protrude sidewise from the tooth 55. Two notches 62 are also formed in the boundary between the protrusions 61 and each magnetic pole tooth 55 so as to correspond to the protrusions respectively at the initial stage of manufacture. Thereafter, the protrusions 61 are bent in the direction of projection of the tooth 55 by a suitable former (not shown). Subsequently, each bobbin 57 is fitted with the corresponding tooth 55 so as to pass the protrusions 61 formed as described above. The protrusions 61 are bent sidewise. FIG. 21 shows the bobbin completely fitted with the tooth 15. The developed core 12 is then rounded and both ends thereof are connected together.

According to the above-described construction, the same effect can be achieved in the sixteenth embodiment as in the sixth and seventh embodiments though the invention is applied to the stator for the dynamoelectric machine of the outer rotor type.

Figure 60:
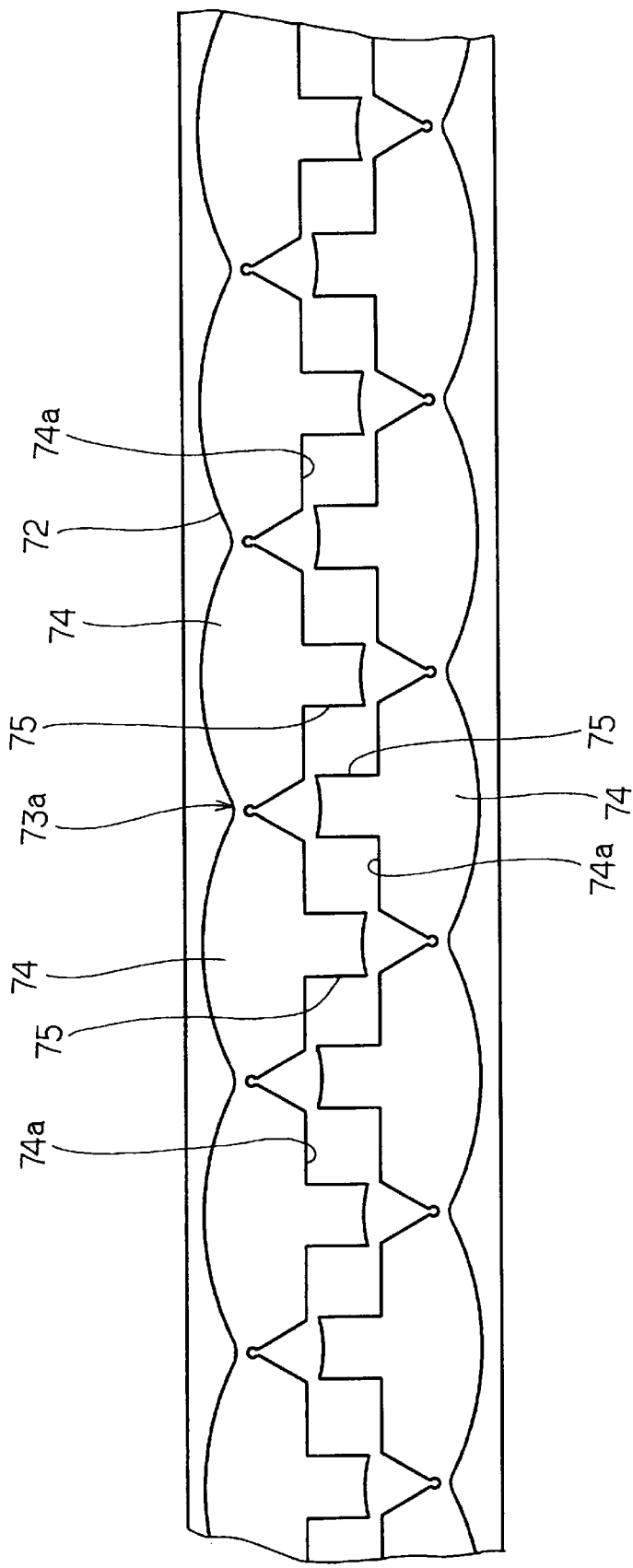
FIG. 60 is a plan view of the steel sheet, showing stamping of the developed core.

FIGS. 57 to 60 illustrate a seventeenth embodiment. The invention is applied to the stator 71 for the dynamoelectric machine of the inner rotor type. The developed core 72 includes six unit cores 73 connected to one another by the connecting portions 73a. Each unit core 73 comprises an arcuate unit yoke 74 and a magnetic pole tooth 75 formed integrally with the unit yoke 74 projecting from an inner circumferential face toward the center of rotation. A portion 74a of each unit yoke 74 in the vicinity of the joint portion of the tooth 75 is formed into a flat shape. FIG. 60 shows the steel sheet out of which the developed cores 72 are to be punched.

The bobbin 76 is fitted with each tooth 75 and has the coil 77 wound thereon. After each bobbin 76 is fitted with the corresponding tooth 75, the developed core 72 is rounded and both ends thereof are connected together. The stator 71 is thus manufactured.

Since each unit yoke 74 has the flat portion 74a in the vicinity of the joint portion of the tooth 75, a yoke width YW (see FIG. 58) is increased and accordingly, the sectional area of a portion where magnetic flux joins another magnetic flux to flow toward the tooth 75 is increased. Consequently, a required area of the yoke can be ensured without changes in the entire size of the stator and accordingly, the magnetic resistance can be reduced.

Figure 61:
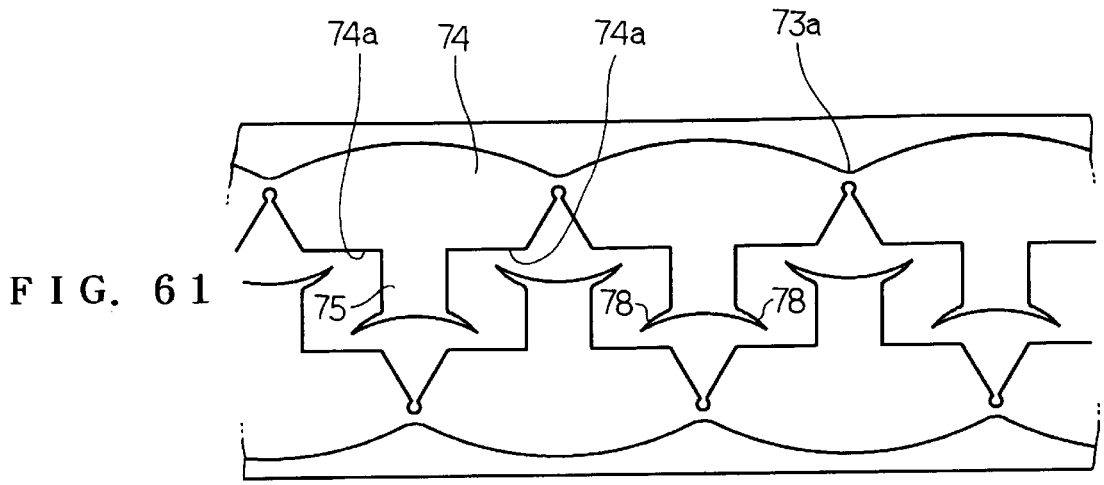
FIGS. 61 to 64 are partial plan views of the stator of an eighteenth embodiment, showing the different manufacturing steps.
Figure 62:
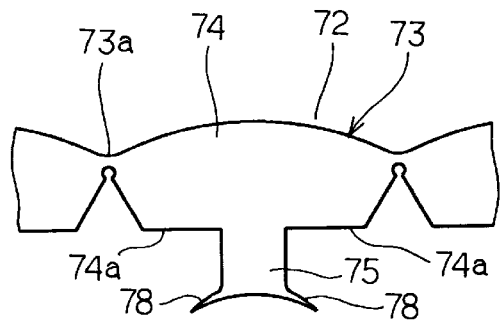
Figure 63:
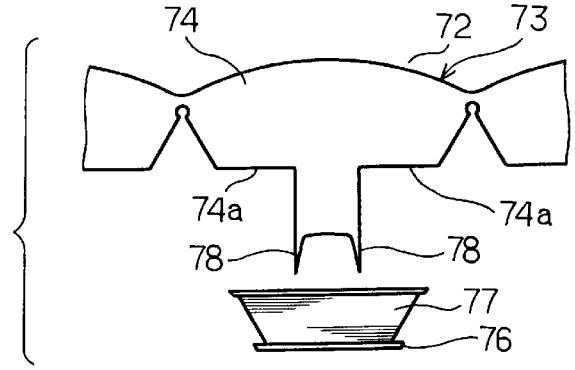
Figure 64:
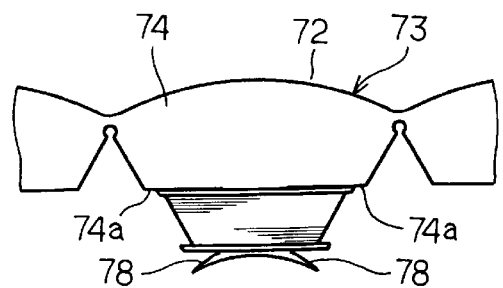

FIGS. 61 to 64 illustrate an eighteenth embodiment. The eighteenth embodiment differs from the seventeenth embodiment in that a pair of protrusions 78 are formed in the distal end of each magnetic pole tooth 75. In the eighteenth embodiment, the stator 71 is manufactured in the same manner as in the sixth embodiment (see FIGS. 19–22), as shown in FIGS. 62 to 64. FIG. 61 shows the steel sheet out of which the developed cores 72 are punched. Since the yoke width YW is increased in the eighteenth embodiment, the yield of the steel sheet can be improved in the punching as compared with the six embodiment, and uniformity of the magnetic flux can be enhanced.

Figure 65:
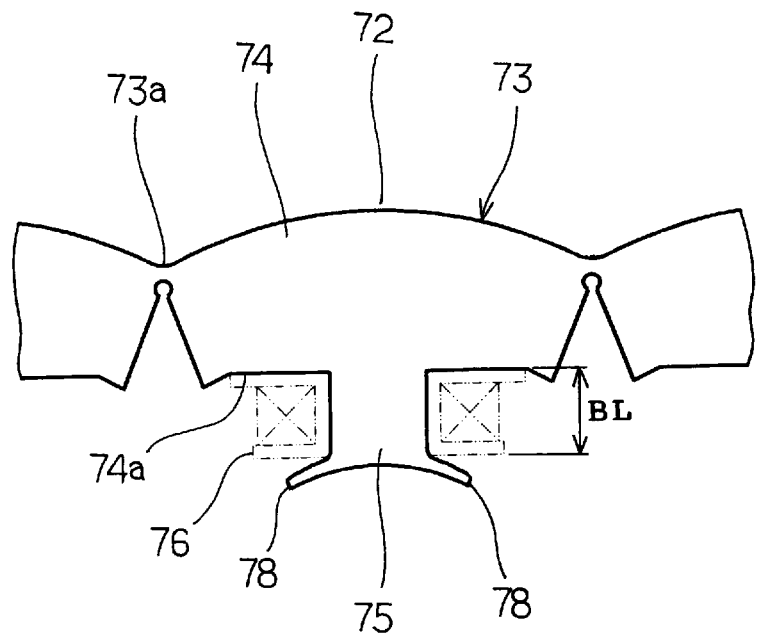
FIG. 65 is a partial plan view of the developed core of a nineteenth embodiment.

FIG. 65 illustrates a nineteenth embodiment. The portion 74a of each unit yoke 74 in the vicinity of the joint portion of the tooth 75 is formed into a flat shape. Arcuate portions slightly remain in both ends of the portion 74a respectively. The nineteenth embodiment is suitable for the case where each bobbin 76 has a larger length.

Figure 66:
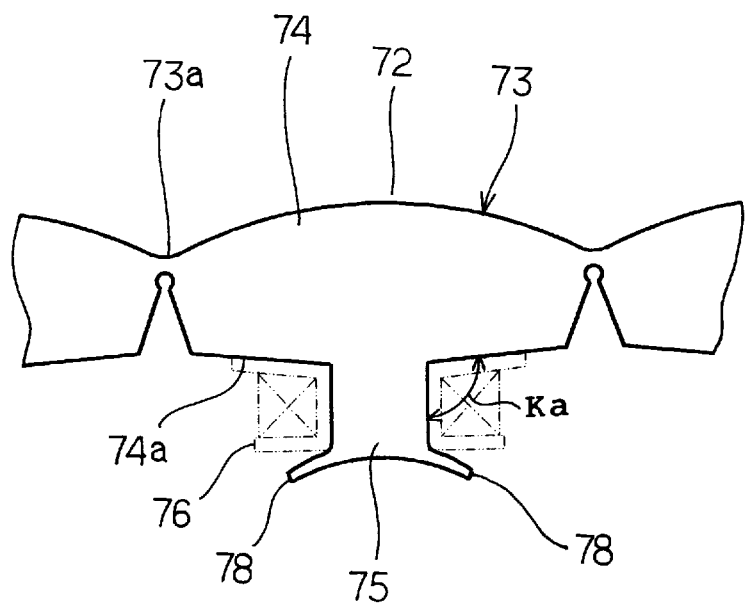
FIG. 66 is a partial plan view of the developed core of a twentieth embodiment.

FIG. 66 illustrates a twentieth embodiment. An angle Ka between the tooth 75 and the flat portion 74a is set at or above 90 degrees. As a result, the magnetic resistance can further be reduced.

Figure 67:
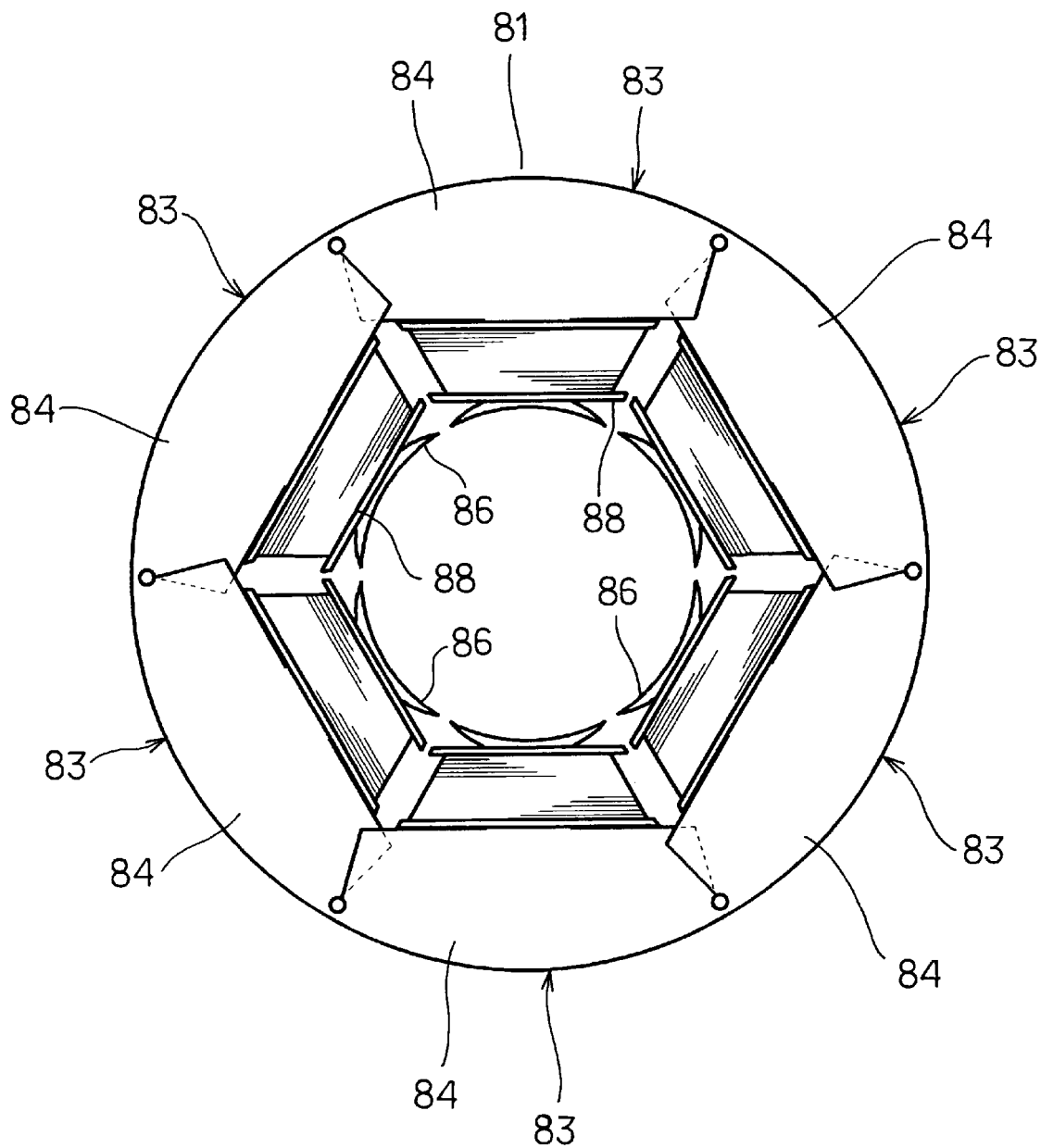
FIG. 67 is a plan view of the completed stator of a twenty-first embodiment.
Figure 68:
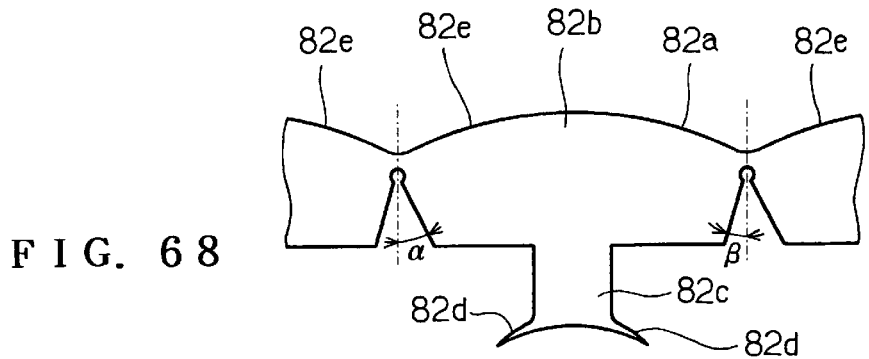
FIGS. 68 to 71 are partial plan views of the stator of the twenty-first embodiment, showing the different manufacturing steps.
Figure 69:
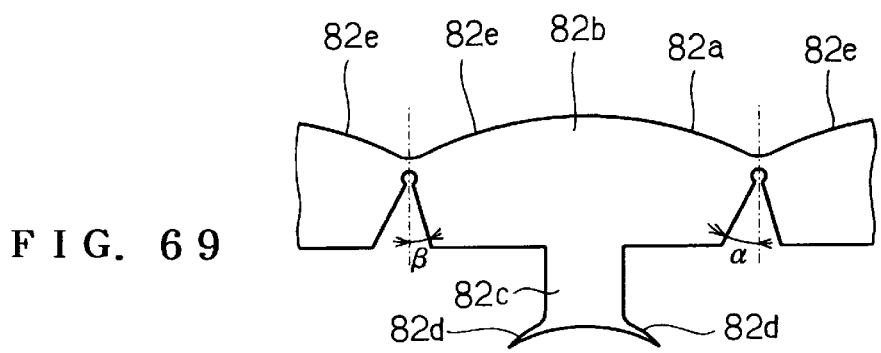
Figure 70:
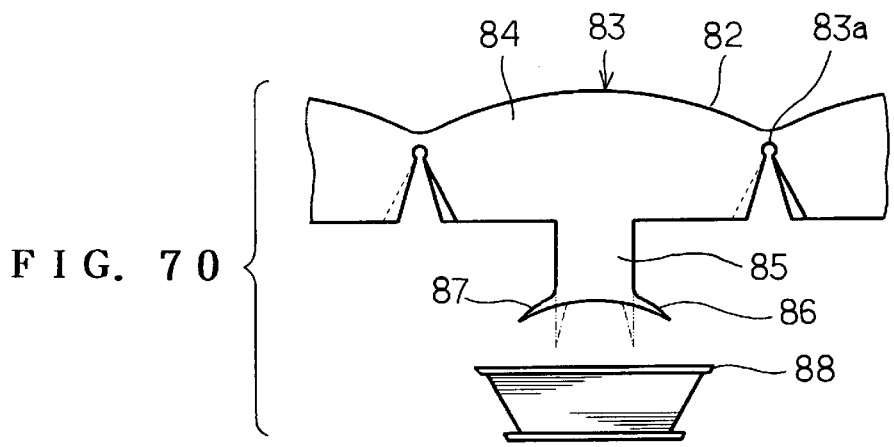
Figure 71:
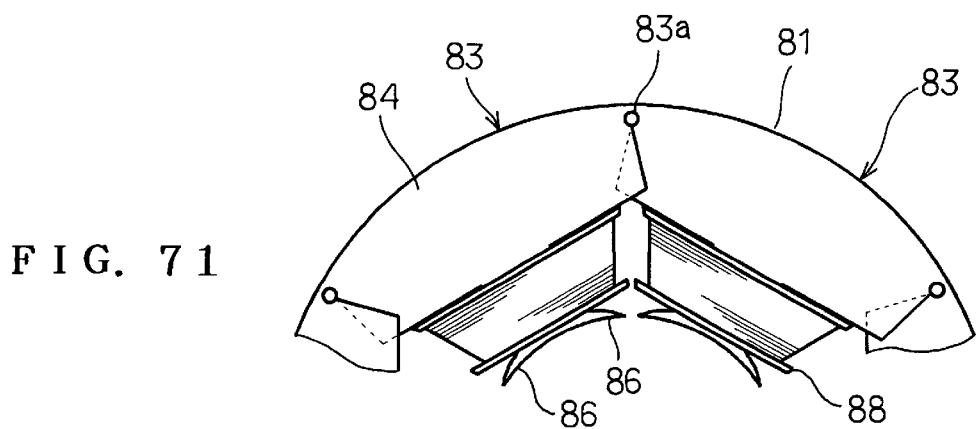
Figure 72:
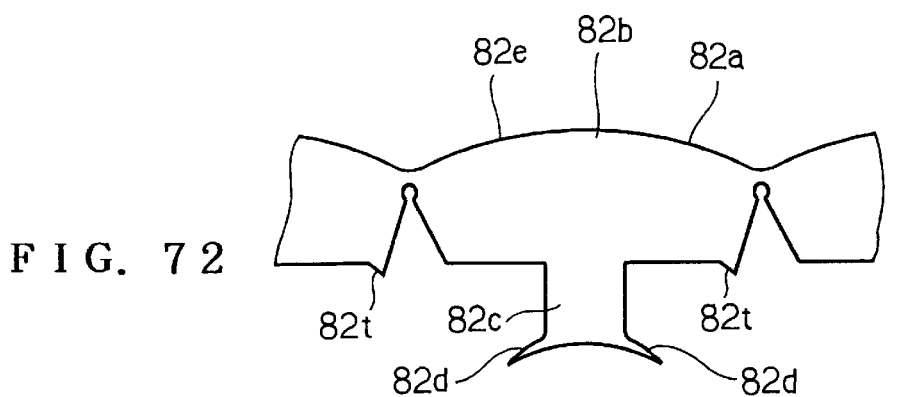
FIGS. 72 to 75 are partial plan views of the stator of a twenty-second embodiment, showing the different manufacturing steps.
Figure 73:
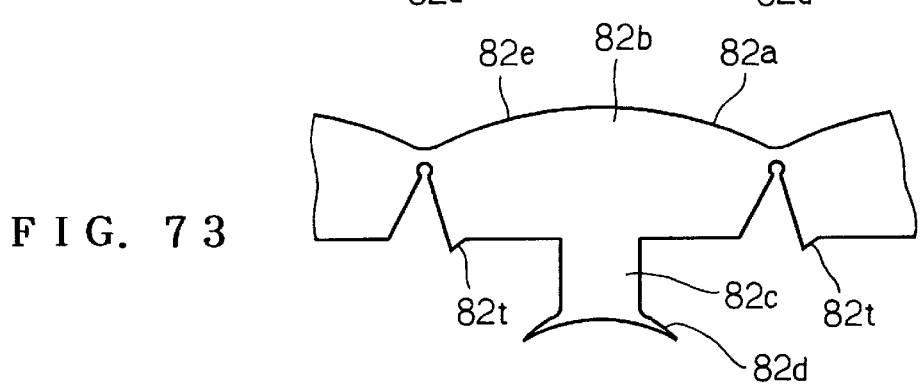

FIGS. 67 to 75 illustrate a twenty-first embodiment. The stator 81 shown in FIG. 67 is manufactured as follows. The developed core 82 shown in FIG. 70 is formed by stacking the steel sheets 82a one of which is shown in FIG. 68. Each steel sheet 82a includes unit core pieces 82e which are connected together and each of which comprises a unit yoke piece 82b, a magnetic pole tooth piece 82c and protrusion pieces 82d. In each steel sheet 82a, each unit yoke piece 82b is formed so that both side end faces have inclination angles (α and β) differing from each other. The steel sheets 82a are stacked with the sides thereof being reversed alternately, as shown in FIGS. 68 to 70, whereupon the ends of the unit cores 82e are overlapped with slippage.

Referring to FIG. 70, by stacking the steel sheets 82a, the developed core 82 is formed, and the unit cores 83, unit yokes 84, magnetic pole teeth 85, protrusions 86 and connecting portions 83a are formed. In the state shown in FIG. 70, the protrusions 86 are bent so as to protrude in the direction of projection of the tooth 85 as shown by two dot chain line. Thereafter, the bobbin 88 is fitted with the tooth 85 and the protrusions 86 are then bent sidewise. The developed core 82 is then rounded and both ends thereof are connected together.

According to the twenty-first embodiment, the steel sheets are stacked into the developed core 82 so that the ends of the unit cores 83 are overlapped with slippage. Accordingly, in the completed state of the stator 81, the ends of the adjacent unit cores 83 are overlapped in the direction of stacking in mesh engagement with each other. Consequently, the magnetic resistance can be reduced. More specifically, if the sheet ends of the unit cores are overlapped without slippage, the unit cores are abutted against one another when the developed core is rounded. Consequently, the magnetic resistance is increased at the connected portion of each unit core. In the above-described embodiment, however, the sheet ends of the unit cores 83 of the developed core 82 are overlapped in mesh engagement with each other. Consequently, since a contact area of each connected portion is increased, the magnetic resistance can be reduced at each connected portion. Moreover, the steel sheets 82a are stacked with the sides thereof being reversed alternately so that the ends of the unit cores 82e are overlapped with slippage. As a result, since the steel sheets 82 with the same shape are manufactured, the manufacturing efficiency can be improved and accordingly, the manufacturing cost can be reduced.

Figure 74:
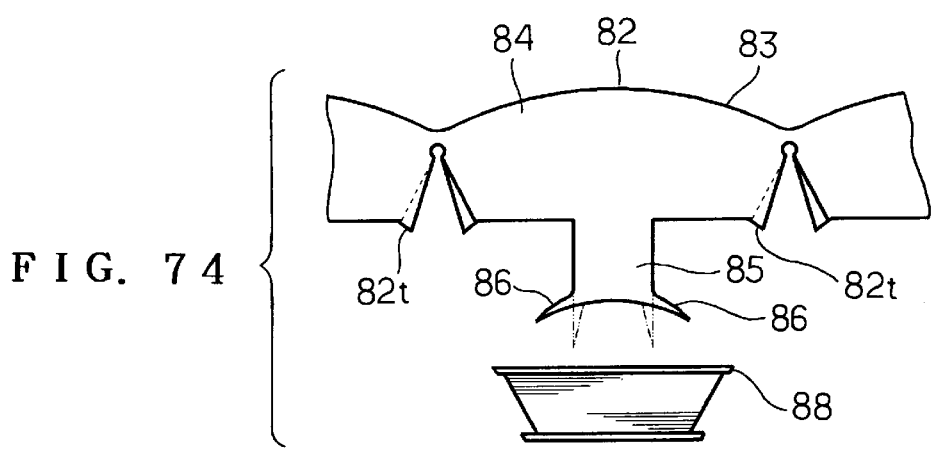
Figure 75:
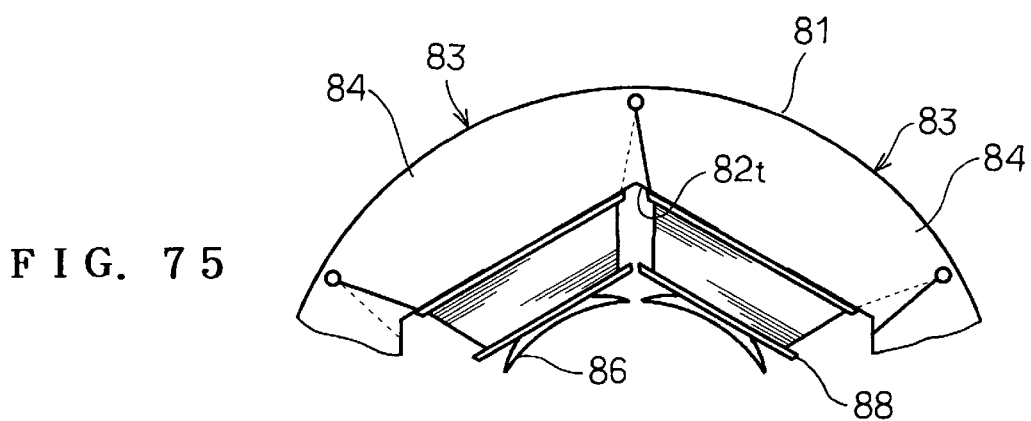
Figure 76:
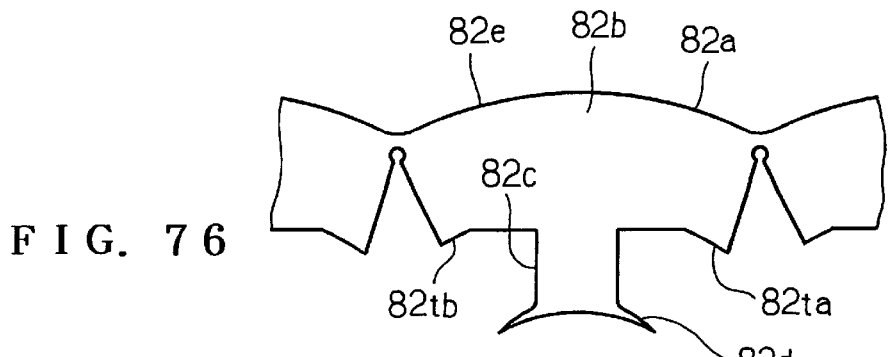
FIGS. 76 to 79 are partial plan views of the stator of a twenty-third embodiment, showing the different manufacturing steps.
Figure 77:
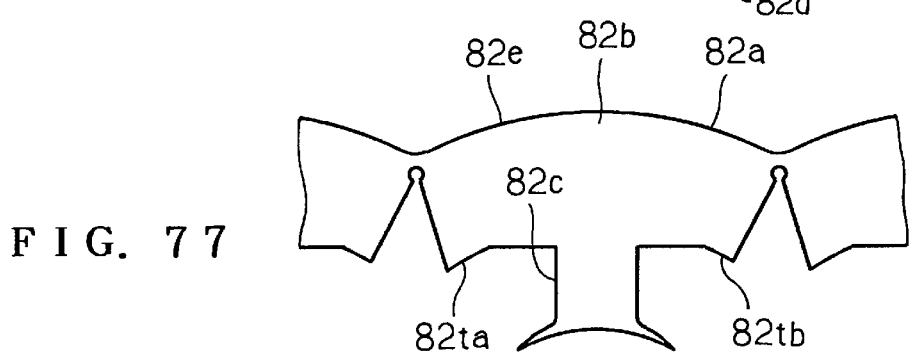
Figure 78:
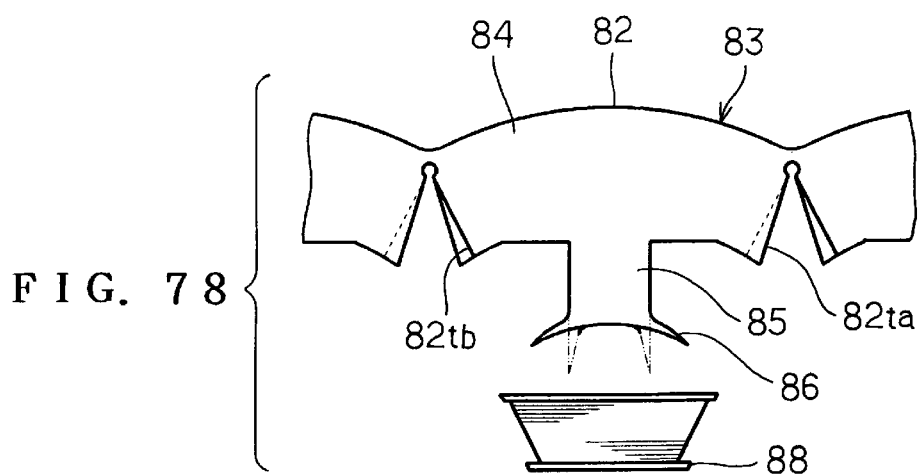
Figure 79:
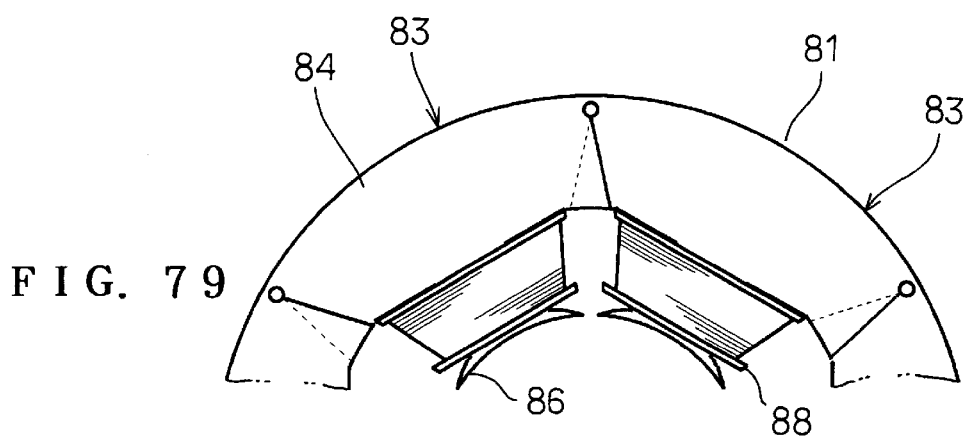
Figure 84:
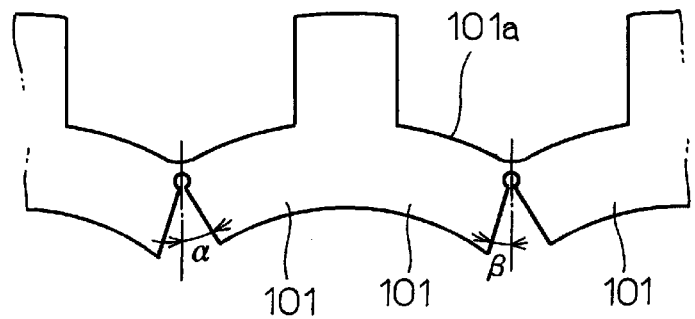
FIGS. 84 to 87 are partial plan views of the stator of a twenty-seventh embodiment, showing the different manufacturing steps.
Figure 85:
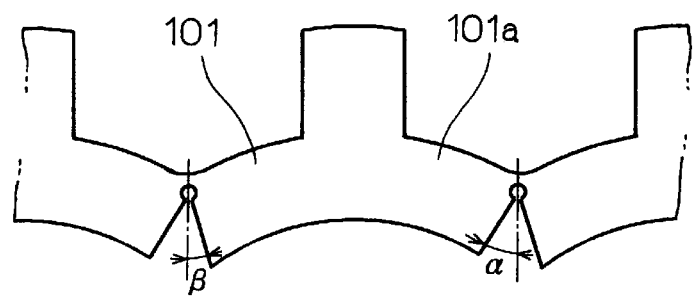
Figure 86:
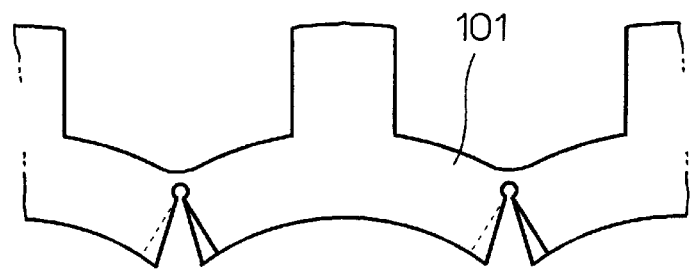
Figure 87:
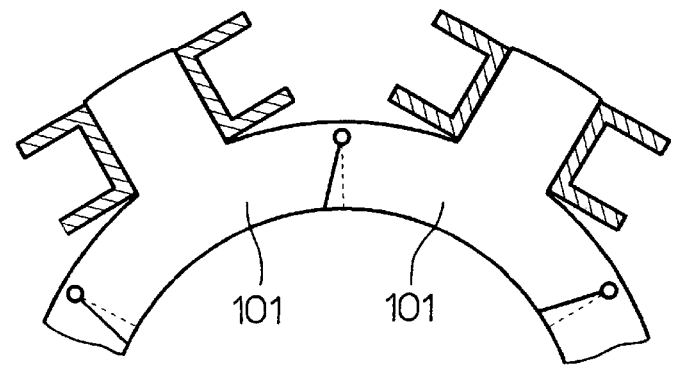

Each unit yoke piece 82b may have a V-shaped projection 82t formed on an inner circumferential side end thereof as shown in FIGS. 72 to 75 as a twenty-second embodiment. In this case, the steel sheets 82a are stacked with the sides thereof being reversed alternately as shown in FIG. 74. The ends of the unit yoke pieces 82b are overlapped without gap when the steel sheets 82a are rounded. Furthermore, each unit yoke piece 82b may have two V-shaped projections 82ta and 82tb formed on both inner circumferential side ends thereof respectively as shown in FIGS. 76 to 79 as a twenty-third embodiment.

FIGS. 80 and 81 illustrate a twenty-fourth embodiment. The invention is applied to a stator for the dynamoelectric machine of the outer rotor type. The magnetic pole tooth 93 of each unit core 92 of the developed core 91 has a joint portion 92a formed into a flat shape. The developed core used in conventional dynamoelectric machines of the outer rotor type includes the unit cores each formed into an arcuate shape. In the embodiment, however, since each unit core 92 has the flat joint portion 92a of each tooth 93, the yoke width YW is increased and accordingly, the sectional area of the yoke is increased at the portion where magnetic flux joins another magnetic flux to flow toward the tooth without changes in the entire size of the stator. Consequently, the magnetic resistance can be reduced. Additionally, the shape of the above-described developed core 91 utilizes as the joint portion 92a the potion which is conventionally wasted away. As a result, the yield in punching the steel sheet can be improved.

The flat joint portion 92a may arcuately be swollen as at 92b in FIG. 82 showing a twenty-fifth embodiment. Furthermore, each magnetic pole tooth 93 may have a protrusion 94 formed on the distal end thereof as shown in FIG. 83 as a twenty-sixth embodiment.

FIGS. 84 to 87 illustrate a twenty-seventh embodiment. In the stator for the dynamoelectric machine of the outer rotor type, ends of the steel sheets 101a serving as the unit cores 101 are overlapped with slippage for every one steel sheet. In this case, too, the steel sheets 101a are stacked with the sides thereof being reversed alternately. Consequently, the same effect can be achieved in the twenty-seventh embodiment as in the twenty-first embodiment shown in FIGS. 67 to 71.

Figure 88:
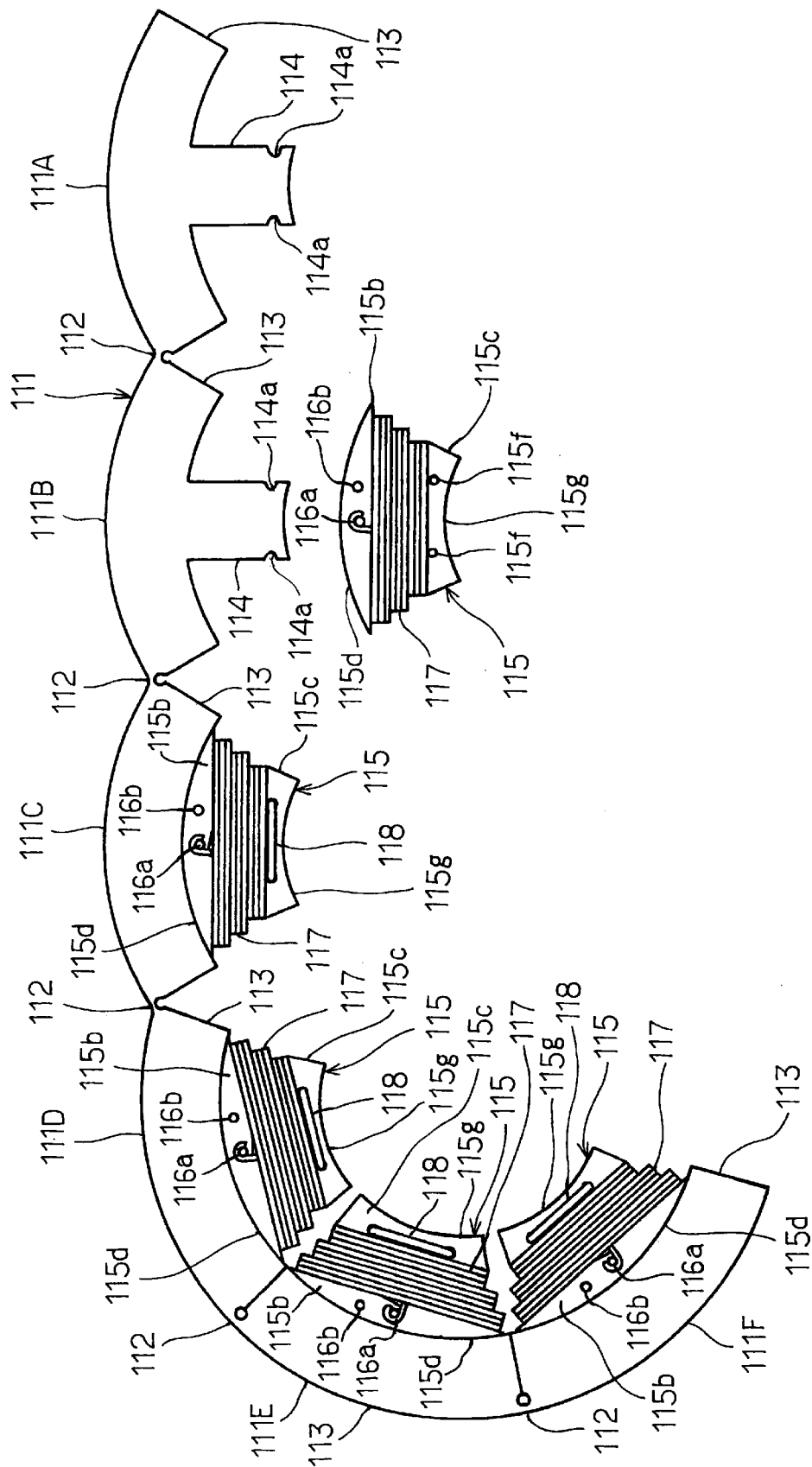
FIG. 88 is a view similar to FIG. 1, showing the stator of a twenty-eighth embodiment.

FIGS. 88 to 94 illustrate a twenty-eighth embodiment. Referring to FIG. 88, the developed core 111 comprises six unit cores 111A to 111F connected by the connecting portions 112. The unit core 111A is disconnected from the unit core 111F. Each of the unit cores 111A to 111F is formed by stacking a plurality of steel sheets and includes an arcuate unit yoke 113 and a magnetic pole tooth 114 with a rectangular section.

Figure 90:
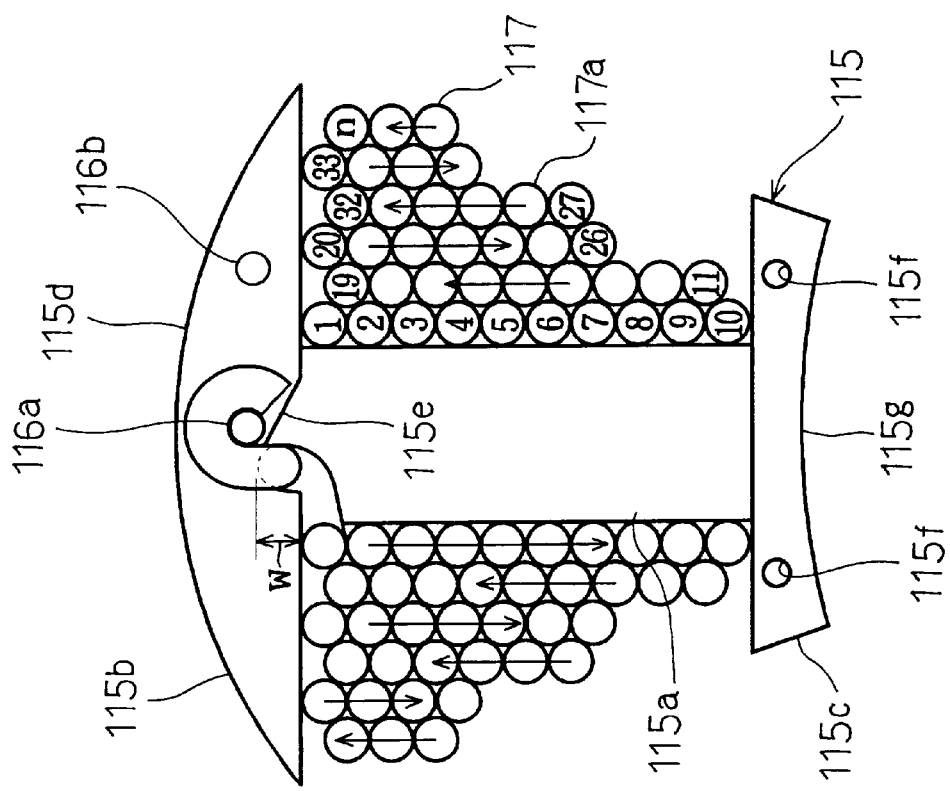
FIGS. 89 and 90 are a plan view of the stator, showing an initial stage of the coil winding, and a transverse section of the stator, showing the completed coil winding respectively.
Figure 89:
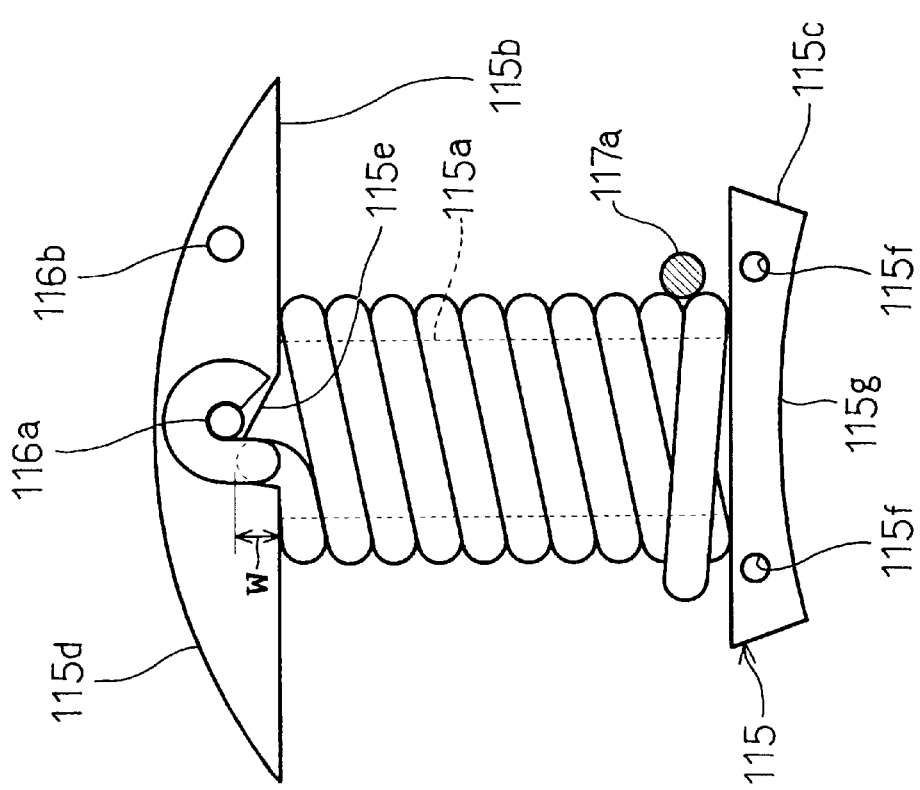

The bobbin 115 is fitted with an outer face of each tooth 114. Each bobbin 115 includes a square cylindrical winding drum 115a having two frame-shaped flanges 115b and 115c formed integrally on both ends thereof, as shown in FIGS. 89 and 90. Each flange 115b has an outer circumferential face formed into an arcuate portion 115d which has substantially the same shape as an inner circumferential face of the unit yoke 113. As shown in FIG. 88, each arcuate portion 115d is in close contact with the inner circumferential face of the corresponding unit yoke 113. Each bobbin 115 is made from a synthetic resin such as polypropylene, nylon or ABS.

Referring to FIGS. 89 and 90, two terminal pins 116a and 116b are mounted to an axial end face of each flange 115b so as to be located at the central arcuate portion and one end of the arcuate portion respectively. A coil 117 is wound on the drum 115a of each bobbin 115. A beginning end of the magnet wire 117a is wound on the terminal pin 116a and thereafter, the magnet wire 117a is wound on the drum 115a from the outer diameter side to the inner diameter side of the stator core and from the inner diameter side to the outer diameter side alternately for every wound coil layer, as shown by arrows in FIG. 90. Consequently, the magnet wire 117a is wound on the drum 115a substantially stepwise. The other or terminal end of the magnet wire 117a is wound on the terminal pin 116b. The magnet wire 117a is a strand and has a circular section.

In FIG. 90, the reference symbols 1 to n designate a winding sequence of the magnet wire 117a. The number of turns of each layer designated by the odd number (k layer) and the number of turns of each layer designated by the even number ((k+1) layer) are set on the basis of the following equations (1) and (2):

$$N-\alpha(k-1)/2 \tag{1}$$

$$N-\alpha(k-1)/2-1 \tag{2}$$

where k is a positive odd number, N is the number of turns of the first layer (N=10 in FIGS. 89 and 90), and α is a natural number which is at or larger than 2 (α=3 in FIGS. 89 and 90).

Figure 91:
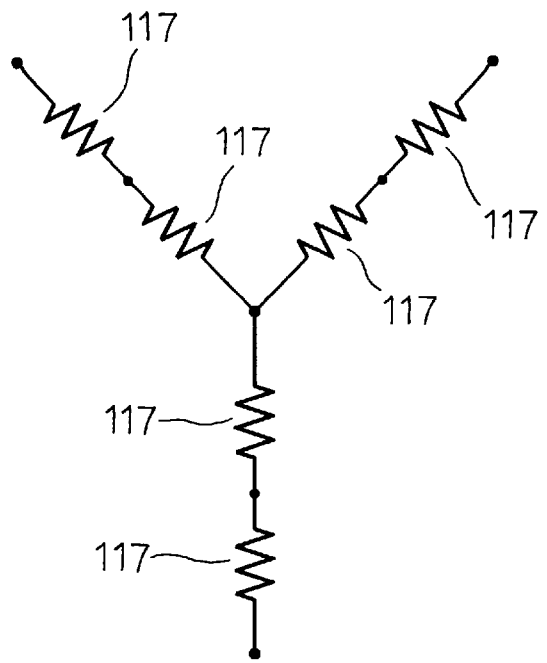
FIG. 91 is a circuit diagram showing wire bound of the coils.

FIG. 91 shows the connection of the six coils 117. The beginning ends of the coils 117 constituting different phases are connected in common by connecting interconnecting wires (not shown) to the terminal pins 116a. The coils 117 constituting the same phase are serially connected by connecting interconnecting wires (not shown) to the terminal pins 116b.

The central arcuate portion of each flange 115b has a concave strand accommodating portion 115e positionally corresponding to the terminal pin 116a. Each accommodating portion 115e has a width W approximately equal to the diameter of the magnet wire 117a. The beginning end of each coil 117 is accommodated in the corresponding strand accommodating portion 115e. Accordingly, since the beginning end of each coil 117 is disposed at the axial end face side, each coil is transferred from one layer to another at the axial end face side.

Figure 92:
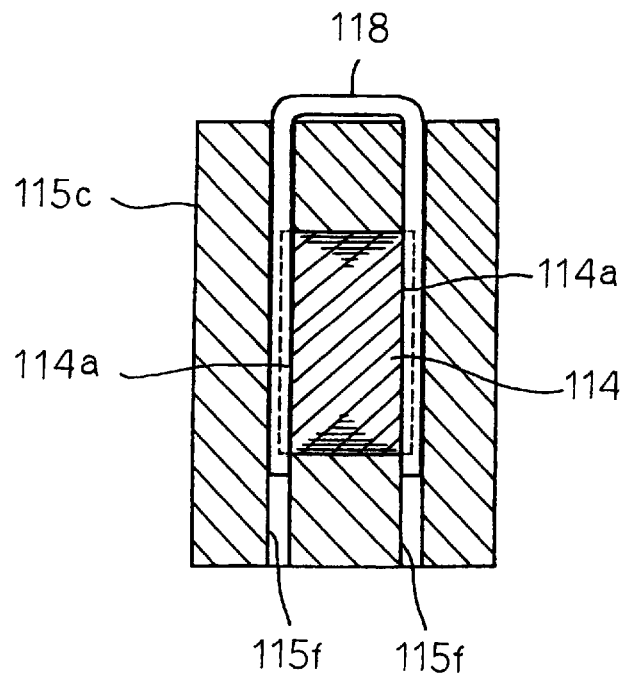
FIG. 92 is a longitudinal section of the stator to which the falling-off preventing pin is attached.

Each magnetic pole tooth 114 has recesses 114a and 114b which are formed in the projecting end thereof to be located at the circumferential side faces respectively, as shown in FIG. 88. The flange 115c of each bobbin 115 has two pin insertion slots 115f as shown in FIGS. 89 and 90. U-shaped fall-off preventing pins 118 are inserted through the pin insertion slots 115f of the flange 115c into the recesses 114a of each tooth 114 as shown in FIG. 92. The fall-off preventing pins 118 serve as fall-off preventing means in the invention. Each bobbin 115 is prevented from falling off the tooth 114 by the fall-off preventing pins 118.

Figure 93:
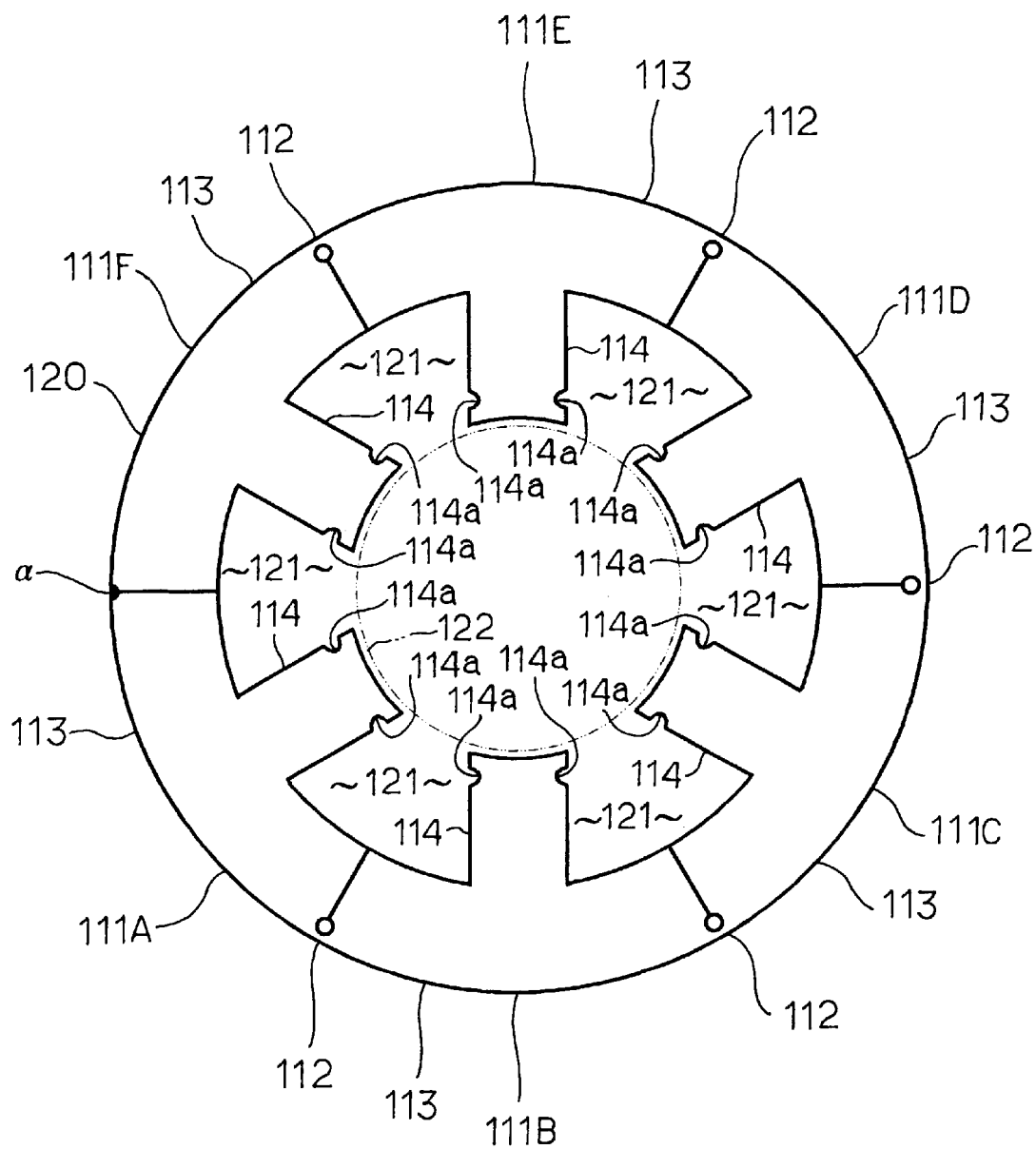
FIG. 93 is a plan view of the stator core.
Figure 94:
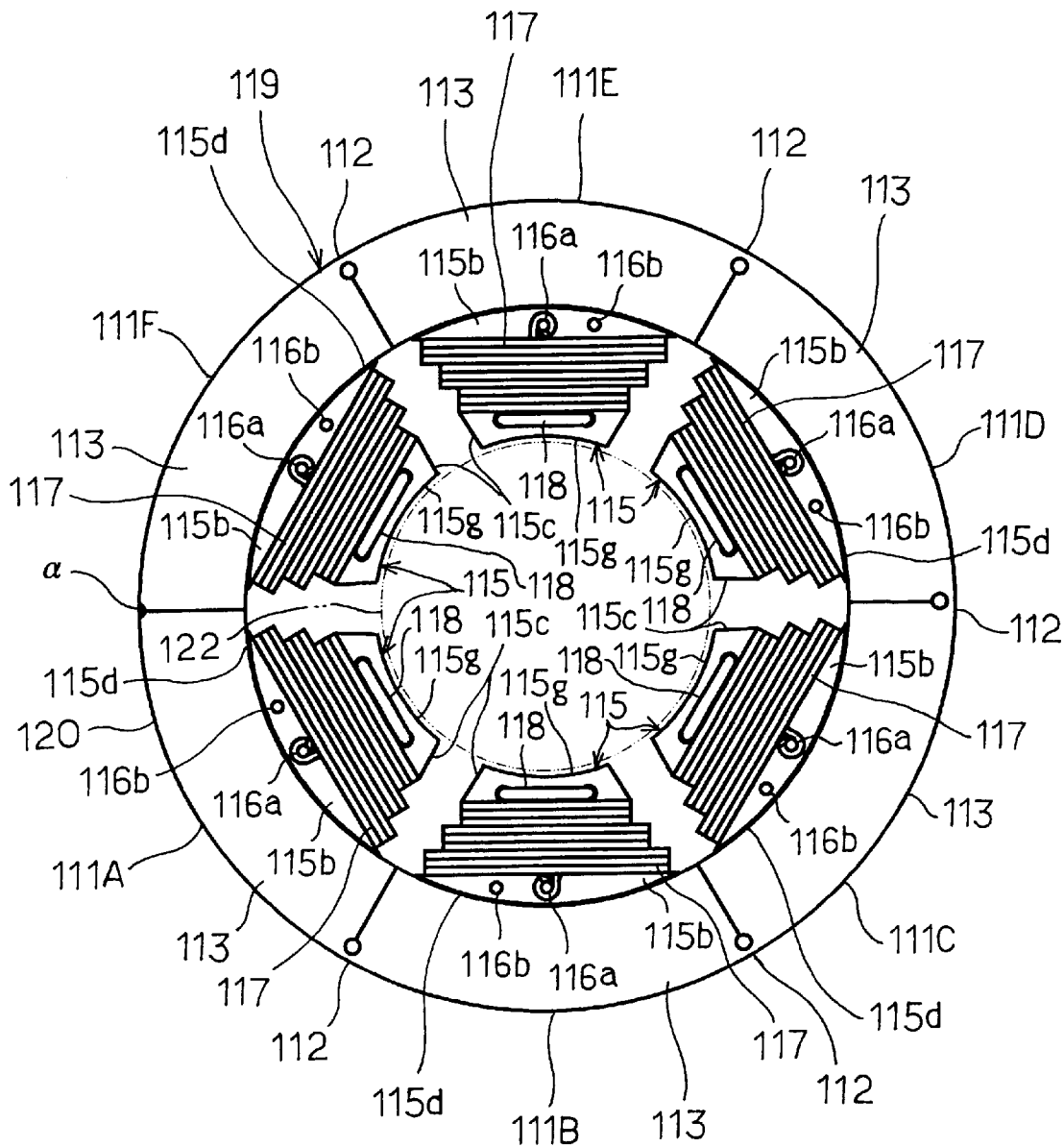
FIG. 94 is a plan view of the stator.

The stator core shown in FIG. 93 is formed by rounding the developed core 111 and connecting the unit core 111A to the unit core 111F by laser welding. The laser welding is applied to the outer circumferential portions (shown by a in FIG. 93) of the unit cores 111A and 111F. Reference numeral 120 designates a yoke comprising a plurality of unit yokes 113. Reference numeral 121 designates generally trapezoidal or sectorial slots located between the teeth 114.

The flange 115c of each bobbin 115 has an outer side face formed into an arcuate portion 115g as shown in FIGS. 89 and 90. Each arcuate portion 115g has approximately the same curvature as the distal end face of each tooth 114 as shown in FIG. 88. A rotor 122 is accommodated in an inner diameter side space of the stator core 119 as shown by two dot chain line in FIG. 94. An air gap between each arcuate portion 115g and the outer circumferential face of the rotor 122 is set at a predetermined minimum value. The rotor 122 comprises a rotor core and a plurality of rotor magnets (permanent magnets) mounted on the rotor core, neither of which is shown.

The assembly of the stator will now be described. The coil 117 is wound on the drum 115a of each bobbin 115. The beginning and terminal ends of each coil 117 are wound on the terminal pins 116a and 116b respectively. In this state, each bobbin 115 is fitted with the corresponding tooth 114 of the developed core 111. Thereafter, the fall-off preventing pins 118 are inserted through the pin insertion slots 115f of the flange 115c into the recesses 114a of each tooth 114, whereby each bobbin 115 is prevented from falling off the corresponding tooth 114. The developed core 111 is then rounded along a circular jig or mandrel, and the unit core 111A is connected to the unit core 111F by the laser welding.

According to the above-described embodiment, each bobbin 115 is prevented from falling off the corresponding tooth 114. Thereafter, the developed core 111 is rounded. Thus, each bobbin 115 is prevented from being displaced relative to and from falling off the corresponding tooth 114 during the assemblage. Consequently, since the rounding of the developed core 111 and the connection of the unit cores 111A and 111F are smoothly carried out, the assembly of the stator can be automatized and accordingly, the assembling efficiency can be improved.

The fall-off preventing pins 118 are inserted through each bobbin 115 into the recesses 114a of each tooth 114 so that each bobbin 115 is prevented from falling off the corresponding tooth 114. Consequently, each bobbin 115 can be prevented from falling off readily and reliably. Furthermore, the unit core 111A is connected to the unit core 111F by the laser welding. Differing from an arc welding (TIG welding), the laser welding heats only a portion where the laser beam is irradiated. Accordingly, an amount of weld penetration of the base material is reduced in the laser welding as compared with the arc welding. Consequently, since approximately the same magnetic property of the steel sheet is maintained between the welded portion and the peripheral portion thereof, the motor can be rendered smaller in size and the motor torque can be increased.

The flange 115c of each bobbin 115 is formed with the arcuate portion 115g. Accordingly, the gap between the arcuate portions 115g and the outer circumferential face of the rotor 122 can be set at the predetermined minimum value. This cannot be achieved when the flange 115c of each bobbin 115 is formed into a flat shape. As a result, a radial length of the drum 115a of each bobbin 115 is increased and accordingly, the number of turns of each coil 117 is increased. Consequently, the motor can further be rendered smaller in size and the motor torque can further be increased.

In winding each coil 117 on the corresponding bobbin 115, the numbers of turns of the magnet wire 117a are set on the basis of the equations (1) and (2). Each coil 117 is expanded toward the outer circumference substantially stepwise. Accordingly, when the invention is applied particularly to a three-phase six-pole stator, each coil 117 corresponds to the inner shape of the corresponding slot 121 such that each slot 121 can effectively be utilized as an occupational space for the coil 117. This can further reduce the size of the motor and increase the motor torque.

The pair of terminal pins 116a and 116b are mounted on the outer circumferential portion of each bobbin 115 around which a sufficient space is ensured. The beginning ends of the coils 117 constituting different phases are connected in common by the connecting interconnecting wires to the terminal pins 116a. The coils 117 constituting the same phase are serially connected by connecting the interconnecting wires to the terminal pins 116b. Thus, the space around each bobbin 115 can efficiently be utilized for the ends of the coils 117.

Each terminal pin 116a is disposed at the circumferentially central portion of the corresponding tooth 114, and the beginning end of each coil 117 is accommodated in the corresponding strand accommodating portion 115e. Accordingly, since the beginning end of each coil 117 is located at the axial end face side of the corresponding bobbin 115, each coil 117 is transferred from one layer to another at the axial end face side. Consequently, the transfer portion of each coil 117 can be prevented from being expanded in the slot 121. Thus, the interior of each slot can be utilized efficiently such that each coil 117 is disposed in the slot 121 with high density. This can further reduce the size of the motor and increase the motor torque.

Although the recesses 114a are formed in the projecting end of the tooth 114 to be located at the circumferential side faces of the tooth respectively in the foregoing embodiment, the recess 114a may be formed in one circumferential side face of the tooth 114, instead, for example. In this case, an L-shaped fall-off preventing pin is preferably inserted through the bobbin 115 into the recess 114a.

FIGS. 95 and 96 illustrate a twenty-ninth embodiment. The differences between the twenty-eighth and twenty-ninth embodiments will be described. Each bobbin 115 has fall-off preventing projections 115h formed integrally therewith. Each fall-off preventing projection serves as fall-off preventing means in the invention and is located on the inner side face of each flange 115c.

According to the twenty-ninth embodiment, each coil 117 is wound on the drum 115a of the corresponding bobbin 115, and the ends of each coil 117 are wound to the terminal pins 116a and 116b respectively. Thereafter, when each bobbin 115 is fitted with the corresponding tooth 114, each fall-off preventing projection 115h is engaged with the recess 114a of the tooth 114 such that each bobbin 115 is prevented from falling off the corresponding tooth 114. Accordingly, since the fall-off preventing pins 118 are eliminated, the number of parts can be reduced. Furthermore, since each bobbin 115 is readily prevented from falling off, the assembling efficiency can be improved.

Although the recesses 114a are formed in the projecting end of the tooth 114 to be located at the circumferential side faces of the tooth respectively in the foregoing embodiment, the recess 114a may be formed in one circumferential side face of the tooth 114, instead, for example. In this case, one of the fall-off preventing projections 115h of each flange 115c may be eliminated.

FIG. 97 illustrates a thirtieth embodiment. The differences between the twenty-eighth and twenty-ninth embodiments will be described. Two magnetic wedges 123 each made from green compact are embedded in each bobbin 115 by insert molding so as to be located at the flange 115c. One end of each magnetic wedge 123 is exposed at circumferential end of the flange 115c, and the other end thereof inwardly extends in the slot 121.

According to the above-described embodiment, each coil 117 is wound on the drum 115a of the corresponding bobbin 115, and the ends of each coil 117 are wound to the terminal pins 116a and 116b respectively. Thereafter, when each bobbin 115 is fitted with the corresponding tooth 114, one end of each magnetic wedge 123 is engaged with the recess 114a of the tooth 114 such that each bobbin 115 is prevented from falling off the corresponding tooth 114. Accordingly, since the fall-off preventing pins 118 are eliminated, the number of parts can be reduced. Furthermore, since each bobbin 115 is readily prevented from falling off, the assembling efficiency can be improved. Additionally, magnetic flux passing each tooth 114 is dissipated by the magnetic wedges 123 circumferentially with respect to the air gap. Consequently, since the torque ripple of the rotor 122 is reduced, a rotating characteristic of the rotor can be improved.

FIG. 98 illustrates a thirty-first embodiment. The differences between the first and thirty-first embodiments will be described. The inner circumferential side flange 115c of each bobbin 115 has inclined faces 115i formed to be located at both circumferential ends thereof.

Each bobbin 115 is fitted with the corresponding tooth 114 after the coil 117 has been wound on each bobbin. Thereafter, when the developed core 111 is rounded, the inclined faces 115i of each bobbin 115 are brought into close contact with the inclined faces 115i of the adjacent bobbins 115 such that each bobbin 115 is prevented from falling off the corresponding tooth 114. Thus, the fall-off preventing pins 118 are eliminated and accordingly, the number of parts is reduced. Since the attachment of the fall-off preventing pins 118 is not required, the assembling efficiency is improved. Additionally, since the inclined faces 115i of the bobbins 115 are brought into contact with each other, an amount of contact between the bobbins 115 is increased. Consequently, the bobbins 115 can reliably be prevented from falling off.

Although the inclined faces 115i are formed at both ends of each flange 115c in the embodiment, the ends of each flange 115c may be brought into contact with those of the flange of the adjacent bobbins with elimination of the inclined faces, instead.

Figure 103:
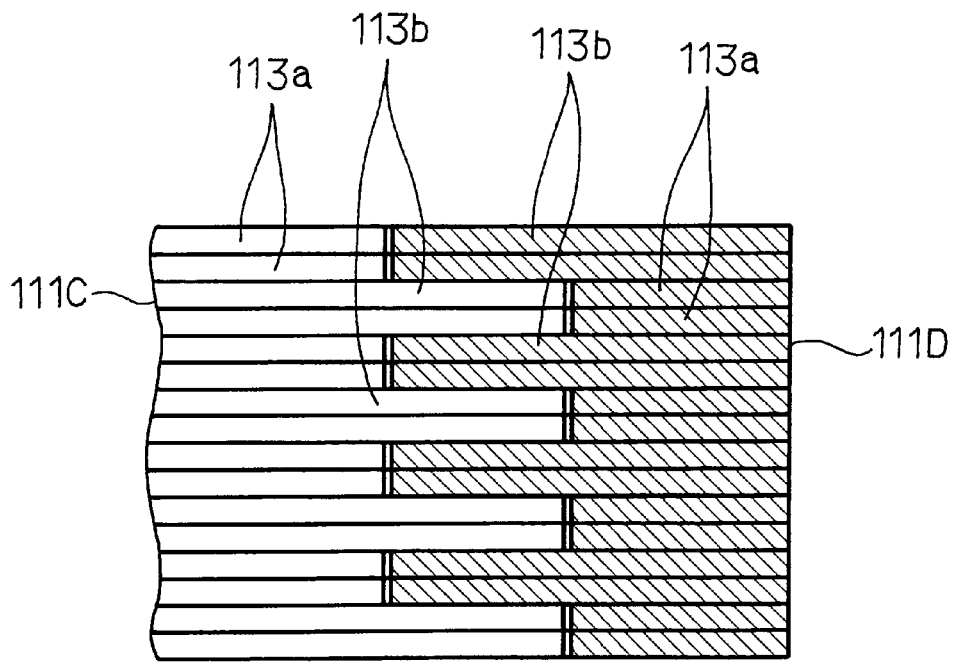
FIG. 103 is a view similar to FIG. 101, showing a thirty-third embodiment.

FIGS. 99 to 101 illustrate a thirty-second embodiment. The differences between the twenty-eighth and thirty-second embodiments will be described. As shown in FIGS. 99 and 100, the circumferential edges of each unit yoke 113 have different cutting angles for every steel sheet so as to be formed with a retreated portion 113a serving as the recessed portion and an advanced portion 113b serving as the protruding portion. The developed steel sheets formed as described above are stacked together with the sides thereof being reversed alternately for a predetermined number of steel sheets, for example, every one sheet. As a result, when the developed core is rounded, the ends 113a and 113b of the adjacent unit yokes 113 are overlapped in the direction of stacking of the steel sheets so that overlapped portions 113c are formed as shown in FIG. 101. In FIG. 103, the unit core 111D is hatched to be distinguished from the unit core 111C and does not represent any section.

After each bobbin 115 has been fitted with the corresponding tooth 114, the developed core 111 is subjected to ultrasonic oscillation to thereby be rounded. The end 113b of each unit yoke 113 is inserted into a space between the ends 113a of the adjacent unit yokes 113, whereby a plurality of overlapped portions 113C are formed. In this state, the laser welding is applied to the unit cores 111A and 111F. Consequently, since the magnetic efficiency is improved as compared with the case where the unit cores 111A to 111F are not overlapped, the size of the motor can be reduced and the motor torque can be increased.

Furthermore, the ultrasonic oscillation is applied to the developed core when the core is rounded. Accordingly, even when the sheet ends are abutted against each other between the overlapped portions 113C, the ends are displaced in the direction of stacking such that the overlapped portions 113C are reliably formed. Consequently, since the developed core is readily rounded, the assembling efficiency can be improved.

Figure 102:
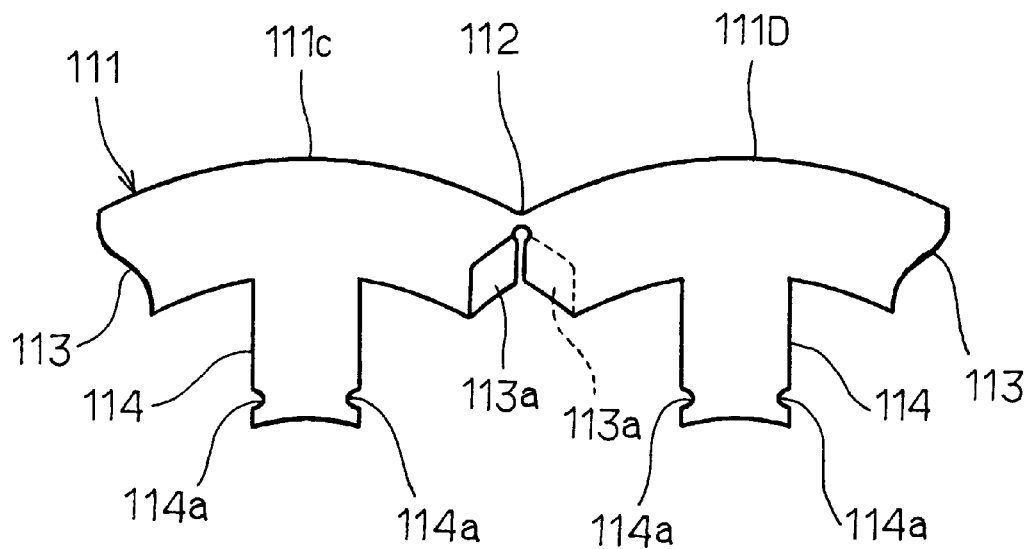
FIG. 102 is a view similar to FIG. 99, showing a thirty-second embodiment.

Although each overlapped portion 113C has a straight cut edge in the thirty-second embodiment, the cut edge may be curved or crimped as shown in FIG. 102 as a thirty-third embodiment. Since an amount of axially overlapped portion is increased between the overlapped portions 113C, the magnetic efficiency can further be increased.

Although a number of developed steel sheets are stacked with the sides thereof being reversed alternately every one sheet in the thirty-second and thirty-third embodiments, the developed sheets may be stacked with the sides thereof being reversed alternately every two sheets as shown in FIG. 103 as a thirty-fourth embodiment, instead.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A stator for dynamoelectric machine comprising:
   an annular stator core composed of a developed core formed by stacking a number of steel sheets, each of said steel sheets including a plurality of unit cores each of which includes a unit yoke and a magnetic pole tooth and which are sequentially connected together by connecting portions integral with the respective unit yoke; and
   a stator coil wound on the magnetic pole tooth;
   wherein each said unit yoke has a circumferential end and is bent at the connecting portion thereof, and wherein the circumferential end of each unit yoke overlaps the circumferential end of a unit yoke adjacent thereto in a direction of stacking of the steel sheets.

2. A stator according to claim 1, wherein each said unit yoke has an inner or outer circumferential face including a flat face around a joint of the magnetic pole tooth.

3. A stator according to claim 1, wherein each said coil is wound on a bobbin fitted with each said magnetic pole tooth, and which further comprises fall-off preventing means provided between each said bobbin and the corresponding magnetic pole tooth for preventing each said bobbin from falling off the corresponding magnetic pole tooth.

4. A stator according to claim 3, further comprising a plurality of said bobbins each having respective flanges formed on magnetic pole tooth side ends thereof, each said flange of each of said bobbins being brought into contact with the flange of an adjacent one of said bobbins, thereby serving as said fall-off preventing means for preventing each of said bobbins from falling off the magnetic pole tooth.

5. A stator according to claim 4, wherein the flange of each of said bobbins has both said circumferential ends having respective inclined faces, the inclined faces of one of said bobbins being in contact with the inclined faces of the flange of the adjacent one of said bobbins respectively.

* * * * *